(12) United States Patent
Lablans

(10) Patent No.: US 11,093,213 B1
(45) Date of Patent: *Aug. 17, 2021

(54) CRYPTOGRAPHIC COMPUTER MACHINES WITH NOVEL SWITCHING DEVICES

(71) Applicant: Peter Lablans, Morris Township, NJ (US)

(72) Inventor: Peter Lablans, Morris Township, NJ (US)

(73) Assignee: Ternarylogic LLC, Morristown, NJ (US)

( * ) Notice: Subject to any disclaimer, the term of this patent is extended or adjusted under 35 U.S.C. 154(b) by 232 days.

This patent is subject to a terminal disclaimer.

(21) Appl. No.: 16/172,584

(22) Filed: Oct. 26, 2018

Related U.S. Application Data

(63) Continuation-in-part of application No. 14/975,841, filed on Dec. 20, 2015, now abandoned, which is a continuation-in-part of application No. 14/622,860, filed on Feb. 14, 2015, now Pat. No. 9,218,158, which is a continuation of application No. 14/064,089, filed on Oct. 25, 2013, now abandoned, which is a (Continued)

(51) Int. Cl.
| | |
|---|---|
| *G06F 7/487* | (2006.01) |
| *H04L 9/06* | (2006.01) |
| *G06F 5/01* | (2006.01) |
| *H03M 13/15* | (2006.01) |
| *H03M 7/00* | (2006.01) |
| *H03M 13/23* | (2006.01) |
| *H03M 13/19* | (2006.01) |
| *H03M 13/09* | (2006.01) |

(52) U.S. Cl.
CPC ............ *G06F 7/4876* (2013.01); *G06F 5/012* (2013.01); *H03M 7/00* (2013.01); *H03M 13/158* (2013.01); *H04L 9/06* (2013.01); *H03M 13/09* (2013.01); *H03M 13/1515* (2013.01); *H03M 13/19* (2013.01); *H03M 13/23* (2013.01)

(58) Field of Classification Search
CPC ................................. G06F 7/4876; H04L 9/06
See application file for complete search history.

(56) References Cited

U.S. PATENT DOCUMENTS

| | | | | |
|---|---|---|---|---|
| 3,962,539 A | * | 6/1976 | Ehrsam | .................. H04L 9/0625 380/29 |
| 4,165,444 A | * | 8/1979 | Gordon | .................. H04L 9/0662 380/265 |

(Continued)

*Primary Examiner* — Jason Chiang

(57) ABSTRACT

Operational n-state digital gates execute Finite Lab-transformed (FLT) n-state switching functions or n-state switching function tables to process n-state signals provided on at least 2 inputs to generate an n-state signal on an output, with $n>2$, $n>3$ and $n>64$. The FLT is an enhancement of a computer architecture. Cryptographic apparatus and methods apply circuits that are characterized by FLT-ed addition and multiplication over finite field GF(n) or by addition and multiplication modulo-n that are modified in accordance with reversible n-state inverters, and are no longer characterized by known operations. Known cryptographic methods executed with novel n-state digital gates include encryption/decryption, public key generation, message digest and Elliptic Curve Cryptography wherein one n-state switching function is replaced by an FLT'ed n-state switching function.

19 Claims, 14 Drawing Sheets

Related U.S. Application Data continuation-in-part of application No. 12/980,504, filed on Dec. 29, 2010, now Pat. No. 8,577,026, application No. 16/172,584, filed on Oct. 26, 2018, which is a continuation-in-part of application No. 15/442,556, filed on Feb. 24, 2017, now Pat. No. 10,515,567, which is a continuation-in-part of application No. 15/244,985, filed on Aug. 23, 2016, now Pat. No. 10,650,373, which is a continuation-in-part of application No. 14/975,841, filed on Dec. 20, 2015, now abandoned, which is a continuation-in-part of application No. 14/622,860, filed on Feb. 14, 2015, now Pat. No. 9,218,158, which is a continuation of application No. 14/064,089, filed on Oct. 25, 2013, now abandoned, which is a continuation-in-part of application No. 12/980,504, filed on Dec. 29, 2010, now Pat. No. 8,577,026.

(60) Provisional application No. 62/610,921, filed on Dec. 27, 2017.

(56) References Cited

U.S. PATENT DOCUMENTS

| | | | |
|---|---|---|---|
| 4,405,829 A | 9/1983 | Rivest et al. | |
| 4,597,083 A | 6/1986 | Stenerson | |
| 5,995,539 A * | 11/1999 | Miller | H04K 1/02 375/222 |
| 6,052,704 A * | 4/2000 | Wei | G06F 7/724 708/492 |
| 6,111,952 A * | 8/2000 | Patarin | H04L 9/3247 380/45 |
| 6,990,624 B2 | 1/2006 | Dohmen | |
| 7,343,472 B2 | 3/2008 | Porten et al. | |
| 7,831,895 B2 | 11/2010 | Lin | |
| 8,458,575 B2 | 6/2013 | Dohmen | |
| 8,666,062 B2 * | 3/2014 | Lambert | G06F 7/72 380/28 |
| 9,485,087 B2 | 11/2016 | Van Assche et al. | |
| 9,652,200 B2 | 5/2017 | Bos et al. | |
| 10,515,567 B2 * | 12/2019 | Lablans | H04L 9/3013 |
| 2003/0106014 A1 | 6/2003 | Dohmen et al. | |
| 2004/0078555 A1 | 4/2004 | Porten et al. | |
| 2004/0202317 A1 | 10/2004 | Demjanenko | |
| 2005/0058285 A1 | 3/2005 | Stein | |
| 2006/0149962 A1 | 7/2006 | Fountain et al. | |
| 2007/0150794 A1 | 6/2007 | Naslund et al. | |
| 2008/0130873 A1 | 6/2008 | Bolotov et al. | |
| 2008/0143561 A1 * | 6/2008 | Miyato | H04L 9/003 341/79 |
| 2009/0092250 A1 * | 4/2009 | Lablans | G06F 7/582 380/255 |
| 2009/0220083 A1 * | 9/2009 | Schneider | H04L 9/0662 380/268 |
| 2010/0057823 A1 | 3/2010 | Filseth et al. | |
| 2010/0306299 A1 | 12/2010 | Reidenbach | |
| 2011/0243320 A1 * | 10/2011 | Halevi | H04L 9/0861 380/30 |
| 2012/0023336 A1 * | 1/2012 | Natarajan | H04L 9/0841 713/179 |
| 2012/0121084 A1 * | 5/2012 | Tomlinson | H04L 9/304 380/30 |

* cited by examiner

<!-- Truth table 201 (7-state) -->

```
0  1  2  3  4  5  6
1  2  3  4  5  6  0
2  3  4  5  6  0  1
3  4  5  6  0  1  2
4  5  6  0  1  2  3
5  6  0  1  2  3  4
6  0  1  2  3  4  5
```

201

```
0  0  0  0  0  0  0
0  1  2  3  4  5  6
0  2  4  6  1  3  5
0  3  6  2  5  1  4
0  4  1  5  2  6  3
0  5  3  1  6  4  2
0  6  5  4  3  2  1
```

202

```
0  1  2  3  4  5  6  7
1  0  3  2  5  4  7  6
2  3  0  1  6  7  4  5
3  2  1  0  7  6  5  4
4  5  6  7  0  1  2  3
5  4  7  6  1  0  3  2
6  7  4  5  2  3  0  1
7  6  5  4  3  2  1  0
```

301

```
0  0  0  0  0  0  0  0
0  1  2  3  4  5  6  7
0  2  4  6  3  1  7  5
0  3  6  5  7  4  1  2
0  4  3  7  6  2  5  1
0  5  1  4  2  7  3  6
0  6  7  1  5  3  2  4
0  7  5  2  1  6  4  3
```

302

```
1   function y=labtransform(table,invert)
2   % lab-transform or Finite Lab-transform or FLT
3   % inverts n-state switching table 'table' with
4   % n-state inverter 'invert' at inputs and
5   % reversing inverter 'rinvert' at output
6   % the table and inverter are in origin 1
7   % Copyright 2017 Ternarylogic LLC. All right reserved
8
9   % determine size of 'table'
10  lent=size(table);
11  len=lent(2); % len is n
12
13  % initialize 'tableinv' and 'rinvert'
14  rinvert=ones(1,len);
15  tableinv=zeros(len,len);
16
17  % determine 'rinvert' from 'invert'
18  for i=1:len
19      ind=invert(i);
20      rinvert(ind)=i;
21  end
22  rinvert;
23  % determine modified table 'tableinv'
24  for i1=1:len
25      for i2=1:len
26          k1=invert(i1); % invert input 1
27          k2=invert(i2); % invert input 2
28          aa=table(k1,k2);
29          tableinv(i1,i2)=rinvert(aa);% invert output
30      end
31  end
32  y=tableinv; % the Lab-transformed switching table
```

FIG. 7

```
1    function y=labtransformp(table,invx,invy)
2    % modified finite lab-transform or mL-transformation or mFLT
3    % inverts n-state switching table 'table' with
4    % n-state inverter 'invx' at inputs and
5    % inverter 'invy' at output
6    % the table and inverter are in origin 1
7
8    % Copyright 2016 Ternarylogic LLC. All right reserved
9
10   % determine size of 'table'
11   lent=size(table);
12   len=lent(2); % len is n
13
14   % initialize 'tableinv'
15
16   tableinv=zeros(len,len);
17
18   % determine modified table 'tableinv'
19   for i1=1:len
20       for i2=1:len
21           k1=invx(i1); % invert input 1
22           k2=invx(i2); % invert input 2
23           aa=table(k1,k2);
24           tableinv(i1,i2)=invy(aa); % invert output
25       end
26   end
27   y=tableinv; % the Lab-transformed switching table
```

FIG. 12

| 0 | 1 | 2 | 3 | 4 | 5 | 6 | 7 | 0 | 0 | 0 | 0 | 0 | 0 |
|---|---|---|---|---|---|---|---|---|---|---|---|---|---|
| 1 | 0 | 6 | 4 | 3 | 7 | 2 | 5 | 1 | 1 | 1 | 1 | 1 | 1 |
| 2 | 6 | 0 | 7 | 5 | 4 | 1 | 3 | 2 | 2 | 2 | 2 | 2 | 2 |
| 3 | 4 | 7 | 0 | 1 | 6 | 5 | 2 | 3 | 3 | 3 | 3 | 3 | 3 |
| 4 | 3 | 5 | 1 | 0 | 2 | 7 | 6 | 4 | 4 | 4 | 4 | 4 | 4 |
| 5 | 7 | 4 | 6 | 2 | 0 | 3 | 1 | 5 | 5 | 5 | 5 | 5 | 5 |
| 6 | 2 | 1 | 5 | 7 | 3 | 0 | 4 | 6 | 6 | 6 | 6 | 6 | 6 |
| 7 | 5 | 3 | 2 | 6 | 1 | 4 | 0 | 7 | 7 | 7 | 7 | 7 | 7 |
| 0 | 1 | 2 | 3 | 4 | 5 | 6 | 7 | 0 | 0 | 0 | 0 | 0 | 0 |
| 0 | 1 | 2 | 3 | 4 | 5 | 6 | 7 | 0 | 0 | 0 | 0 | 0 | 0 |
| 0 | 1 | 2 | 3 | 4 | 5 | 6 | 7 | 0 | 0 | 0 | 0 | 0 | 0 |
| 0 | 1 | 2 | 3 | 4 | 5 | 6 | 7 | 0 | 0 | 0 | 0 | 0 | 0 |
| 0 | 1 | 2 | 3 | 4 | 5 | 6 | 7 | 0 | 0 | 0 | 0 | 0 | 0 |
| 0 | 1 | 2 | 3 | 4 | 5 | 6 | 7 | 0 | 0 | 0 | 0 | 0 | 0 |
| 0 | 1 | 2 | 3 | 4 | 5 | 6 | 7 | 0 | 0 | 0 | 0 | 0 | 0 |

1401

| 0 | 0 | 0 | 0 | 0 | 0 | 0 | 0 | 0 | 0 | 0 | 0 | 0 | 0 |
|---|---|---|---|---|---|---|---|---|---|---|---|---|---|
| 0 | 1 | 2 | 3 | 4 | 5 | 6 | 7 | 0 | 0 | 0 | 0 | 0 | 0 |
| 0 | 2 | 3 | 4 | 5 | 6 | 7 | 1 | 0 | 0 | 0 | 0 | 0 | 0 |
| 0 | 3 | 4 | 5 | 6 | 7 | 1 | 2 | 0 | 0 | 0 | 0 | 0 | 0 |
| 0 | 4 | 5 | 6 | 7 | 1 | 2 | 3 | 0 | 0 | 0 | 0 | 0 | 0 |
| 0 | 5 | 6 | 7 | 1 | 2 | 3 | 4 | 0 | 0 | 0 | 0 | 0 | 0 |
| 0 | 6 | 7 | 1 | 2 | 3 | 4 | 5 | 0 | 0 | 0 | 0 | 0 | 0 |
| 0 | 7 | 1 | 2 | 3 | 4 | 5 | 6 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 |

XOR16                                                                                    2100

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 1 | 0 | 3 | 2 | 5 | 4 | 7 | 6 | 9 | 8 | 11 | 10 | 13 | 12 | 15 | 14 |
| 2 | 3 | 0 | 1 | 6 | 7 | 4 | 5 | 10 | 11 | 8 | 9 | 14 | 15 | 12 | 13 |
| 3 | 2 | 1 | 0 | 7 | 6 | 5 | 4 | 11 | 10 | 9 | 8 | 15 | 14 | 13 | 12 |
| 4 | 5 | 6 | 7 | 0 | 1 | 2 | 3 | 12 | 13 | 14 | 15 | 8 | 9 | 10 | 11 |
| 5 | 4 | 7 | 6 | 1 | 0 | 3 | 2 | 13 | 12 | 15 | 14 | 9 | 8 | 11 | 10 |
| 6 | 7 | 4 | 5 | 2 | 3 | 0 | 1 | 14 | 15 | 12 | 13 | 10 | 11 | 8 | 9 |
| 7 | 6 | 5 | 4 | 3 | 2 | 1 | 0 | 15 | 14 | 13 | 12 | 11 | 10 | 9 | 8 |
| 8 | 9 | 10 | 11 | 12 | 13 | 14 | 15 | 0 | 1 | 2 | 3 | 4 | 5 | 6 | 7 |
| 9 | 8 | 11 | 10 | 13 | 12 | 15 | 14 | 1 | 0 | 3 | 2 | 5 | 4 | 7 | 6 |
| 10 | 11 | 8 | 9 | 14 | 15 | 12 | 13 | 2 | 3 | 0 | 1 | 6 | 7 | 4 | 5 |
| 11 | 10 | 9 | 8 | 15 | 14 | 13 | 12 | 3 | 2 | 1 | 0 | 7 | 6 | 5 | 4 |
| 12 | 13 | 14 | 15 | 8 | 9 | 10 | 11 | 4 | 5 | 6 | 7 | 0 | 1 | 2 | 3 |
| 13 | 12 | 15 | 14 | 9 | 8 | 11 | 10 | 5 | 4 | 7 | 6 | 1 | 0 | 3 | 2 |
| 14 | 15 | 12 | 13 | 10 | 11 | 8 | 9 | 6 | 7 | 4 | 5 | 2 | 3 | 0 | 1 |
| 15 | 14 | 13 | 12 | 11 | 10 | 9 | 8 | 7 | 6 | 5 | 4 | 3 | 2 | 1 | 0 |

FIG. 21

XOR16i                                                                                   2200

| 11 | 3 | 9 | 1 | 6 | 12 | 4 | 14 | 13 | 2 | 15 | 0 | 5 | 8 | 7 | 10 |
|----|---|---|---|---|----|---|----|----|---|----|---|---|---|---|----|
| 3 | 11 | 8 | 0 | 5 | 4 | 12 | 15 | 2 | 13 | 14 | 1 | 6 | 9 | 10 | 7 |
| 9 | 8 | 11 | 13 | 10 | 14 | 15 | 12 | 1 | 0 | 4 | 2 | 7 | 3 | 5 | 6 |
| 1 | 0 | 13 | 11 | 12 | 6 | 5 | 10 | 9 | 8 | 7 | 3 | 4 | 2 | 15 | 14 |
| 6 | 5 | 10 | 12 | 11 | 1 | 0 | 13 | 14 | 15 | 2 | 4 | 3 | 7 | 8 | 9 |
| 12 | 4 | 14 | 6 | 1 | 11 | 3 | 9 | 10 | 7 | 8 | 5 | 0 | 15 | 2 | 13 |
| 4 | 12 | 15 | 5 | 0 | 3 | 11 | 8 | 7 | 10 | 9 | 6 | 1 | 14 | 13 | 2 |
| 14 | 15 | 12 | 10 | 13 | 9 | 8 | 11 | 6 | 5 | 3 | 7 | 2 | 4 | 0 | 1 |
| 13 | 2 | 1 | 9 | 14 | 10 | 7 | 6 | 11 | 3 | 5 | 8 | 15 | 0 | 4 | 12 |
| 2 | 13 | 0 | 8 | 15 | 7 | 10 | 5 | 3 | 11 | 6 | 9 | 14 | 1 | 12 | 4 |
| 15 | 14 | 4 | 7 | 2 | 8 | 9 | 3 | 5 | 6 | 11 | 10 | 13 | 12 | 1 | 0 |
| 0 | 1 | 2 | 3 | 4 | 5 | 6 | 7 | 8 | 9 | 10 | 11 | 12 | 13 | 14 | 15 |
| 5 | 6 | 7 | 4 | 3 | 0 | 1 | 2 | 15 | 14 | 13 | 12 | 11 | 10 | 9 | 8 |
| 8 | 9 | 3 | 2 | 7 | 15 | 14 | 4 | 0 | 1 | 12 | 13 | 10 | 11 | 6 | 5 |
| 7 | 10 | 5 | 15 | 8 | 2 | 13 | 0 | 4 | 12 | 1 | 14 | 9 | 6 | 11 | 3 |
| 10 | 7 | 6 | 14 | 9 | 13 | 2 | 1 | 12 | 4 | 0 | 15 | 8 | 5 | 3 | 11 |

| 0 | 1 | 11 | 3 | 1 | 11 | 3 | 0 | 1 | 0 | 1 | 11 | 0 | 3 | 11 | 3 |
|---|---|----|---|---|----|---|---|---|---|---|----|---|---|----|---|
| 0 | 0 | 3 | 3 | 0 | 3 | 3 | 0 | 0 | 0 | 0 | 3 | 0 | 3 | 3 | 3 |
| 0 | 0 | 9 | 0 | 12 | 12 | 12 | 7 | 9 | 9 | 7 | 0 | 12 | 9 | 7 | 7 |
| 0 | 1 | 1 | 0 | 1 | 1 | 0 | 0 | 1 | 0 | 1 | 1 | 0 | 0 | 1 | 0 |
| 0 | 0 | 6 | 3 | 12 | 6 | 6 | 0 | 12 | 12 | 0 | 3 | 12 | 6 | 3 | 3 |
| 0 | 0 | 12 | 0 | 12 | 12 | 12 | 0 | 12 | 12 | 0 | 0 | 12 | 12 | 0 | 0 |
| 0 | 1 | 4 | 0 | 4 | 4 | 12 | 0 | 4 | 12 | 1 | 1 | 12 | 12 | 1 | 0 |
| 0 | 1 | 14 | 3 | 1 | 11 | 3 | 7 | 10 | 7 | 10 | 11 | 0 | 15 | 14 | 15 |
| 0 | 0 | 13 | 3 | 12 | 6 | 6 | 7 | 9 | 9 | 7 | 3 | 12 | 13 | 15 | 15 |
| 0 | 1 | 2 | 3 | 4 | 5 | 6 | 7 | 8 | 9 | 10 | 11 | 12 | 13 | 14 | 15 |
| 0 | 0 | 15 | 3 | 0 | 3 | 3 | 7 | 7 | 7 | 7 | 3 | 0 | 15 | 15 | 15 |
| 0 | 0 | 0 | 0 | 0 | 0 | 0 | 0 | 0 | 0 | 0 | 0 | 0 | 0 | 0 | 0 |
| 0 | 1 | 5 | 3 | 4 | 5 | 6 | 0 | 4 | 12 | 1 | 11 | 12 | 6 | 11 | 3 |
| 0 | 1 | 8 | 0 | 4 | 4 | 12 | 7 | 8 | 9 | 10 | 1 | 12 | 9 | 10 | 7 |
| 0 | 0 | 7 | 0 | 0 | 0 | 0 | 7 | 7 | 7 | 7 | 0 | 0 | 7 | 7 | 7 |
| 0 | 1 | 10 | 0 | 1 | 1 | 0 | 7 | 10 | 7 | 10 | 1 | 0 | 7 | 10 | 7 |

FIG. 23

$$\mathbb{Z}_{13}^{7\times 4} \qquad \mathbb{Z}_{13}^{4\times 1} \qquad \mathbb{Z}_{13}^{7\times 1}$$

$$A = \begin{bmatrix} 4 & 1 & 11 & 10 \\ 5 & 5 & 9 & 5 \\ 3 & 9 & 0 & 10 \\ 1 & 3 & 3 & 2 \\ 12 & 7 & 3 & 4 \\ 6 & 5 & 11 & 4 \\ 3 & 3 & 5 & 0 \end{bmatrix} \quad * \quad x = \begin{bmatrix} x1 \\ x2 \\ x3 \\ x4 \end{bmatrix} \quad = \quad b = \begin{bmatrix} 4 \\ 8 \\ 1 \\ 10 \\ 4 \\ 12 \\ 9 \end{bmatrix}$$

known     unknown     known     FIG. 26

$$A = \begin{bmatrix} 4 & 1 & 11 & 10 \\ 5 & 5 & 9 & 5 \\ 3 & 9 & 0 & 10 \\ 1 & 3 & 3 & 2 \\ 12 & 7 & 3 & 4 \\ 6 & 5 & 11 & 4 \\ 3 & 3 & 5 & 0 \end{bmatrix} \quad * \quad x = \begin{bmatrix} x1 \\ x2 \\ x3 \\ x4 \end{bmatrix} \quad + \quad \begin{bmatrix} 0 \\ -1 \\ 1 \\ 1 \\ 1 \\ 0 \\ -1 \end{bmatrix} \quad = \quad b = \begin{bmatrix} 4 \\ 7 \\ 2 \\ 11 \\ 5 \\ 12 \\ 8 \end{bmatrix}$$

known     unknown     unknown     known     FIG. 27

$$A = \begin{bmatrix} 4 & 1 & 11 & 10 \\ 5 & 5 & 9 & 5 \\ 3 & 9 & 0 & 10 \\ 1 & 3 & 3 & 2 \end{bmatrix} \quad \otimes_1 \quad x = \begin{bmatrix} x1 \\ x2 \\ x3 \\ x4 \end{bmatrix} \quad \oplus_2 \quad EV = \begin{bmatrix} 1 \\ 2 \\ 3 \\ 4 \end{bmatrix} \quad = \quad br = \begin{bmatrix} 5 \\ 9 \\ 4 \\ 1 \end{bmatrix}$$

known     unknown     unknown     known     FIG. 28

CRYPTOGRAPHIC COMPUTER MACHINES WITH NOVEL SWITCHING DEVICES

CROSS-REFERENCE TO RELATED APPLICATIONS

This application claims the benefit and is a continuation-in-part of U.S. patent application Ser. No. 14/975,841 filed on Dec. 20, 2015, which claims the benefit and is a continuation-in-part of U.S. patent application Ser. No. 14/622,860 filed on Feb. 14, 2015, now U.S. Pat. No. 9,218,158, which claims the benefit and is a continuation of U.S. patent application Ser. No. 14/064,089 filed on Oct. 25, 2013, abandoned, which claims the benefit and is a continuation-in-part of U.S. patent application Ser. No. 12/980,504 filed on Dec. 29, 2010, now U.S. Pat. No. 8,577,026 all of which are incorporated herein by reference. This application claims the benefit of and is a continuation-in-part of patent application Ser. No. 15/442,556 filed on Feb. 24, 2017, which claims the benefit of and is a continuation-in-part of patent application Ser. No. 15/244,985 filed on Aug. 23, 2016, which claims the benefit of and is a continuation-in-part of patent application Ser. No. 14/975,841 filed on Dec. 20, 2015 which is a continuation-in-part and claims the benefit of patent application Ser. No. 14/622,860 filed on Feb. 14, 2015 now U.S. Pat. No. 9,218,158 issued on Dec. 22, 2015 which claims the benefit and is a continuation of patent application Ser. No. 14/064,089 filed on Oct. 25, 2013, abandoned, which is a continuation in part of patent application Ser. No. 12/980,504 filed on Dec. 29, 2010 now U.S. Pat. No. 8,577,026 issued on Nov. 5, 2013, all of which are incorporated herein by reference. This application claims the benefit of U.S. Provisional Patent Application No. 62/610,921 filed on Dec. 27, 2017, which is incorporated herein by reference. All the above U.S. Patent Applications and Patents are incorporated herein by reference in their entirety.

BACKGROUND OF THE INVENTION

The present invention relates to apparatus and methods for computer cryptography that provide increased security by modifying proven cryptography methods. Computer cryptography is different from human cryptography in the sense that operations are performed by digital switching machines operating on signals, usually electromagnetic or electrical signals that represent symbols. Furthermore, the computers work on a scale that cannot be matched within a human lifetime by any human or number of humans. While it is possible for a human to model a computer executed cryptographic procedure it is not feasible for a human to perform computer cryptography. Successful attack of cryptographic signal exchange by a human activity even with pencil and paper is practically impossible. Furthermore, in computer cryptography it is impossible for any computer to successfully attack a signal within a feasible time frame and even within years. Cryptography thus has moved from a human activity to a computer activity. As computing machines have become more powerful, the conditions for successful computer cryptography have become more demanding.

Accordingly, novel and improved cryptographic computers and methods are required that provide a sufficient level of security while not increasing demands on computer resources.

SUMMARY OF THE INVENTION

In accordance with an aspect of the present invention, cryptographic apparatus and methods are provided that perform modified known cryptographic methods, including encryption/decryption, public-key cryptography, message digest cryptography and elliptic curve cryptography, wherein at least one known n-state switching operation is replaced by a modified n-state switching operation, wherein a modification is achieved by modifying the n-state operation in accordance with a Finite Lab-Transform (FLT). The FLT includes transforming input n-state data which represent input signals with a first n-state reversible inverter and transforming data outputted by the n-state switching operation by a second n-state reversible inverter. In one embodiment a combination of the first and second n-state inverter establish an n-state identity inverter. Herein n is a positive integer with n>2 or n>5 or n>64 or n>256 or n is very large with n being a positive integer having more than 50 digits.

The n-state switching operation is one of several n-state switching operations in a computer device as commonly used in cryptography and are usually characterized by one of the following operations: a modulo-n addition, a known addition over a finite field GF(n), a modulo-n multiplication and a known multiplication over a finite field GF(n). A known operation over a finite field GF(n) is either a modulo-n addition or modulo-n multiplication when n is a prime number, or it is defined by a primitive polynomial when $n=q^p$ with q being prime >1 and p is 2 or greater. In accordance with an aspect of the present invention, application of the FLT creates a modified n-state switching operation that is no longer known as defined above. Certain FLTs do create known additions and/or multiplications over $GF(n=q^p)$. In accordance with an aspect of the present invention such FLTs are discarded and are not applied. That is: if an FLT of an n-state operation creates a modified n-state switching operation that is a known n-state switching operation then that modified n-state operation is not applied as a replacement in a cryptographic operation.

In accordance with an aspect of the present invention the application of a modified n-state switching operation that is a previously unknown n-state switching operation causes a cryptographic method to generate data or to operate in a manner that is unpredictable and that renders the thus modified cryptographic method and cryptographic apparatus less sensitive to successful attacks or successful cryptanalysis. The apparatus and methods of the present invention are thus more secure than previous devices. This improvement is achieved by the novel functionality provided by the FLT or, when properly implemented, changes and improves an instruction architecture of a computing device.

DESCRIPTION OF THE DRAWINGS

FIG. 7 is a screenshot of a computer stored program that executes an FLT in accordance with an aspect of the present invention;

FIG. 12 is a screenshot of a computer stored program that executes a modified FLT in accordance with an aspect of the present invention;

FIGS. 13, 14, 15, 16 and 17 are screenshots of computer generated n-state switching functions tables;

FIG. 18 illustrates a device that performs a Finite Lab-transform (FLT) in accordance with an aspect of the present invention;

FIGS. 19, 20, 21, 22 and 23 are screenshots of computer generated n-state switching functions tables;

FIGS. 26 and 27 illustrate aspects of Learning with Errors (LWE) cryptography;

FIG. 28 illustrates LWE in accordance with an aspect of the present invention.

DESCRIPTION OF VARIOUS EMBODIMENTS

Figures 1, 2, 3:
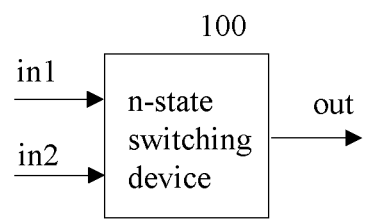
FIG. 1 illustrates in diagram an n-state digital gate.
FIGS. 2, 3, 4 and 5 are screenshots of computer generated n-state switching functions tables.

The term n-valued or n-state herein is used generally as non-binary wherein n>2, unless the binary case is included. Herein also the term n-state symbol is used. An n-state symbol is a symbol that has one of n states. A symbol herein is a representation of a signal generated by or inputted to an apparatus. An n-state symbol can be representing a single n-state signal; it can also represent a plurality of signals such as binary signals.

A symbol is a representation for human interpretation. While the term symbol is used herein to explain aspects of the present invention, it is to be understood that symbols in a technical sense are representations of circuit states or signal states.

Switching behavior of physical devices such as electro-mechanical relays, TTL transistor devices and CMOS integrated circuits is described by using logic expressions, often called Boolean logic, which applies binary logic states, often named 0 and 1. A first systematic approach in description and design of switching circuits, now called logic circuits, was published in an MIT thesis dated 1938 "A symbolic analysis of relay and switching circuits" by Claude Elwood Shannon which is incorporated herein by reference. Shannon represented a "hinderance of a closed circuit" (hinderance is impedance) by 0 and the "hinderance of an open circuit" by 1. The impedance of an open circuit is physically large, indicating that 0 and 1 are mere labels or representations and not actual values of a physical phenomenon. Such labeling is possible because, within certain margins, the impedance assumes one of 2 physical states (open or closed) and thus can be represented by 2 arbitrary numbers.

The use of 0 and 1 as representative states of physical states continues to this date in electronic switching devices, also called logic devices and incorporated in devices such as processors, memories and individual discrete electronic switching devices. A switching n-state device is a physical device that is able to assume one of n (with n an integer being 2 or greater) different physical states as a result of one, two or more physical inputs that also are able to assume at least one of n discrete physical states. A state of a device is usually (but not necessarily) determined as an output signal which can be electrical, optical, electromechanical, quantum-mechanical, mechanical, chemical or any other measurable physical state.

Discrete binary switching devices are well known. Discrete input and output signal values in electronic devices are described in datasheets related to these devices. Commonly the switching levels are indicated as Low and High levels, which in functional description may be represented by 0 and 1. In circuits it is necessary to match signal and impedance levels, so actual voltages are provided in datasheets. A label to a physical state, like 3 and 5, or Blue and Red may be used, but 0 and 1 are generally used.

A switching device characterized as an XOR function has the following switching characteristics:

| XOR | Low | High |
|---|---|---|
| Low | Low | High |
| High | High | Low |

For instance the XOR device SN74LVC1G86, marketed by Texas Instruments Inc. of Dallas, Tex., is described in Datasheet SCES222Q—April 1999—REVISED June 2017, published online at http://www.ti.com/lit/ds/symlink/sn74lvc1g86.pdf, which is incorporated herein by reference. A Low signal in this device is defined as 0.35*Vcc and a High level as 0.65*Vcc. One has to consider these levels in circuit design and the designation 0 and 1 are useless for that purpose.

For application design purposes the 0 and 1 representation is very beneficial if one names the Low physical state 0 and the High physical state 1. In that case the representation of the switching table can be provided as:

| XOR | 0 | 1 |
|---|---|---|
| 0 | 0 | 1 |
| 1 | 1 | 0 |

The representation of the functional behavior of the XOR device now is identical to the truth table of a modulo-2 addition. Because Low and High levels, even with different physical devices, are maintained and can be matched even with different technologies, it appears functionally that a plurality of discrete switching devices processes in accordance with 0s and 1s. This concept of logic states (or labels) corresponding to physical states of devices in now so widely used that one generally talks about logic devices and devices performing logic or even arithmetic. In the context of aspects of the present invention the distinction between logic description of devices and their physical realization is recognized and is maintained. A device that performs a switching operation in accordance with an XOR device actually performs a physical switching operation and does not perform logic or arithmetic. One can easily check with the SN74LVC1G86 that two inputs being Low (for instance 0.7 Volt) will also generate a Low output of around 0.7 Volt. If the circuit performed an actual addition, the result would have been 1.4 Volt, which is not the case.

The physical switching properties of devices such as an XOR device have some interesting features that correspond to properties of the logic representation. For instance the XOR device is commutative: XOR(a,b)=XOR(b,a); the device is associative: d11=XOR(a,b), d=XOR(d11,c) and d12=XOR(a,c), d=XOR(b,d12); the device has an inverse operation XOR(a,b)=c and XOR(a,c)=b; the XOR operation on binary elements Low and High is closed; and there is a zero or neutral element z so that XOR(a,z)=a (the zero element is Low or 0 in its describing logic state).

A binary AND switching device, such as the SN74AHIC1G08 Single 2-Input Positive-AND Gate is marketed by Texas Instruments of Dallas, Tex. and described in an on-line datasheet that is published as http://www.ti.com/lit/ds/symlink/sn74ahc1g08.pdf and is incorporated herein by reference. The AND gate is often described as a modulo-2 multiplication. The switching performance of this gate has some identical properties as the modulo-2 multiplication: the switching of two inputs is commutative, associative, reversible except for the zero element and closed. There is a zero element z so that AND(z,a)=z no matter what a is and there is a one element o so that AND(0,a)=a no matter what a is (a being selected from valid input signals). Together the devices XOR and AND distribute: s1=XOR(a,b) and p1=AND(c,s1) is identical to: t1=AND(a,c), t2=AND(b,c), and s2=XOR(t1,t2)=AND(c,s1).

Neither the XOR device nor the AND device perform an arithmetical operation. The addition being an arithmetical summation and the multiplication being an arithmetical repeat addition, are not performed by the above discrete electronic devices.

Many cryptographic devices apply circuitry that is provided an arithmetical name, like modulo-n addition, modulo-n multiplication or more general addition and multiplication over a finite field GF(n). A closer look reveals that the actual circuitry that performs these operations is discrete binary switching circuitry that performs switching operations and not actual arithmetic. It is known that current computer cryptography requires processing of large integer representations. Circuitry in processors is being optimized for these large representations is offered in Intel processors as exemplified by the paper New Instructions Supporting Large Integer Arithmetic on Intel® Architecture Processors published on-line at https://www.intel.com/content/dam/www/public/us/en/documents/white-papers/ia-large-integer-arithmetic-paper.pdf which is incorporated herein by reference.

Additions and multiplications over a finite field GF(n), or additions and/or multiplications defined over a group describe n-state switching devices that have finite field or group properties of these operations. However, the field or group properties are inherent to the mathematical description, but they are not inherent to the machine switching devices. For instance, in the mathematical description the zero-element is commonly 0 and the one-element is commonly 1. The one-element for instance is of significance because it is used to define for instance an inverse of an operation, for instance the multiplicative inverse. Computer operations are currently designed to emulate the designation of the zero-element being 0. That is: if an n-state switching operation 'mn' is designated as an n-state multiplication over GF(n) then mn(a,0)=0 and mn(a,1)=a for all valid representations of 'a'. That means that if an input signal is provided with the meaning 0, then the output of the switching device 'mn' is always provided with output value 0, etc. The meanings of input and output values of binary and n-state operations, commonly named additions and multiplications over GF(n) comply with generally accepted rules of addition and multiplication in that regard.

Circuits that are named after their commonly known arithmetical names such as addition and multiplication are in fact physical circuits with certain properties identical to those of a finite field or a group. It is an aspect of the present invention to create circuits that have properties of a finite field or group for instance (such as being commutative, associative, distributive, invertible and having a zero-element and one-element) but wherein the zero-element in not 0 and/or the one-element is not 1. In a further variant one may have an n-state addition and/or multiplication wherein the zero-element is 0 and the one-element is 1, but other elements are arranged differently compared to a standard n-state corresponding operation. One may call those switching operations an addition and/or a multiplication over an alternate finite field. It is to be understood that this name is applied to switching devices and has no actual prior mathematical meaning.

The inventor knows of no meaningful operations similar to but different from the normal mathematical operations in applied mathematics that can be designated as an alternate finite field. A mathematical addition or multiplication wherein the zero-element is not zero or the one-element is not 1 is unknown and is meaningless in the context of mathematics. But the corresponding n-state switching operations are meaningful as they process signals in a deterministic and often invertible way that is useful in cryptographic computers.

A consecutive n-state multiplication is characterized by the expression prod(i1,i2,n)=mod((i1+i2−1),n)+(((i1+i2−1)>=n)*1) for n>0 and prod(0,0,n)=0 and prod(0,a,n)=0 for any valid a. This expression defines the states of an n-state switching device as a result of 2 n-state inputs. An advantage of the consecutive n-state multiplication is that it can be construed for any integer value of n and is not limited to n being prime or a power of a prime. This n-state switching function is commutative, associative and invertible (except for the 0) with zero-element 0 and one-element 1. This multiplication type switching function is often used as a switching operation described as defining a finite field $GF(n=p^k)$. This simplifies the construction of the multiplication-like switching function.

One may also generate the addition-type n-state switching function (for instance in $GF(n=2^k)$) by naming each elements as its binary word representation and by bitwise XORing the bits of the n-state elements. The generation of the corresponding multiplication-like n-state switching function is formed by a remainder of a multiplication of n-state binary words over the binary representation of a generating polynomial (LFSR) of the field.

While the terms addition, addition-like, multiplication and multiplication-like and finite field and the like are used herein, it is again explicitly stated that these are mere descriptions of n-state switching functions and devices that do not perform any known arithmetic operation, but only physical switching. An alternative way would be to call an n-state addition-like operation "n-state operation1" and an n-state multiplication-like operation "n-state operation2."

N-state operation is a description of 2-input/1-output n-state device enabled to perform a reversible operation that is commutative and associative and described by an n by n switching matrix of n rows and n columns, each row being different from any other row in the matrix, wherein one row is an identity inverter, wherein a row in the matrix is determined by a state of the first input of the device and a column in the matrix is determined by a state of the second input of the device to determine a state of the output of the device. All elements in a row of the matrix are different from each other and all elements in a column of the matrix are different from each other. The elements of matrix may be represented by integers 0, 1, 2, . . . , n−1. The integers represent a physical state of an input and/or output that generally have values of physical phenomena that are not actually the representing integers. A known standard operation1 device is known as additions over GF(n) and can be described symbolically by "scn." For these standard operation1 devices scn(0,0)=0 and scn(0,a)=a.

N-state operation2 is a description of 2-input/1-output n-state device enabled to perform a reversible operation except for the zero-element that is commutative and associative and described by an n by n switching matrix of n rows and n columns, each row being different from any other row in the matrix, wherein one row is an identity inverter, and one row is a zero-element row wherein a row in the matrix is determined by a state of the first input of the device and a column in the matrix is determined by a state of the second input of the device to determine a state of the output of the device. All elements in a row of the matrix except for a row or column determined by a zero-element are different from each other and all elements in a column of the matrix are different from each other. The elements of matrix may be represented by integers 0, 1, 2, . . . , n−1. The integers represent a physical state of an input and/or output that generally have values of physical phenomena that are not actually the representing integers. Certain standard operation2 devices are known as multiplications over GF(n) and can be described symbolically by "mn." For these standard operation2 devices mn(0,0)=0 and mn(0,a)=0, and mn(1,a)=a.

A further property of operation1 and operation2 devices is that operation2 distributes over operation1.Or: s=scn(a,b) and r1=mn(c,s) and: p1=mn(a,c) and p2=mn(b,c) and r2=scn (p1,p2) then r2=r1.

As illustration a number of n-state switching devices will be provided and their corresponding n-state switching tables. FIG. 1 is a diagram of a 2-input/1-output n-state switching device 100 with inputs in1 and in2 enabled to each receive an n-state physical signal and an output 'out' enabled to provide a physical n-state signal. An n-state signal may be a single signal enabled to assume one of n states or a combination of 2 or more signals in combination enabled to have one of n states such as a word of bits. The switching or processing of signals from in1/in2 to out takes place in accordance with an n-state switching function table implemented or realized in physical components in device 100. Such a device may be an addressable memory such as RAM, ROM, PROM or a magnetic or optical non-transitory medium and the like or a device such as a Field Programmable Gate Array (FPGA) or an active combinational circuit of discrete components. The n-state switching function table may be stored directly on the addressable memory. The device may also be realized in discrete switching components and designed using know methods such as Karnaugh diagram/map wherein the switching table is transformed into a circuit of components such as AND or NAND devices. In yet a further embodiment the device 100 is a processor with instructions wherein a generating rule is implemented that generates individual states corresponding to output states of the n-state switching function table. For instance the operation1 over $GF(2^k)$ also called the addition over $GF(2^k)$ is the machine operation of k XOR devices. An operation2 over GF(n) with n being prime greater than 2 is in fact a machine operation usually performed by the ALU (arithmetic logic unit) circuit in a processor.

An example of a standard operation1 and operation2 device implemented on device 100 is described by the 7-state switching function tables provided in FIG. 2, wherein 201 is the 7-state switching function table of a 7-state operation1 device and 202 is the 7-state switching function table of a 7-state operation2 device.

An example of a standard operation1 and operation2 device implemented on device 100 is described by the 8-state switching function tables provided in FIG. 3, wherein 301 is the 8-state switching function table of an 8-state operation1 device and 302 is the 8-state switching function table of an 8-state operation2 device. The operation1 table 301 is from a straightforward XORing of 3-bits words and the operation2 table 302 is from a remainder of polynomial determined in Matlab by vector [1 0 1 1].

Figure 4:
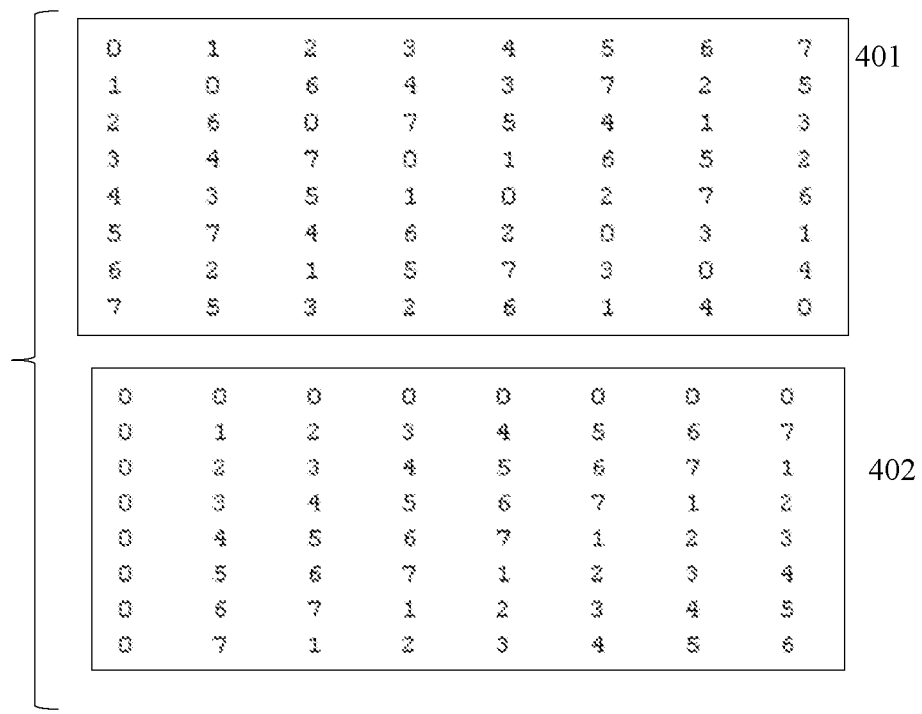

An example of a standard operation1 and operation2 device implemented on device 100 is described by the 8-state switching function tables provided in FIG. 4, wherein 401 is the 8-state switching function table of an 8-state operation1 device and 402 is the 8-state switching function table of an 8-state operation2 device. The operation1 table 401 is from a XORing of 3-bits words based on consecutive contents of an LFSR and the operation2 table 402 is from consecutive states as described earlier above.

Figure 5:
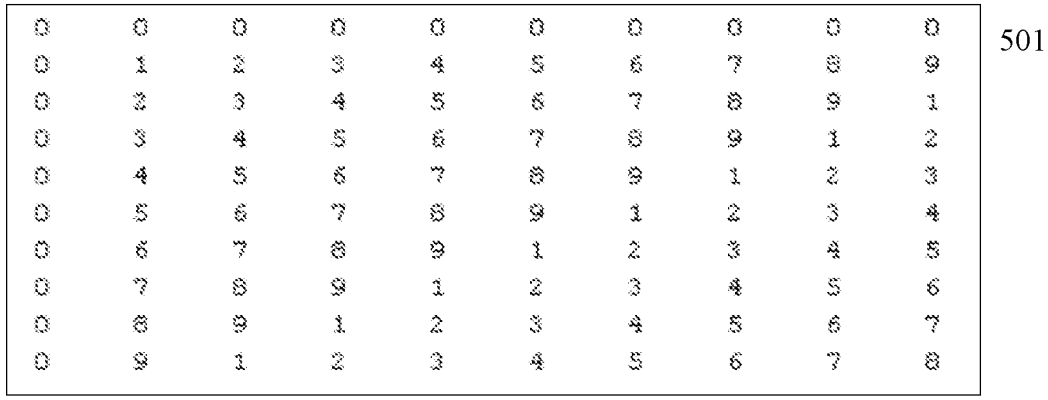

No operation1 and operation2 devices described by finite field $GF(p*q)$ such as GF(10) are known. However, one can create a device that operates as defined by a multiplicative group with n elements wherein only the zero-element 0 is not invertible. Such a device is defined by an n-state operation2 switching function table defined earlier as a consecutive multiplication. Such a function, when n is known is predictable and by itself is not a very secure device. An example of a 10-state operation2 device is provided in FIG. 1 100 that implements the 10-state switching function table 501 in FIG. 5. A simple check will show that operation2 as determined by 501 is invertible for all elements except for 0, the operation is associative and there is a one-element 1 that can be used to define a multiplicative inverse of each element.

In accordance with an aspect of the present invention a device is provided that implements an operation1 type device that complies with all requirements of the earlier provided operation1 properties except for the property that the zero-element is 0 (scn(0,a)=a). The modified property is now that the new operation1 device has all the properties of an operation1 device (invertible, commutative and associative) but that the zero-element (sometimes called a neutral element) is not 0. Symbolically call the n-state operation2 performed by the device 'scni'. Then scni(z,a)=a for any 'a' when 'z' is a zero-element that does not represent 0 and all descriptive elements are selected from (0, 1, 2, . . . n−1).

A similar operation2 device is provided, which is a device that complies with all the properties of the previously explained operation2 device but wherein the zero-element is not 0. Symbolically call the n-state operation1 performed by the operation2 device 'mni'. Then mni(z,a)=z for any 'a' when 'z' is a zero element that does not represent 0 and all descriptive elements are selected from (0, 1, 2, . . . n−1). In addition an n-state operation2 device is provided in accordance with an aspect of the present invention, which is a device that complies with all the properties of the previously explained operation2 device but wherein the one-element is not 1. Symbolically call the n-state operation performed by the operation2 device 'mni'. Then mni(e,a)=a for any 'a' when 'e' is a one-element that does not represent 1 and all descriptive elements are selected from (0, 1, 2, . . . n−1). The n-state switching tables of FIG. 2, FIG. 3, FIG. 4 and FIG. 5 are screenshots generated by a Matlab program on a computer.

U.S. Pat. No. 8,577,026 issued on Nov. 5, 2013, which is incorporated by reference herein, teaches devices with operation1 and operation2 n-state switching function tables that combined define a finite field. U.S. patent application Ser. No. 14/064,089 filed on Oct. 25, 2013, which is incorporated herein by reference, teaches how the n-state switching function tables and related devices can be created. This is again illustrated in FIG. 6. A device 600 with inputs 601 and 602 and output 607 implements an n-state function switching table. The device 600 has connected to input 601 an n-state inverter inv1 with input 603 and an identical inverter inv1 with input 605 connected to input 602. An n-state signal i1 is provided on 603 and an input signal i2 is provided on 605. Output 607 has connected an inverter inv2 with output 612. Thus as a result of input n-state signals i1 and i2 an n-state output signal out is provided on 612. The device 600 between inputs 601 and 602 and output 607 is characterized by an n-state switching function table 'matn'. The device between inputs 603 and 605 and output 612 is characterized by an n-state switching function table 'matni' wherein 'matni' is 'matn' modified in accordance with inverters inv1 and inv2.

In one embodiment of the present invention n-state inverter inv2 is related to or is derived from n-state inverter inv1. In one embodiment of the present invention inv2 is the reversing inverter of inv1 or in other words, inv1 and inv2 in combination establish unity, or inv1(inv2(a))=a and inv2 (inv1(a))=a.

An n-state inverter is a device that modifies each signal having one of n states into a signal also having one of n-states. For convenience n states are represented by integers 0, 1, 2, . . . , n−1. This is not required. For instance the states may also be represented as 1, 2, . . . , n. However, in general one applies a representation wherein a zero-element is 0. An n-state inverters can be represented as [0, 1 2 . . . n−1]→ [out0 out1 out2 . . . out(n−1)] wherein out0, out1, out(n−1) are also selected from [0 1 2 . . . n−1]. Keeping in mind that the integers are only labels that represent signals that may have other values. In the above notation a position of a potent input state in [0 12 . . . n−1] represents a position as well as a corresponding state. The vector [out0 out1 out2 . . . out(n−1)] represents output state out0 as a result of input state 0, output state out1 as a result of input state 1 and output state out(n−1) as a result of input state n−1. Accordingly a state in [out0 out1 out2 . . . out(n−1)] is a result of the input state corresponding to the position of the output state. Preferably, selected inverters are reversible or invertible n-state inverters. This means that each of n states appears only once in [out0 out1 out2 . . . out(n−1)].

As an example a reversible 5-state inverter is inv1=[0 1 2 3 4]→[3 1 0 4 2]. One can easily determine that the reversing inverter of this inverter is inv2=[0 12 3 4]→[2 1 4 0 3]. For instance inv1(0)=3 and inv2(3)=0; inv1(4)=2 and inv2(2)=4. Because the input is always [0 1 2 . . . n−1] an n-state inverter is characterized by its output. Accordingly inv1=[3 1 0 4 2] and inv2=[2 1 4 03] in the 5-state example. There are n! (factorial n) different reversible n-state inverters, including the identity inverter. The identity inverter is the inverter that lets states being unchanged: inv(x)=x.

The transformation of an n-state switching function table with inverters at the input and the reversing inverter at the output is called a Lab-transform or Finite Lab-Transform or FLT of an n-state switching function table. Script of a Matlab program performing the Finite Lab-transform of an n-state switching function table on a Windows computer is shown in FIG. 7. The program when executed immediately implements the FLT transformed table in memory.

An important property of the FLT is that while it transforms elements of an n-state switching function table it leaves meta-properties unchanged. This means that a table that represents a commutative, associative operation with a zero-elements and if applicable a one-element, then the FLT transformed table has the same meta-properties, be it with often different meanings of states, like the zero-element and the one-element. If two n-state switching function tables also distribute then their Lab-transformed versions also distribute.

Figure 8:
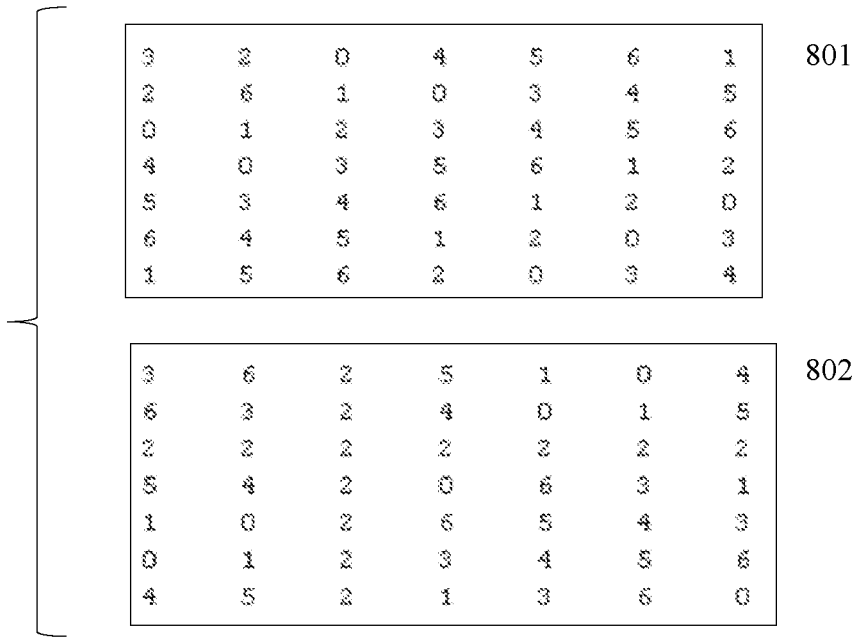
FIGS. 8, 9, 10, and 11 are screenshots of computer generated n-state switching functions tables.
Figure 9:
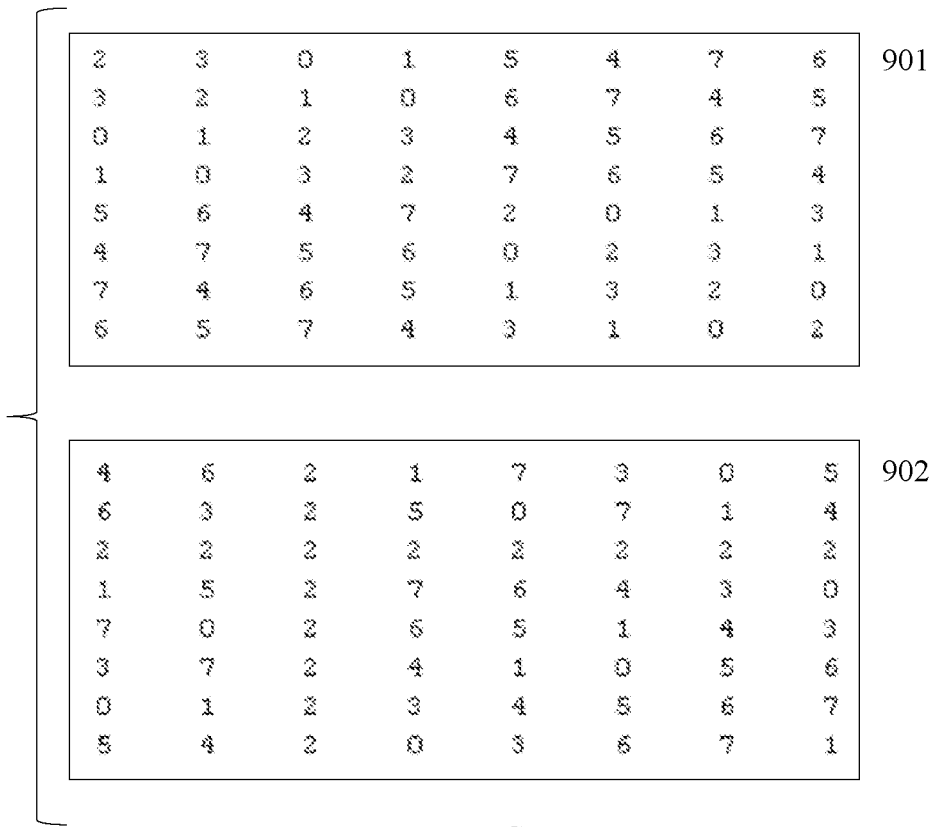
Figure 10:
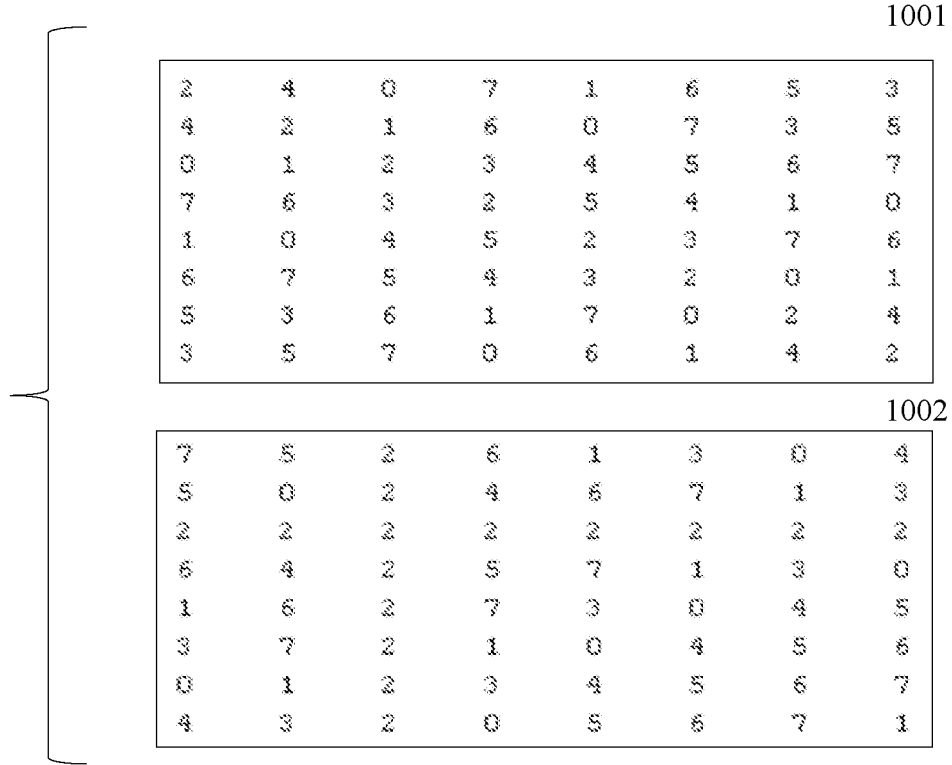
Figure 11:
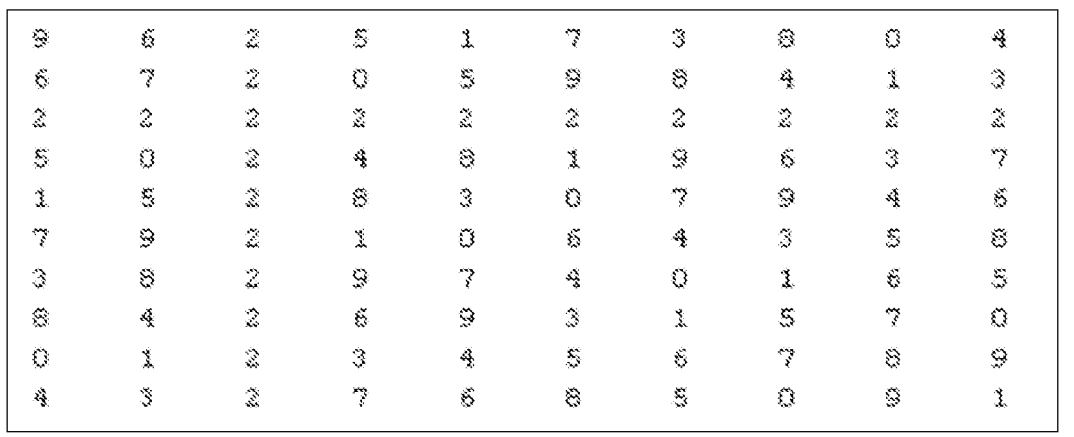
Figure 13:
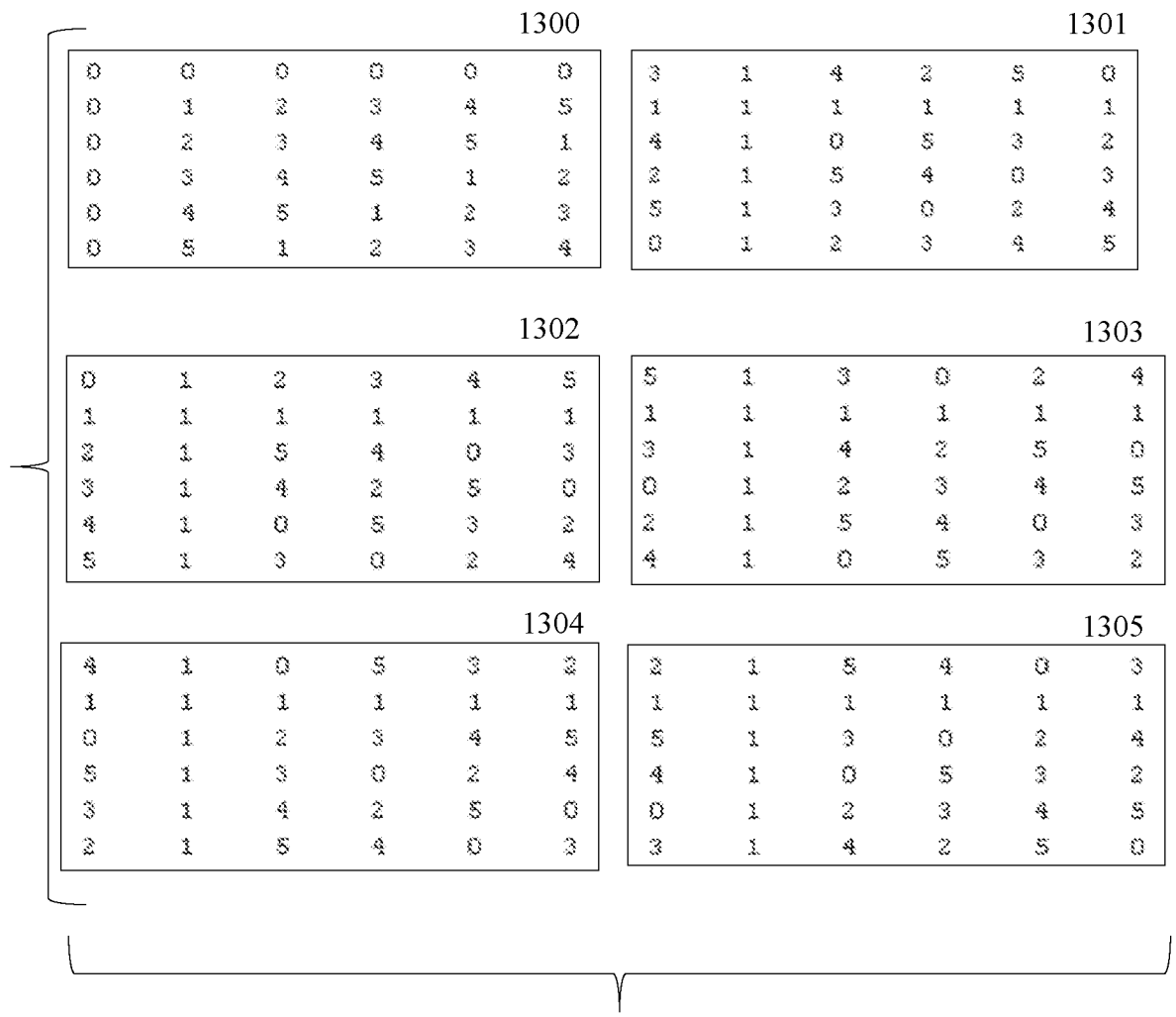

As illustrative examples, the n-state switching function tables shown in FIGS. 2, 3, 4 and 5 will be Lab-transformed. The screenshot table 801 in FIG. 8 is the FLT of 7-state table 201 in FIG. 2, using inverter inv7=[2 5 0 4 6 1 3], now with zero-element being 2. Screenshot table 802 in FIG. 8 is the LFT of 7-state table 202 in FIG. 2 using inverter inv7=[2 5 0 4 6 1 3], now with zero-element 2 and one-element 6. One should keep in mind that the Matlab programs are executed in origin 1, while commonly signals are represented in origin 0. The screenshot table 901 in FIG. 9 is the FLT of 8-state table 301 in FIG. 3 and screenshot table 902 in FIG. 9 is the LFT of 8-state table 302 in FIG. 3 using inverter inv8=[2 5 0 7 4 6 1 3]. The zero-element of 8-state table 901 is 2 and one-element in table 902 is 7. The screenshot table 1001 in FIG. 10 is the FLT of 8-state table 401 in FIG. 4 and screenshot table 1002 in FIG. 10 is the LFT of 8-state table 402 in FIG. 4 using inverter inv8=[2 5 0 7 4 6 1 3]. The zero-element of 8-state table 1001 is 2 and one-element in table 1002 is 7. The screenshot table 1101 in FIG. 11 is the FLT of 10-state table 501 in FIG. 5 using inverter inv10=[2 5 0 7 4 8 6 9 1 3]. The zero-element of 10-state table 1101 is 2 and one-element in table 1101 is 8.

Diffie-Hellman and RSA are examples of public key cryptography. Herein public key parameters are exchanged between two computers. The two computers each apply multiplications or what are called herein operation2 devices with a zero-element and a one-element. In accordance with an aspect of the present invention a modified Finite Lab-transform or mFLT is provided. In the mFLT the output inverter is not the reversing inverter of an input inverter. However, the mFLT transformed n-state switching function table still retains the properties of its original n-state switching function table. Script of a Matlab program performing the modified Finite Lab-transform (mFLT) of an n-state switching function table on a Windows computer is shown in FIG. 12. The program when executed immediately implements the mFLT transformed table in memory.

The Matlab instruction for a mFLT is labtransformp(table, invx, invy) wherein table is the to be transformed n-state switching function table, invx is the n-state inverter at the inputs and invy is the n-state inverter at the output. There are only a limited number of combinations of invx and invy that retain properties of 'table'. For each invx n-state inverter there are at most n matching n-state inverters invy that retain the properties of 'table' wherein one of the n n-state inverters is the reversing inverter of n-state inverter invx, when 'table' represents an operation1 (an addition-like) operation. There are similarly (n−1) matching n-state inverters invy to invx of which one is the reversing inverter when 'table' represents an operation2 type (multiplication like) operation.

For illustrative purposes possible mFLT transformed 6-state operation2 switching function tables 1301, 1302, 1303, 1304 and 1305 from table 1300 are provided as generated by the mFLT program as shown in screenshot of FIG. 12. Table 1300 shows a standard representation of a switching table of a 6-state consecutive multiplication. As inv1 of FIG. 6 or invy of the program the inverter inv62=[5 0 1 2 3 4] is selected. The matching inverters invx that will retain the properties of 1300 are invx1=[1 0 2 4 5 3] leading to table 1301; invx2=[2 0 3 5 1 4] leading to table 1302; invx3=[3 0 4 1 2 5] leading to table 1303, wherein invx3 is the reversing inverter of invy; invx4=[4 0 5 2 3 1] leading to table 1304; and invx5=[5 0 1 3 4 2] leading to table 1305.

A rule for determining mFLT transformed tables is: first invy is selected and the reversing inverter invx determined to generate the Lab-transformed table 1303 from 1300. From 1303 it is clear that 1 is the new zero-element and remains the zero-element in all mFLT tables. The other tables are a re-arrangement of the columns (or rows) of 1303 wherein the second column or row (representing the zero-element 1 in origin 0) remains the same. The order of the columns is changed in accordance with the different rows not being a zero-element row. The third row in 1303 is [3 1 4 2 5 0], which means: the column in 1303 with top state 3 goes to position 0, the column in 1303 with top state 4 goes to position 2; the column in 1303 with top state 2 goes to position 3; the column in 1303 with top state 5 goes to position 4; and the column in 1303 with top state 0 goes to position 5, thus creating the table 1301. Etc, following the rows in 1303. One can see that there are (n−1)=(6−1)=5 different possible variations of 1303, as column 1 (origin 0) remains in place. Or an n-state operation2 type operations has one FLT modification associated with a reversible n-state inverter and (n−1) mFLT modified n-state operations Operation1 (addition-like) n-state switching function tables do not have such a constant column/row and thus n or in this case 6 variations are possible.

One may say that using n-state switching function devices with n very large, such as in RSA public key cryptography and Diffie-Hellman key exchange, increases the confusion by having many states. (for instance n in RSA may be represented by 100s of digits). A downside of this is that devices have to process many binary equivalent signals (currently over 2048 bits). It is beneficial to increase for data exchange the size of n while actual processing takes place for much smaller sizes of n. This increase of the size of n is called zero-element stuffing or 'zes.' That is: an n-state (n by n) switching function table is expanded to an p by p matrix by including rows and columns that represent zero elements. Keeping in mind that a stuffing row/column for an operation1 type table (addition-like) are identity vectors, while in operation2 type (multiplication like) are vectors of zero-elements.

As an example, the 8-state tables 401 and 402 in FIG. 4 are 'zero-element stuffed' to a 14 by 14 matrix as shown in corresponding 'zes' tables 1401 and 1402 in FIG. 14. The expansion, as one can check is such that the operation on a valid 8-state input and an input with a value state above (n−1) is like performing an operation with a zero-element. All elements in the table above representation value (n−1) are zero-elements. The 'zes' expansion can be applied to any n-state switching function table. The tables 401 and 402 define a representative finite field GF(8) and the two function table operations distribute. The overall properties of 401 and 402 (and in 'zes' tables in general) are maintained in 1401 and 1402 and 1401 and 1402 also distribute.

The expansion per se as shown in FIG. 14 is not very useful in cryptography, because the output states may be very predictable, especially in 1402. In accordance with an aspect of the present invention, the n states are diffused over p states (or 8 states are diffused over 8 of 14 states) by performing a 14-state Lab-transform on the tables of FIG. 14.

Using 14-state inv14=[11 6 13 3 7 0 4 9 5 1 12 2 3 8] on tables 1401 and 1402 for a Lab-transform will generate 14-state switching function tables 1501 and 1502 in FIG. 15. These tables have retained the original properties of tables 401 and 402. For input signals one has to ensure that the inverted input states are valid within the 8-state representation. This zes Finite Lab-Transform (or zes-LFT) allows for a confusing of n over p states, making a successful attack more difficult. The difficulty to attack is because of the uncertainty which switching operations are used, especially when uses very large values of n states. With a limited exchange of data or public one may determine what p (p=14) is. P=14 is clearly not a prime number. However, the switching function that is applied may be a 14-state consecutive multiplication switching function, or is may be a valid n-state switching function (with n=7, n=8, n=9, n=11 or n=13) that is zero-element stuffed. A switching function may even be another consecutive multiplication based switching function (for instance n=12) that is zero-element stuffed to p=14. One price one may have to pay in exchanging secure encrypted or signed data is to have some agreement or pre-exchange of n-state/p-state inverters.

Figure 6:
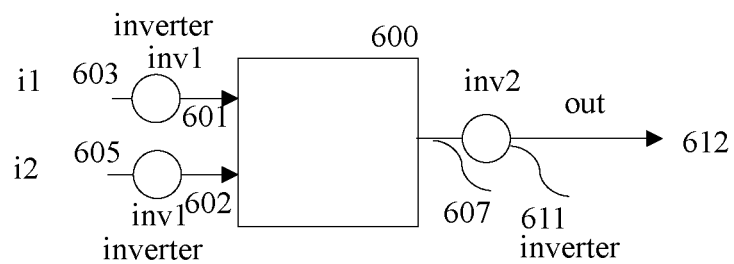
FIG. 6 illustrates a device that performs a Finite Lab-transform (FLT) in accordance with an aspect of the present invention.

For relatively small values of n, one may store actual n-state switching tables in memory. If n is small depends on the size of switching devices and/or memory. For instance memories of 100 GBytes or larger are now available. In a further embodiment of the present invention an operation is a rule (such as a consecutive n-state multiplication rule) that can be executed of any size operand or input. If sufficient memory is available the relevant inverters as in FIG. 6 are stored in memory. If sufficient memory to store inverters is not available a rule based inverter stored as one or more instructions to be performed by a processor may be used. For instance an n-state inverter may be invn(i)=((i+a)mod n ⊠ c) wherein a and c are pre-selected states and ⊠ is the n-state consecutive multiplication like operation or GF(n) operations with a particular offset. One may apply also interleaving rules and other reversible cut and paste rules.

In accordance with an aspect of the present invention, the transformed n-state switching function tables are applied in cryptographic applications, such as public or semi-public key cryptography, encryption and decryption, message digest or hash functions, streaming ciphers, signatures, elliptic curve cryptography and the like. The basics of public key cryptography are known and are explained in https.// en.wikipedia.org/wiki/Public-key_cryptography which is incorporated herein by reference.

As an example of application of FLT or m-FLT transformed encryption devices the well know Advanced Encryption Standard AES) as published in Federal Information Processing Standards Publication 197 (FIPS 197) published on Nov. 26, 2001 and available online at https://nvlpubs.nist-.gov/nistpubs/fips/nist.fips.197.pdf and which is incorporated herein by reference, will be used. Encryption devices by necessity apply a device that enters or absorbs a to be encrypted signal into the cryptographic device. AES is a block cipher and data is treated as fixed sized blocks. At least one key is used to encrypt the input data. Furthermore, operations need to be invertible if one wishes to later decrypt the data. In section 5.1.4 of AES FIPS 197 a step AddRound-Key( ) is performed, which is a "simple bitwise operation." The bitwise XOR operation on 8 bits in a byte of data is in effect a 256-state operation of an operation1 nature. The equivalent 256-state operation is also self-reversing. That is, one can apply the same 256-state operation to reverse the AddRoundKey( ) operation. By applying an FLT transform with a pre-agreed 256-state inverter and treating each byte as a 256-state signal one has thus modified the AddRound-Key( ) operation without actually changing the flow of steps of AES. One may also wish to act upon sub-bytes of 4-bits and treat these as 16-state signals/symbols and use a 16-state inverter to transform a sub-byte bitwise XORing by an equivalent, Lab-transformed, switching table. The FLT transformed switching tables of the bitwise XORed equivalent table are of course also self-reversing.

AES also uses a combination of addition and multiplication in section 5.1.3 MixColumns( ) which includes a combination of multiplications and additions. The multiplication defined in AES over irreducible polynomial m(x)= $x^8+x^4+x^3+x+1$ (see eq. 4.1 in section 4.2 in FIPS 197) and is in MixColumns mod($x^4+1$) with a fixed polynomial a(x).

In accordance with an aspect of the present invention the multiplication itself in AES is replaced by a 256-state Lab-transformed switching function device. Procedurally the multiplication in MixColumns is a matrix multiplication of 4 bytes in a 32-bit word with a pre-determined 4 by 4 matrix of 16 2-hexadecimal elements. For decryption a reverse matrix is provided as expression 5.10. FIPS 197 explains the matrix multiplication in terms of a polynomial multiplication over $GF(2^8)$. This is also explained in the article "An Efficient Architecture for the AES Mix Columns Operation" by Li and Friggstad, 2005 and provided online at http://www.cs.tau.ac.il/~fiat/crypt07/papers/aes.pdf which is incorporated herein by reference. The article explains how the operation needs to be realized in circuitry, again highlighting that the description is merely a reflection or description of circuitry.

A description in terms of an n-state switching function table is helpful to explain the use of the FLT transform in this case and how to determine the inverse of the multiplication matrix for decryption. For convenience the process is illustrated for an 8-state system and a 2 by 2 matrix of 8-state symbols. The process for determining an inverse matrix can take place by substitution, Gauss elimination and Cramer's rule, keeping in mind that in the 8-state example the addition and multiplication are operations over GF(8) and the related operations are defined over GF(256) in AES.

As an illustrative example assume the following system of 8-state operations.

$$\begin{bmatrix} p \\ q \end{bmatrix} = \begin{bmatrix} 2 & 3 \\ 1 & 2 \end{bmatrix} * \begin{bmatrix} a \\ b \end{bmatrix}$$

In AES the result is an output column of 4 bytes, formed of a 4 by 4 matrix multiplication with a column vector of 4 input bytes from an input word of 32 bits. The applied operations in the above example are * is operation m8 of which the 8-state switching function table is shown as 302 in FIG. 3 and the addition + is operation sc8 of which the 8-state switching function table is shown as 301 in FIG. 3. For the 256-state case, corresponding switching functions are used.

The evaluation of the above system provides:

$p=2*a+3*b$; and $q=1*a+2*b$.

The reversing system for decryption is:

$$\begin{bmatrix} a \\ b \end{bmatrix} = \begin{bmatrix} 3 & 7 \\ 4 & 3 \end{bmatrix} * \begin{bmatrix} p \\ q \end{bmatrix}.$$

Applying to tables 301 and 302 the FLT with inv8=[2 5 0 7 4 6 1 3] will generate tables 901 and 902. Construct a system (remembering that 6 is the one-element):

$$\begin{bmatrix} 6*p \\ 6*q \end{bmatrix} = \begin{bmatrix} 0 & 7 \\ 5 & 0 \end{bmatrix} * \begin{bmatrix} 6*a \\ 6*b \end{bmatrix}.$$

The decryption system (remembering that 6 is the one-element) is:

$$\begin{bmatrix} 6*a \\ 6*b \end{bmatrix} = \begin{bmatrix} 4 & 5 \\ 3 & 4 \end{bmatrix} * \begin{bmatrix} 6*p \\ 6*q \end{bmatrix}$$

This simple illustrative example shows that an equation system in GF(n) can be expressed using n-state switching function tables that are obtained by a FLT of n-state switching function tables defining GF(n) and that by simple algebraic steps the reversing system can be derived. Such a system involving matrix multiplication is used in the MixColumns step of AES as explained in FIPS 197. And this matrix multiplication step is performed in the MixColumns step of AES accordance with an aspect of the present invention by replacing the therein addition and multiplication by their FLT transformed equivalents. For the inverse operation InvMixColumns as explained in section 5.3.3 of FIPS 197 the inverse 4 by 4 matrix is determined as explained above.

Some care has to be taken in selecting the elements of the matrix of expression (5.6) in FIPS 197. In accordance with an aspect of the present invention, the elements of this matrix are inverted using the 256-state inverter of the FLT to establish a new FLT transformed system of (5.6) in FIPS 197.

The fact that two operations have properties of a finite field, including a zero-element and one-element, even if not the standard 0 and 1, respectively, fully enables one of ordinary skill to implement cryptographic devices with these operations. For one not of ordinary skill a cursory review of the methods may appear confusing as one has to re-interpret the applied symbols. However, this is the purpose of using the modified operations to make it harder for anyone not knowing the applied FLT to attack a cryptographic method. It is noted that the AES method in FIPS 197 applies a reduction $mod(x^4+1)$. Such a reduction is a reduction of 256-state to 16-state and the 16-state reduced symbols are used. For illustrative purposes this reduction is not applied in the following example, which is provided to illustrate the use of the FLT in AES.

An addition over GF(256) is defined by primitive polynomial $x^8+x^4+x^3+x^2+1$. A part of the resulting 256-state switching function table (the first twelve rows and columns) are shown in screenshot 1601 in FIG. 16. One can see that the zero-element is 0. The corresponding operation2 is represented by a 256-state consecutive multiplication table with zero-element 0 and one-element 1.

The MixColumns matrix (5.6) of FIPS 197 is used for the operation and thus is:

$$\begin{bmatrix} 2 & 3 & 1 & 1 \\ 1 & 2 & 3 & 1 \\ 1 & 1 & 2 & 3 \\ 3 & 1 & 1 & 2 \end{bmatrix}$$

The corresponding Inversion matrix (without the $x^4+1$ reduction) with symbols in decimal representation (instead of hexadecimal) is:

$$\begin{bmatrix} 145 & 202 & 185 & 88 \\ 88 & 145 & 202 & 185 \\ 185 & 88 & 145 & 202 \\ 202 & 185 & 88 & 145 \end{bmatrix}$$

One can compare this to table (5.10) in FIPS 197 and see that this is basically a transformed version of (5.10). A Matlab program was developed and executed running the, what FIPS 197 in section 5.1.3 as illustrated in its FIG. 9, calls MixColumns( ) transformation using the operations as provided and explained above. For instance the input [a b c d]=[6 7 8 9] generates [p q r s]=[32 14 224 230]. Application of reversing operation (5.10) in FIPS 197 with the above provided reversing matrix recovers the original input [a b c d] from [p q r s].

Figures 17, 18:
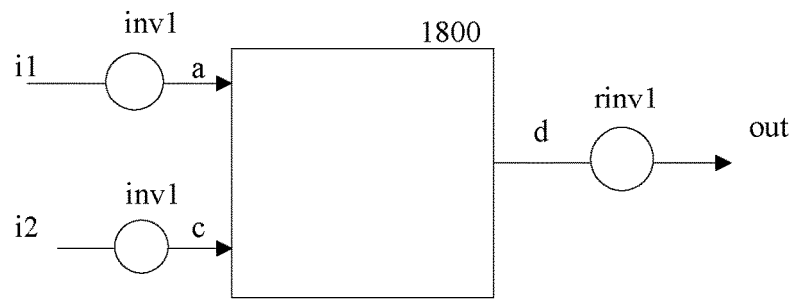

A rule based 256-state inverter is to take first the multiplier 121 from the consecutive multiplication and add an offset 28 in accordance with the addition over GF(256). The resulting inverter inv256 is: inv256=[28 186 230 204 24 218 167 41 32 75 249 102 55 21 67 86 189 99 154 19 35 104 194 16 242 150 192 181 37 71 145 211 208 222 138 40 168 12 97 84 88 23 205 172 62 74 33 126 156 80 246 178 163 44 245 81 234 216 171 206 254 147 229 187 197 69 121 183 109 136 93 210 146 255 142 115 108 184 113 239 2 5 107 116 123 162 179 65 152 57 191 151 66 22 89 232 177 247 125 34 20 56 153 100 51 77 54 103 36 182 122 117 215 235 176 233 82 119 14 199 106 6 144 72 95 174 170 217 25 130 10 31 42 64 180 193 105 200 4 3 201 241 17 50 101 250 79 157 46 238 114 143 7 39 139 220 133 213 161 124 248 76 52 0 53 78 251 128 166 219 140 228 148 49 18 155 127 252 61 173 96 13 120 70 38 8 224 27 29 226 132 221 209 94 73 63 43 164 60 253 207 212 134 112 185 48 149 243 59 165 129 26 225 30 11 169 175 236 91 159 111 135 110 160 214 118 83 98 190 58 244 45 158 92 137 223 9 131 227 141 1 240 202 196 188 87 85 68 198 15 195 203 231 90 237 47]. The 256-state switching functions sc256i and m256i are generated from the operations represented by operations over GF(256) and the above inverter inv256 with the FLT transform. The first 12 rows and columns of the resulting 256-state switching function tables are shown in screenshots 1701 and 1702 in FIG. 17. The zero-element is 163 and the one-element is 240

Using the same matrix as in MixColumns (5.6) the corresponding decryption matrix now is:

$$\begin{bmatrix} 176 & 137 & 193 & 197 \\ 197 & 176 & 137 & 193 \\ 193 & 197 & 176 & 137 \\ 137 & 193 & 197 & 176 \end{bmatrix}.$$

The AES operation of the FLT transformed operations on [a b c d]=[6 7 8 9] will now generate [p q r s]=[151 154 1 255]. Using the above reversing matrix upon [p q r s] will generate the original [a b c d]. The decryption matrix was determined from the encryption matrix by Gaussian elimination, using the FLT transformed operations and zero-element 163 and one-element 240.

There are so many different possible inverters 'inv256' that it is impossible for any human being to try all of the possible configurations. The number of possible inverters exceeds the capability of current computers to try all possible inverter driven FLT transformed 256-state operations. The number exceeds even the capabilities of future quantum-computers.

In a similar way other encryption devices that apply reversible n-state switching functions are modified by applying FLT transformed devices in accordance with various aspects of the present invention. This applies especially in cryptographic applications wherein chunks of bits or words of bits such as bytes are operated upon. One other example is the DES or the updates Triple DES standard as published online at https://nvlpubs.nist.gov/nistpubs/SpecialPublications/NIST.SP.800-67r2.pdf as NIST Special Publication 800-67 (hereinafter "800-67" as "Recommendation for the Triple Data Encryption Standard (TDEA) Block Cipher" which is incorporated herein by reference. The Triple-DES cipher is modified version of DES. Document 800-67 in FIG. 1 and in section 2.1 "Forward Transformation" teaches bitwise XORing of 32-bit blocks L and R. As in AES, chunks or words of k bits in the 32-bit word are treated as a single $2^k$-state words and are operated upon by a reversible $2^k$-state operation, in accordance with one or more aspects of the present invention. The operation for processing the $2^k$-state chunk, in accordance with an aspect of the present invention, is a $2^k$-state FLT transformed switching function. The $2^k$-state switching function that is LFT transformed may be represented by a standard $2^k$-state addition over GF(2k) with zero-element 0 and one element 1. In that case (even if the zero-element of the FLT switching function is no longer 0 and the one-element is no longer 1) the switching function is self reversing and can also be used in the decryption in the inverse transformation step.

One may also use other reversible n-state and $2^k$-state reversible switching functions that are Lab-transformed in encryption wherein associativity is not of importance. The size of the chunks can be selected based on different considerations. For instance one may use a single chuck of 32 bits to be processed by a single 232-state switching function device or one may prefer to treat a 32-bit word as consisting of 3 256 state words each to be processed by a 256-state switching function device wherein at least one device is derived from a FLT transformed 256-state switching function.

The FLT of the MixColumns step makes unauthorized decryption of an AES encrypted message extremely difficult. The application of FLT to the AddRoundkey step already makes unauthorized decryption much more unlikely.

In accordance with a further aspect of the present invention the S-box step of SubBytes Transformation as explained in section 5.1.1 is subjected to a FLT. That is: the table of FIG. 7 is Lab-transformed. The FLT in that case is a 16-state transformation. The x and y coordinates are hexadecimal states which are 16-state. The output states are double hexadecimal. For instance S-box (7,5)=9d. Each of the hexadecimal output digits are inverted with a reversing 16-state inverter that is applied to the inputs. The output digits are then the combination of the individually inverted digits.

The herein provided modification of n-state switching functions by way of Lab-transformation applies to all encryption methods wherein data is entered and/or modified with bitwise XORing or alternatively with bitwise EQUAL devices operating on blocks of bits. Examples of such encryption includes Blowfish at https://www.schneier.com/academic/archives/1994/09/description_of_a_new.html Twofish athttps://www.schneier.com/academic/paperfiles/paper-twofish-paper.pdf,the Serpent Cipher at http://www.cl.cam.ac.uk/~rja14/Papers/serpent.pdf, IDEA at http://www.quadibloc.com/crypto/co040302.htm, etc. all of these online documents are incorporated by references.

Elliptic Curve Cryptography (ECC) is based on operations complying with conditions of additive (Abelian) groups having invertible elements and using adding rules based on a specific curve. One of ordinary skill in ECC will be able to apply ECC based on Lab-transformed addition n-state switching functions. The rules remain the same, however the primitive n-state addition is replaced by its Lab-transformed version. No undue effort would be required from one of ordinary skill to apply the Lab-transformed version of ECC. ECC is explained for instance in a slide presentation entitled "ECC Elliptic Curve Cryptography" available online at https://pdfs.semanticscholar.org/presentation/ccc4/337e393b3e8c725b145a017f13aa50c4_d0fc.pdf which is incorporated herein by reference. Numerical examples of using FLT in ECC are provided by the inventor in U.S. patent application Ser. No. 15/442,556.

One way to determine an inverse is explained next. For simplicity it is assumed that inverters are stored in memory. However, an inverter may also be rule based and its reversing rule is also available. Now referring to FIG. 18 which illustrates symbolically the execution of a Lab-transform of an operation implemented in 1800. A first input receives a signal representing i1 which is inverted by reversible inverter inv1 to a; on the second input a signal representing i2 is received and inverted by reversible inverter inv1 to b. Device 1800 processes a and b to d and d is inverted by inverter rinv1 to out, wherein rinv1 is the reversing inverter of inv1. Operation of 1800 is fully determined. For instance 1800 is characterized by an 17-state switching function table representing a modulo-17 multiplication. If c is the multiplicative inverse of a or $c=a^{-1}$ then d=1, because $a*a^{-1}=a*c=1$. By applying rinv1 to d as out=rinv1(d)=rinv1 (1) one can determine the new one-element. Furthermore, because a=inv1(i1) and c=inv1(i2) it necessarily follows that i1=rinv1(a) and i2=rinv1(b) and d=inv1(out). In general, in case of multiplications, either the multiplicative inverse can be determined from a simple rule (such as consecutive multiplication) or by applying the Extended Euclidean algorithm. According to determine the multiplicative inverse of i1 in the Lab-transformed switching function one can look up which operation upon i1 and i2 generates the new one-element or also: 1) one determines a from inv1(i1); 2) one determines $b=a^{-1}$ from the EE algorithm; and 3) one determines i2 from $i2=rinv1(a^{-1})$.

In accordance with an aspect of the present invention, an inverter with which an n-state switching function is modified by a Lab-transform, which constitutes a primitive function of a cryptographic device or method, is kept confidential between authorized devices. An unauthorized device or attacker that guesses or assumes a certain cryptographic method such as AES or other, now has to try possible n-state inverters to achieve a successful (cryptanalytical or other) attack. Looking at the number of possible n-state inverters, such an approach is in many cases prohibitive in time and/or other resources. Furthermore, attacks are further discouraged by changing of the n-state inverter applied in a Lab-transform.

The application of devices in machine cryptography that are described by FLT or mFLT or zesFLT transformed n-state switching functions allow the personalization and customization of cryptographic devices, of which many rely on published and well known machine steps. This application, with n-state inverters held confidential, also significantly improves security of devices that include machine cryptography.

It should be clear from the above that machine cryptography is fundamentally different from paper and pencil cryptography by a human. That is: no human could ever perform an AES encryption or an AES decryption of a modest file of 1 MB size of data in an acceptable time frame. One million bytes have to be split up in individual bytes and go through multiple rounds of AES steps. Furthermore, while a human may understand and work with text files and may code these first into bytes to perform AES, it is physically impossible for humans to generate electrical signal, optical signals and/or electro-magnetic signals without a machine or device. Signals represent encrypted data, wherein the data can further represent numerical data, text data, sensor data, control data, sound data, and/or image data which may be video data and/or a combination thereof.

In some cases, such as in AddRoundKey of the AES operation, it is not required that the operation is associative. It only needs to be reversible. In accordance with an aspect of the present invention an n-state switching function is used that is reversible, but for instance not associative. Or an associative n-state switching function whereof the reversing n-state switching function is non-associative. Such functions may be fairly predictable and thus may add only minimal unpredictability. For instance a modulo-n addition may be used instead of a bitwise XORing n-state switching function. The corresponding reversing switching function is the mod-n subtraction. Unpredictability is greatly increased by applying the Finite Lab-Transform to these switching functions, especially for larger values of n, like n greater than 100.

In some cases it is preferred to use the same n-state switching functions for encryption and decryption. In that case the n-state switching tables of the encrypting and decrypting device should be identical. One n-state switching function and its corresponding switching function table that complies with being self-reversing is defined by an expression scn(row,column)=(offset−row−column)−modulo-n in origin 0 (elements are 0, 1, . . . , n−1). While there is of course only one n-state switching function that performs in accordance with modulo-n addition there are n different n-state switching functions scn(row,column)=(offset−row−column)−modulo-n, as the offset may be one of 0, 1, 2, . . . n−1. Furthermore each of these n-state switching functions may be modified with an n-state Finite Lab-Transform, further increasing the unpredictability.

Figures 19, 20:
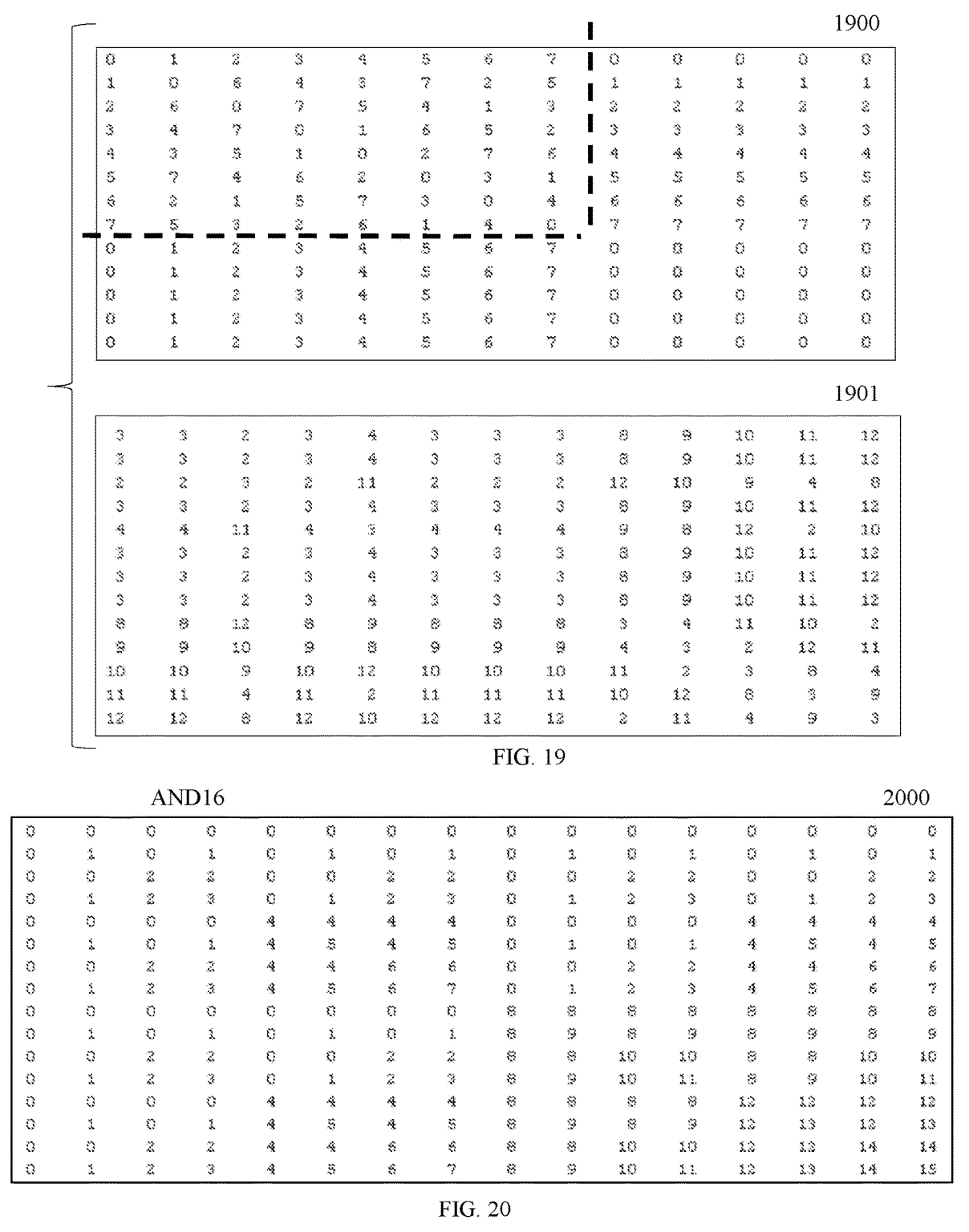

FIG. 19 shows a screen shot of a zero-stuffed 13-state switching function table 1900, which is formed from a table representing an 8-state addition over GF(8), stuffed with zero-elements in the relevant sections. The table 1900 can be represented as 13 by 13 matrix sc13 with index in origin 0. The table representing addition sc8 over GF(8) is sc13(1:8, 1:8). This is illustrated by the dotted lines in the table 1900. Anything outside the dotted line should not affect the operation that is represented by the table. One is reminded that for an addition-like operation a neutral or zero element 'e' has a property scn(a,e)=a and scn(e,a)=a for all 'a'. This property applies to table 1900. A 13-state FLT is applied to the operation represented by table 1900.

The 13-state inverter inv13=[11 10 4 0 5 8 12 9 1 7 6 2 3] is used to perform the FLT on sc13 to generate sc13i, of which the 13-state switching function table 1901 is shown in a screen capture generated from Matlab in FIG. 19. The FLT 'scrambles' the output states of the operation sc8 over a table 1901 of sc13i. In accordance with an aspect of the present invention, one continues to use only 8-state input symbols to operation sc13i. This is achieved by making sure that all inverted input signals (a and b in FIG. 18) represent valid 8-state inputs to device 1800 that implements sc8. That means that both 'a' and 'b' are in the representative set [0, 1, 2, . . . , 6, 7]. That means that inputs i1 and i2 have to be selected from signals represented by a set created from the reversing inverter rinv13, applied to the set [0 1 2 . . . 67]. Because when a=inv13(i1), then i1=rinv13(a). rinv13=[3 8 11 12 2 4 10 9 5 7 1 0 6]. As input signals one has to use those that represent the first 8 elements of rinv13 i.e. [3 8 11 12 2 4 10 9]. These elements applied to sc13i operate sc13i as being a self-reversing operation for these 8 elements. Or c=sc13i(a,b) with a=sc13i(c,b) and b=sc13i(a,c) with sc13i being commutative.

The above example shows how one can a) modify a self-reversing switching function by applying an FLT and b) one can change an n-state switching function to appear to be a p-state (with p>n) switching function. This may be useful in situations wherein an output of a switching function does not offer a full opportunity to determine the number of states that outputs may assume. For instance, an output above represented by 12 may imply that a 13-state switching function is being performed, while in reality only 8 meaningful states will occur under conditions described above.

Message Digest/Hash-Functions

A message digest or hash operation or hash function "compacts" a sequence of signals to an output called a message digest. For instance the hash operation as described in FIPS PUB 180-4 entitled Secure Hash Standard and downloadable from http://dx.doi.org/10.6028/NIST.FIPS.180-4 and which is incorporated herein by reference, generates from an electronic message or file a message digest that varies in size between 160 bits (SHA-1) and 512 bits (SHA-512). For illustrative purposes the FIPS SHA standards (including SHA-3) are applied herein. There are many different hash functions or message digest operations of which some are listed on websites https://en.wikipedia.org/wiki/Comparison_of_cryptographic_hash_functions and https://en.wikipedia.org/wiki/List_of_hash_functions which are both incorporated herein by reference. One way to generate a message digest is to use a shift register with feedback that operates like a scrambler with an initial shift register content and when provided with a message ends up with a new content, which is the message digest. These scramblers are known as CRC or Cyclic Redundancy Checks of which a list is provided at https://en.wikipedia.org/wiki/Cyclic_redundancy_check and which is incorporated herein by reference. Variations on message digests are for instance HMACs also called hash-based message authentication code. HMAC: Keyed-Hashing for Message Authentication is described as RFC2014 and is available at https://www.rfc-editor.org/rfc/pdfrfc/rfc2104.txt.pdf which is incorporated herein by reference.

All these hash operations have in common that they need to "engage" with or "enter" the message into a hash operation or hash device. By far the most common way is to combine the message (usually in binary form) with another binary signal (a key or a padding message or a constant) through a bitwise XORing operation. It may be possible to do bitwise EQUALing of signals. One may even apply other bitwise operations like the AND, NAND, OR etc. operations. For instance SHA-224 and SHA-256 (all members of Secure Hash Algorithm 2) operate bitwise on 32-bit words and SHA-512 on 64-bits words. SHA-1, SHA-2 and SHA-3 are all members of the FIPS published Secure Hash Algorithm (SHA) family of standards.

In accordance with an aspect of the present invention a bitwise binary switching function operation of sets of k or more bits is replaced by a Finite Lab-transformed $n=2^k$ state switching function. For instance, SHA message digests use the bitwise operation $Ch(x,y,z)=(x\hat{\ }y)\oplus(\neg x\hat{\ }z)$ in expressions (4.1) and (4.2) and (4.8) of FIPS 180-4. Furthermore, the expression $Maj(x,y,z)=(x\hat{\ }y)\oplus(x\hat{\ }z)\oplus(y\hat{\ }z)$ is applied in expressions (4.1), (4.3) and (4.9). Furthermore expressions (4.4)-(4.7) and (4.10)-(4.13) in FIPS 180-4 apply bitwise XOR ($\oplus$) on words of bits. The bitwise AND is represented by $\wedge$ and the binary inversion NOT is represented by $\neg$. One advantage of the above operations is that it does not modify the overall distribution of symbols. That is, assuming that there is an equal distribution of 0s and 1s in the message, then the output of the function also has an equal distribution of 0s and 1s.

The bitwise operations are performed on words of 32 or 64 bits. In accordance with an aspect of the present invention, the bitwise operation on 32 bits or 64 bits may be replaced by an $2^{32}$ or $2^{64}$ state switching function. However, one may also take parts of binary words, like words of k1, k2, k3, etc. ki bits wherein k1+k2+k3+ . . . ki=n with n=32 or 64. For illustrative purposes a word of n bits is composed of k*4 bits. That is a 32 bit word is divided into 8 words of 4 bits and a word of 64 bits is divided into 16 words of 4 bits. However, other compositions are possible and are fully contemplated.

As an illustrative example a bitwise 4-bits word AND and XOR equivalent 16-state switching function table are provided. The 16-state switching function table, in origin 0, equivalent to a 4-bit bitwise AND operation, is shown in FIG. 20 screenshot table 2000 generated by a Matlab program. The program performs a bitwise AND operation (called AND16) on all possible 4-bits words (ranging from 0000 to 1111 in origin 0, or 1111 to 2222 in origin 1) and translating the results into a 16-state symbol, in this case a decimal equivalent. One characteristic of AND16 is that AND16(x,x)=x for any valid x. FIG. 21 in screenshot table 2100 shows a 16-state switching function table generated by a Matlab program for a 4-bit bitwise XOR operation called XOR16. One characteristic of XOR16 is that XOR16(x,x)=z for any valid x, wherein z is the zero element.

In accordance with an aspect of the present invention, at least one k-state switching function with k being equal to or smaller than $q^n$, wherein n is the total number of q-state elements in a word of n elements, which is applied to process words of n or fewer q-state elements, is modified by a Finite Lab-transform (FLT). For instance, SHA requires processing of 32-bit words or 64-bits words by bitwise XOR operations. In one illustrative embodiment of the present invention words of 4-bits are processed by a 16-state FLT modified XOR16 operation. Furthermore, a word of 32-bits is divided into 8 words of 4 bits and each 4-bit word is processed by a 16-state XOR16 operation or an FLT modification thereof. One may also perform directly an FLT modified $k=2^{32}$-state operation. One may also apply 4 256-state operations on words of 8 bits and/or any other combination of operations as long as 32 bits (or 64-bits) words are processed as required by a Message Digest standard.

In the illustrative example, due to display limitations, 16-state operations on 4-bit words are provided, for illustrative purposes only and are not intended as an exclusive limitation. The FLT on the XOR16 switching function applies the 16-state inverter inv16=[10 8 5 2 12 4 6 11 13 15 9 0 14 7 1 3]. The FLT modified 16-state switching function table 2200 generated by a Matlab program of XOR16i is shown in FIG. 22.

In the expression $Ch(x,y,z)=(x\hat{\ }y)\oplus(\neg x\hat{\ }z)$ the 4-bit bitwise operation $(\neg x\hat{\ }z)$ is equivalent to a 16-state operation XN16 and the FLT modified operation XN16i. The total expression for 4-bit bitwise operations Ch(x,y,z) is captured by the 16-state operation CH16(X16,Y16,Z16) which is represented by a series of 16 16-by-16 16-state switching tables. The FLT modified operation CH16i(X16,Y16,Z16) is formed by CH16i(X16,Y16,Z16)=(X16 AND16i Y16) XOR16i (X16 XN16i Z16). The screenshot table CH16i (X16,Y16,0) 2300 (for Z16=0) generated by a Matlab program is shown in FIG. 23. The letter 'i' indicates a FLT modified switching function. All n-state switching functions in this example are FLT'ed using the same 16-state inverter inv16. This limitation is not required as one may apply different inverters if properties like associativity or distributivity are not required. By the same reasoning one may also apply one or more modified FLTs as illustrated in FIG. 6 wherein in one embodiment 611 is not the reversing inverter of 601. Table 2300 shows that CH16i(0,0,0)=0, which may not be desirable for cryptanalytical reasons.

The reason for this 0 generation even after an FLT lies in the properties of the AND16 or ANDn in general. By its nature ANDn(x,x)=x, invn(y)=x and rinv(x)=y, thus: x is inverted to y ANDn(y,y)=y and rinv(y)=x, thus ANDni(x, x)=x and ANDi(0,0)=0.

One way to address this issue is use a modified FLT as indicated above. Another way to do this is to consider the AND operation a mod-2 multiplication and replace k bitwise ANDs by a $2^k$-state multiplication, such as a $2^k$-state consecutive multiplication. For instance AND16 can be replaced by a 16-state consecutive multiplication which is then FLT'ed with a 16-state inverter. As a reminder, elements of a p-state consecutive multiplication are generated in Matlab by executing a statement y(i1+1,i2+1)=mod((i1+i2),p)+(((i1+i2)>=p)*1). CH16ii(0,0,0) generated by replacing AND16 with MLC16 (MLC16 is the 16-state consecutive multiplication) and determining the expression CH16ii (X16,Y16,Z16)=(X16 MLC6i Y16) XOR16i (X16 XN16i Z16) by FLT using inv16 will provide CH16ii(0,0,0)=5.

As illustrated above, an existing message digest operation or device that applies symbol-wise or bit-wise operations on symbols/bits in a word of symbols or bits is modified by a replacing a symbol/bit wise switching operation on k q-state symbols or bits by an $p=q^k$-state switching operation that is modified by an FLT. The replacement and then FLT of a bit-wise or symbol-wise operation by a p-state switching operation is called a word-based Finite Lab-Transform or a wFLT herein. When the full word is FLT'ed this is called herein a fwFLT or full-word Finite Lab-Transform. For instance replacing a bit-wise 8-bit word operation by a 256-state switching operation and then applying a FLT would be a fwFLT. Also a partial word FLT is possible. For instance in SHA bitwise operations take place on words of 32 or 64 bits. A word of 32-bits may be split up in 4 words of 8 bits and a 256-state switching operation that is FLT'ed may be performed on words of 8-bits. The resulting 256-state outputs may be recombined to a symbol or series of symbols that can and may be represented by an equivalent binary or hexadecimal representation. This represents a partial-word FLT or pwFLT.

Different aspects of the original message digest approach can be modified while leaving basic aspects (especially operation flow) in place. Message digest modifications may include, but are not limited to: a) modifying one or more cycles or rounds of a message digest; b) modifying one or more bitwise switching operation (like XOR and AND in SHA) by a fwFLT or a pwFLT; c) one may apply different pwFLTs and fwFLTs within a word and within a round; d) one may apply a modified or mFLT operation on words of symbols, especially if no reversal or decryption is required; and e) any combination of a), b), c) and d).

Public Key Cryptography

Next to message digests and encryption, public key cryptography is an important cryptographic operation. Public key cryptography allows two communicating devices that have not defined a symmetric relation to establish a secure keyword for message exchange. The keyword may be used for encryption, message/source authentication or other cryptographic operations. Public key cryptography is generally known as asymmetric cryptography. Security arises from intractability to reconstruct selected private keywords from the limited public exchange of data between devices over a, potentially, insecure channel.

Diffie-Hellman key exchange provides a method for exchanging public data to establish a common private keyword. An explanation of Diffie-Hellman key exchange is provided in https://en.wikipedia.org/wiki/Diffie%E2%80%93Hellman_key_exchange which is incorporated herein by reference.

In accordance with an aspect of the present invention a reversible p-state inverter is applied to the p-state operation of the Diffie-Hellman method, which is generally a mod-p multiplication, but may also be a mod-p addition or a mod-p subtraction, by applying a Finite Lab-transform with a reversible inverter and its reversing inverter as illustrated in FIG. 6 and FIG. 7. The p-state inverter is kept confidential and may be distributed in accordance with the unmodified Diffie Hellman method. The determination of the discrete logarithm for large numbers is held to be intractable. Large numbers are generally accepted to be numbers represented by more than 512 bits or 1024 bits or 2048 bits. By modifying the p-state operation in accordance with a Finite Lab-transform the fundamental (or meta) properties are preserved but the results are unpredictable because of the incredibly large numbers of possible p-state inverters. For instance the Finite Lab-transformed mod-n or $GF(n=p^q)$ multiplication still defines a group, closed, associative and with a multiplicative inverse, though the state of the multiplicative inverse is modified by the Finite Lab-transform (FLT).

Preferably a "rule based" p-state inverter is used, for instance as provided in illustrative examples herein earlier. Different rules are possible and contemplated and include rotation with modification of 0 and 1 element; interleaving of preset partial inverters, reverse order inverters and other schemes. One benefit of these modifications is that attacks on the generated public keys to determine the private keys or common key will be ineffective within a given time. Modifying the inverters on a regular basis, for instance after one or more uses, or on a timed basis, makes the modified Diffie Hellman method more secure and enables a reduction in the size of the required public keywords.

In an illustrative example p=29 and g=11. The private keys are a=5 and b=19. The public key for a first device is $g^a$-mod-p=$11^4$-mod-29=14 and the public key of a second device $g^b$-mod-p=$8^{19}$-mod-29=15. The common key is $(g^5)^{19}$-mod-29=$(g^{19})^5$-mod-29=10. Select a 29-state inverter inv29=[8 9 10 11 12 13 14 15 16 17 18 19 20 21 22 23 24 25 26 27 28 0 1 2 3 4 5 6 7] which is created by a rotation left of 8 positions of the corresponding 29-state identity inverter.

It is to be understood that n, a and b are in practical use very large integers, for instance n is represented by at least over 1000 bits and a and b at least 80 bits. Practical examples of Diffie-Hellman key exchange are provided in Password-Authenticated Key (PAK) Diffie-Hellman Exchange in RFC5683, February 2010, downloaded from https://tools.ietf.org/pdf/rfc5683.pdf which is incorporated herein by reference.

The reversing inverter can be easily determined and is rinv29=[21 22 23 24 25 26 27 28 0 1 2 3 4 5 6 7 8 9 10 11 12 13 14 15 16 17 18 19 20] and is of course a right rotation of the 29-state identity inverter and can be applied rule based for every instance. Call the modulo-29 multiplication m29 and the Finite Lab-Transformed version of m29 with inv29 called 'm29m.' Using 'm29m' with the same private keys will generate ga=m29m$^a$(g)=m29 m$^5$(11)=13 and gb=m29 m$^b$(g)=m29 m$^{19}$(11)=0 and common key is gab=(m29m (11)$^{19}$)$^5$=(m29m(11)$^5$)$^{19}$=19. Because 0 and 1 are no longer the zero and one element of the operation, common keys 0 and 1 may be generated. In accordance with an aspect of the present invention a provision is included to not use the specific inverters and or private keys that generate undesirable private keys. For instance an undesirable common key may cause a signal to be exchanged that forces the devices to generate other private keys.

The Diffie-Hellman scheme works for all n-state operations that have the same meta-properties as the mod-p multiplication. That is: being closed, having an n-state switching function table that is commutative and associative, having one row (and thus column) of zero-elements and one row (and thus column) that is an identity inverter, with all rows (and columns) not being all zero-elements being reversible. For instance the consecutive multiplication for n=29 serves as a proper switching function for a Diffie-Hellman key exchange operation and so does its FLT'ed version. One should check if a proper generator element is selected for the public key exchange.

In accordance with an aspect of the present invention the operation is defined over an extension field GF(p=2$^m$). This means that the operation is defined modulo-pol_p wherein pol_p is an irreducible polynomial over GF(2) of degree m. This approach is applied as an illustrative example to generate the multiplicative table of GF(p=2$^5$=32) modulo polynomial x$^5$+x$^3$+1. A listing of a Matlab program that generates the 32-state switching function table for this operation is provided in FIG. 34 of U.S. patent application Ser. No. 15/442,556 ("the 556 application") to Peter Lablans filed on 24 Feb. 2017 which is incorporated herein by reference. A partial screen shot of the generated 32-state switching function table is provided in FIG. 36 of the 556 application. One can apply polynomial multiplication in Matlab using polynomial representation to create a decimal table m32. A Matlab program uses the binary coefficients of the generated polynomial presentation of the elements of a table to generate a decimal presentation and to generate a binary word from an integer, respectively. A combinational binary circuit can perform the multiplication from polynomial representation and a conversion to decimal representation is not needed.

Thus a 32 by 32 element decimal table can be generated that represents a 32-state switching function that is represented by a multiplication over GF(32). The multiplication over GF(32) as provided above is modified in accordance with a FLT with an inverter inv32 which in an illustrative example is the 32-state identity inverter left rotated by 8 elements. The reversing inverter rinv32 in the illustrative example is the 32-state identity inverter right rotated by 8 elements.

Thus p=32 and take g=11 as in the previous example, as 11 is also a generator element of m32. The private keys are a=5 and b=19. The public keys are ga=18 and gb=10. The common secret key is gab=23. The FLT'd multiplication with inv32 is called 'm32m' with inv32=[5 22 6 23 7 24 8 25 9 26 10 27 11 28 12 29 13 30 14 31 15 16 0 17 1 18 2 19 3 20 4 21]. The numbers for the inverter modified operation (multiplication) become: The private keys still are a=5 and b=19. The public keys are ga=30 and gb=19 and the common secret key is gab=16.

This approach can be extended to very large numbers of p=q$^m$ with q being prime and m being an integer and many different inverters, which preferably are rule based.

In accordance with an aspect of the present invention the Diffie Hellman key exchange method is used for any value of p for which a standard operation is defined that is modified with an inverter per the method as illustrated in FIG. 6. This operation can be used as an operation defining a multiplicative group for any integer number (not only prime or extension fields) by using the general expression as represented in Matlab script: mp(i1+1,i2+1)=mod((i1+i2−1),p)+(((i1+i2−1)>=p)*1); with i1 and i2 ranging from 1 to (p−1).

A disadvantage of consecutive multiplication without FLT is that it is of course very predictable, especially when generator g and number p are provided. In accordance with an aspect of the present invention the operation (generating elements of mp with for illustrative purposes p=30) is modified with an inverter in accordance with the method illustrated by FIG. 6. Preferably a rule based inverter is used so that individual elements of the inverter can be determined. For illustrative purpose, a consecutive multiplication m30 (p=30) generated in accordance with the above rule is used to create a common keyword. The operation is modified in accordance with inv30=[6 20 5 19 4 18 3 17 2 16 1 15 0 14 29 13 28 12 27 11 26 10 25 9 24 8 23 7 22 21]. This inverter is created by a) a left rotation of 8 elements of a reversed 30-state identity inverter, followed by a splitting of the inverter in two equal parts and interleaving the two parts and then moving the first element to the last position. For large numbers the reversing inverter is also applied based as a rule on each state to which the reversing inverter has to be applied. The rules for inversion and reversal of inversion can be programmed in a processor or realized in a combinational circuit.

The results for the inverter modified operation (multiplication) called 'm30m' become: The private keys still are a=5 and b=19 and g=11. The public key=m30m$^a$(g)=m30 m$^5$(11)= 15 and m30 m$^{19}$(11)=0. The common key is (m30m$^{19}$)$^5$(11)=20.

In accordance with a further aspect of the present invention a one-element-stuffing FLT or oes-FLT is applied in a public key exchange between at least two computing devices. As an illustrative example again a Diffie-Hellman based key exchange is applied. As an illustrative example a 28-state switching function table 'm28p' represented by the consecutive multiplication is generated using the above provided Matlab expression. The 32-state switching function table 'm32e' is created by expanding m28p to a 32 by 32 table wherein rows and columns are expanded so that m32e(a,x)=a for a being selected from elements 0 to 27 and x being selected from elements 28-31. The same expansion applies for columns so that m32e(x,a)=a for a being selected from elements 0 to 27 and x being selected from elements 28-31. Elements m32e(28:31,28:31) can be any value but for convenience will be made 0 (all in origin 0).

Because 'a' is always selected from [0:27] the outcome of m32e(a,x) and m32e(x,a) will always be within [0:27]. The preset conditions make sure that execution of m32e(a,b) with a and b both in [0:27] will never enter into an invalid outcome. To confuse an unauthorized user or device, an FLT will be applied to m32e to create m32eft. Element 8 is a generator element of m28p. The inverter inv32 is created from a mod-33 multiplication by multiplication by 17 followed by adding 5 and then determining the result modulo-33. Only the results smaller than 32 are used (thus dropping one element in the generated sequence, reducing it from 33 to the needed 32 elements). Inv32=[5 22 6 23 7 24 8 25 9 26 10 27 11 28 12 29 13 30 14 31 15 16 0 17 1 18 2 19 3

20 4 21]. Using g=11 and a=5 and b=19 one will generate public keys 3 and 18 and common (secret) key 18.

RSA Modified N=p*q

Encryption methods known as RSA (named after Ron Rivest, Adi Shamir and Leonard Adleman) relate to public/private key methods. A number n is formed from the product of two prime numbers p and q: n=p*q. The Euler totient function y(n)=(p−1)*(q−1) is determined and a public key e that is coprime to y(n). Also a private key d that is the multiplicative inverse of e to y(n) is determined and kept private. The number n and public key e are shared with an encrypting machine which encrypts a message m as $m^e$ mod(n). A receiving machine decrypts the received message $m^e$ mod(n) by determining $(m^e)^d$ mod(n). The RSA method is used for encryption, message signing and key distribution. The RSA method has known enhancements and conditions such a padding schemes, selection of prime numbers. etc.

In accordance with an aspect of the present invention the RSA method is modified by applying one or more n-state reversible inverters with n>2 wherein the n-state inverter is preferably kept secret. In accordance with an aspect of the present invention, one or both of the shared key numbers (n,e) are modified with the n-state inverter and are restored at the encrypting machine which also has the (secret) n-state inverter. Because n is presumably very large (greater than 100 bits, more likely to be 1024 bits or greater or 2048 bits or greater) the possible size of modifications is also very large. One possible modification is to XOR the binary representation of n with a large modification word, which is kept secret and is known to the encrypting and decrypting machine. One may add (XOR) a binary word with the decimal value x to the binary representation of n (and/or e). The original number n or e can be restored by again adding (XOR) x to the received number. In accordance with a further aspect of the present invention the message to be encrypted is modified by XORing with x and/or the generated encrypted message is modified by XORing with x.

The modifications as provided above are already effective, but are subject to fairly simple but time consuming attacks. The modification does not change the RSA method itself fundamentally. In accordance with an aspect of the present invention, the fundamental operation in the RSA method which is exponentiation, (which in this case is repeating multiplication) is Lab-transformed in accordance with the method illustrated in FIG. 6. That is: for a multiplication type switching operation input data are modified with n-state inverter invn and the output (product) of the multiplication, which may be a standard mod-n multiplication, is modified with another inverter which may be the reversing inverter rinv of invn. The Lab-transformed switching operation remains a group or ring or finite field as needed. So, the inversions do not change the defining meta properties of RSA (such as being associative and having a zero and one element) but change the outputs. Which means that the RSA methods can be applied using the FLT modified multiplication as the operational function.

A much higher level of security is achieved by applying confidential n-state inverters to Lab-transform the operational function of RSA. As a result, one may use smaller numbers for n that are commonly required 1024 or 2048 bits and still achieve a high level of security.

The method as provided above will be illustrated with examples of small numbers. One of ordinary skill can easily check that this works for large and very large numbers. Assume RSA for p=5; q=11 and n=55 with φ(55)=(5−1)*(11−1)=4*10=40. Select e=7, which is coprime with 40 and has multiplicative inverse d=23 (all mod φ(55)). The public key is (e,n)=(7,55). One can easily check that a message $m^7$ mod-55 is decrypted to m from $(m^7)^{23}$ mod-55, for instance for m=17. Name the switching function represented by m(x,y)=x*y mod-55 as 55-state function 'm55.' Apply a 55-state inverter inv55=[12 13 14 15 16 17 18 19 20 21 22 23 24 25 26 27 28 29 30 31 32 33 34 35 36 37 38 39 40 41 42 43 44 45 46 47 48 49 50 51 52 53 54 0 1 2 3 4 5 6 7 8 9 10 11] in an FLT of m55 to create 55-state switching function 'm55m.' This inverter is a shift (or rotation) of all elements of a 55-state identity inverter of 12 positions to the left. Many other different reversible 55-state inverters are possible (in fact 55!-1 reversible 55-state inverters). One should note that this inversion changes the 0 and 1 to 44 and 45, respectively. The order (0,1) and (43,44) is maintained for simplicity and illustrative purposes but can also be broken up. One is cautioned that these small numbers (43 and 44) or states are then not a candidate for actually being public or private keys. These are so called toys examples used an illustration. One of ordinary skill will understand that toys examples are easy to expand to practical numbers.

The reversing inverter rinv55=[43 44 45 46 47 48 49 50 51 52 53 54 0 1 2 3 4 5 6 7 8 9 10 11 12 13 14 15 16 17 18 19 20 21 22 23 24 25 26 27 28 29 30 31 32 33 34 35 36 37 38 39 40 41 42]. The inverters inv55 and rinv55 are applied in an FLT to perform exponentiation by repeated multiplication for encryption and decryption. Reduction such as baby-step/giant step can be applied. The same keys e and d as in the unmodified operation are to be used. However, it is important that the same FLT modified operation m55m applied in the encryption has to be applied in the decryption. For instance public key e=7 (corresponding to private key d=23 as mod(7*23,40)=1) applied to the modified operation on a message m=37 generates encrypted message em=2 and decrypts correctly with d=23 to m=38. However, trying to decrypt em=2 with d=23 with the standard, unmodified, mod-55 multiplication leads to decrypted message md=8, which is incorrect of course. Thus, even if a malfeasant is able to obtain or guess a correct private keyword, without access to the correct FLT (or inverter), it will be almost impossible to decrypt the encrypted message.

It is to be understood that the above is an illustrative example that can be easily replicated in Matlab on a computer or any other correctly programmed computer, including ones using Python, C#, Java, APL, Visual Basic or any other appropriate computer language. For practical security purposes RSA generally applies further steps like padding and applies very large integers which may be 100s of digits. Practical RSA requires for instance use of Big Integer execution when run on a processor, because common programming languages may round large numbers to an undesirable scientific notation with a mantissa and exponent representation. The same Big Integer and padding schemes are to be applied to the FLT modified approaches as provided herein.

For illustrative purposes another example is provided for p=7, q=13, n=91 and φ(91)=(7−1)*(13−1)=6*12=72. The inverter inv91 is the 91-state identity inverter of which all elements are rotated 7 positions to the left. The reversing inverted rinv91 is a sequence mod-91 of 91 consecutive elements starting with [84 85 . . . 83] and is the identity 91-state inverter rotated 7 positions to the right. The public key e=11 corresponds to private key d=59 in this example. A message m=82 is encrypted into em=24 and correctly decrypted into dm=82 by using the modified operation both for encryption and decryption. Using the unmodified operation with d=59 will generate the incorrectly decrypted message dm=19.

In accordance with a further embodiment of the present invention one-element stuffing is applied to the n-state switching function to perform an RSA operation followed by an FLT to expand the number of switching states. As an example the above 91-state switching function, which is represented by a modulo-91 multiplication, is expanded to a switching function that is represented by a 100 by 100 switching function table. This is done by adding columns and rows representing identity inverters inv91=[0 1 2 . . . 90] to the 91 by 91 table representing m91, being the original 91-state switching function. This leaves undefined m100(91:99,91:99) (in origin 0) or m100(92:100,92:100) in origin 1. In order to execute the FLT in Matlab (in origin 1) the elements m100(92:100,92:100) are set to 1. An inverter inv100 is applied to the FLT of m100 to generate m100m, inv100 being a rotation left of 84 positions of a 100-state identity inverter leading to inv100=[85 86 . . . 100 1 2 . . . 84]. The RSA public key e=11 and private key d=59 with message m=82 with m100m leads to encrypted message em=56 and is correctly decrypted to dm=82. Using (incorrectly) m100 (or m91) to decrypt will generate wrong result dm=49.

In RSA the multiplication (or exponentiation, which is repeated multiplication) is performed modulo-n with n=p*q and thus n is not a prime number. The multiplication is not over a finite field or an alternate finite field in that case. However, the FLT upon an operation leaves most of the properties of the original operation intact. The FLT-ed mod-n multiplication in RSA (wherein p and q are prime in n=p*q) may have a different zero-element and/or one-element for instance, however the public key e and private key d in RSA remain the same after FLT. One may transmit the public key e modified by a reversible inverter to make cryptanalysis harder.

A 4-state symbol representing a signal may have the assigned values or states 0, 1, 2 and 3. The value or state of a signal may be determined by a voltage. It should be clear that it is not required that the symbol states 0, 1, 2 and 3 are represented by 0, 1, 2 and 3 Volt respectively. The 4 different states may be represented by for instance 0.5 V, 1 V, 1.25 V and 1.75 V. Or a state in an n-state signal may be represented by an optical signal of a particular wavelength which in certain cases are considered independent instances of a physical phenomenon.

An n-state switching function is a description of a physical device that processes n-state signals, which may be provided and processed as binary words. The actual circuits may be realized as combinational switching circuits. The actual circuits may also be realized as addressable memories, wherein the two inputs generate a combined address that has as content the required output value that will be provided on an output. The addressable memory that operates in accordance with an n-state switching function table is a digital gate, in effect an n-state digital gate. An addressable memory that stores an XOR binary switching table and that generates on an output based on input signals in accordance with the XOR binary switching table is a XOR gate, and is functionally not different from a combinational XOR gate and is physically and functionally an XOR gate. The same applies for n-state switching function tables implemented on a memory which may be an addressable memory, which forms an n-state digital gate.

The availability of the FLT is a modification and improvement of the functional aspects of a computer. It allows a computer to perform FLT modified cryptographic operations such as standard cryptographic operations at a substantially higher level of security compared to the standard cryptographic operations with substantially the same level of computing effort. Substantially herein is preferably not more than 25% and more preferably not more than 10% of effort (resources and time). In the alternative a same or similar level of security as with standard cryptographic methods are achieved with substantially lower level of resources and processor time, for instance by allowing smaller but more secure keywords.

N-state functions and inverters in one embodiment of the present invention are tables stored in addressable memories. N-state inverters may also be defined as a rule.

A realization of a 2 dimensional n-state truth table can be an actual active switching device. It can also be a memory device. In that case an n-state output symbol may be addressed by 2 n-state input symbols. Or in other words: an n-state output symbol has an address that is determined by 2 n-state input symbols. Such an n-state truth table can be implemented as for instance a 2 by 2 matrix in a computer program running on a processor with memory such as an Intel® microprocessor with memory running a language such as MatLab® of The MathWorks, Inc. of Natick, Mass. or FreeMat, an open source computer programming language, available from <URLwww.sourceforge.net>. The following truth table of sc4 can be implemented and the function sc4 can be executed in such a processor system.

| sc4 | 1 | 2 | 3 | 4 |
|-----|---|---|---|---|
| 1   | 4 | 3 | 2 | 1 |
| 2   | 3 | 4 | 1 | 2 |
| 3   | 2 | 1 | 4 | 3 |
| 4   | 1 | 2 | 3 | 4 |

The following is a listing of a program in MatLab performing all possible 4-state input combinations and the resulting output 4-state symbol of sc4.

% generating all possible 4-state symbols 'out' as result of all possible input
% symbols 'in1' and 'in2'
sc4=[4 3 2 1;3 4 1 2;2 1 4 3;1 2 3 4]; % this is the truth table stored in memory
for in1=1:4
for in2=1:4
out=sc4(in1,in2) % the generated output
end
end The possible states of a 4-state symbol in this program are 1, 2, 3 and 4. Each n-state symbol in this implementation sample represents a plurality of binary signals. An n-state symbol is thus represented by a word of binary signals.

A computer that implements the 4-state switching function table generated by the program in fact realizes a physical 4-state gate enabled to receive 2 4-state input signals to generate a 4-state output signal, wherein the 4-state signals are represented by symbols.

The following illustrative Matlab program activates the 4-state switching function table for measurable input and output signals all in origin 0:
prompt='What is x1?';
x1=input(prompt)
prompt='What is x2?';
x2=input(prompt)
y=sc4(x1+1,x2+1)−1

One can measure signals x1 and x2 generated from the keyboard and entered into a processor, possibly via an input register and one can measure the output signal 'y' generated by the processor and outputted to a display to be converted to an output character. In whatever form sc4 is realized inside a computer, it is effectively a physical 2-input/1-output 4-state switching gate. This applies to any 2-input/1-output n-state gate.

A physical n-state 2-input/1-output switching device also called a physical n-state gate is a device that is enabled to receive two n-state input signals and to generate a 4-state output signal, wherein an n-state input signals may be a plurality of p-state signals with n>2 and p<n. Determination of the n-state output signal takes place by processing of the n-state input signals in accordance with an n-state switching function. The n-state switching function may be implemented as combinational circuitry, as a memory stored table, as a program implemented switching function or as a combination of any of those components.

A signal be it binary or n-state with n>2 may be an electric signal, an optical signal, a magnetic signal, a radiation, an magneto-optical signal, an electro-magnetic signal, a mechanical signal or a mechanical impulse, a presence of a material or a quantum-mechanical state or any other physical state of a material that will represent at least one of 2 states in one embodiment of the present invention or at least 1 of 3 states in a further embodiment of the present invention or at least 1 of 4 states in yet a further embodiment of the present invention. In yet a further embodiment an implementation of an n-state truth table can process n-state symbols with n>2 at a speed of at least 100 Hz (=100 symbols per second), at a speed of at least 1000 Hz (=1000 symbols per second), at a speed of at least 1 MHz (=1,000,000 symbols per second), at a speed of at least 100 MHz (=100,000,000 symbols per second). It should be clear that processing of n-state symbols in accordance with an n-state switching function with n>2 at the above speeds is only possible with a processor and cannot be performed mentally or with paper and pencil by a human operator.

Coding or encryption which includes "rounds" of confusion and substitution is also applied in advanced codes such as Rijndael and the related Advanced Encryption Standard (AES) coding scheme, which uses an S-box. The rounds herein apply what is called herein a Feistel-like network. This means that a word of k n-state symbols (with n≥2, or n>2, or n>3) and k≥2, is split at least in two sub-words of at least one symbol and wherein at least one of the sub-words is being processed by either an implementation of an addition over an alternate finite field or by an addition over an alternate finite field and an inverter defined by a multiplication over a finite field or by an implementation of a truth table of an addition over an alternate finite field that is modified in accordance with an inverter defined by an alternate finite field. At least the reversible part of for instance DES, 3DES and AES in one embodiment of the present invention apply functions and inverters defined by the alternate finite fields as defined and explained herein.

How to generate and decode an AES code is for instance provided in U.S. Pat. No. 7,421,076 issued on Sep. 2, 2008 to Stein et al. and U.S. Pat. No. 7,383,435 to Fellerer issued on Jun. 3, 2008 which are both incorporated herein by reference.

Galois Field (or finite field) arithmetic is widely used in cryptography. The applied fields can be for instance a field GF(p) with p being prime, or extension fields GF($p^m$) with p being prime and m>1, wherein p preferably is 2, or composite fields GF(($p^m$)$^r$) with p being prime and m and r>1, or a prime field such as a Mersenne prime field GF(n) with n≈$p^m$ and preferably n≈$2^m$. For instance Odd Characteristic Extension Fields including Optimal Extension Fields are known that are defined over GF(n)=GF($2^m$±c) as disclosed for instance in U.S. Pat. No. 7,069,287 issued on Jun. 27, 2006 to Paar et al. which is incorporated herein by references. One application of finite field arithmetic is in Elliptic Curve cryptography, wherein product symbols based on an elliptic curve over a finite field is generated from the to be coded symbols and random numbers. How to apply a Galois Field in elliptic curve cryptography is also disclosed in U.S. Pat. No. 5,351,297 issued on Sep. 27, 1994 to Miyaji et al. which is incorporated herein by reference. The use of binary fields or binary extension fields in elliptic curve cryptography is disclosed in U.S. Pat. No. 6,721,771 issued on Apr. 13, 2004 to Chang which is incorporated herein by reference. It has been shown already above that alternate finite fields exists for binary, binary extension fields and prime fields and prime extension finite fields. Any field (if it is a traditional or an alternate field) as is known in the art has a minimal set of common properties. However, where at least one class of alternate finite fields differ from traditional finite fields is that the neutral or 'zero' element is not 0. Name the neutral element 'e' and 'a' is any element in a finite field not being 'e' then 'e' is defined as 'a+e=a' with '+' being the addition over the field and wherein the neutral element 'e' is not 0 in at least one class of alternate finite fields. A parallel definition in the alternate finite field is related to the multiplication '*' over the finite field. Herein 'e*a=e' for all states of 'a' including all states not being 'e' and wherein 'e' is not '0'. As the same field properties to traditional finite fields apply to alternate finite fields one may define an elliptic curve over an alternate finite field and develop the cryptography over that elliptic curve in a similar way as in the traditional finite field but now by applying the alternate finite field. In general one applies finite field arithmetic by using a modulo-polynomial calculation. However, a much faster way is to either store the truth table or calculate the elements of the truth table from a known inversion as was explained above. This allows for very fast calculations in binary logic if one so desires. Thus an embodiment is provided of an elliptic curve encoder and a corresponding decoder that applies addition and multiplication (and division when required) over an alternate finite field.

It is noted that all n-state finite fields are supposed to be isomorphic. This statement applies especially to extension fields GF(n=$q^p$) generated by different primitive polynomials, which in the literature have the zero-element 0 and one-element 1. Finding transformations of polynomials that establish isomorphism is difficult and time consuming, especially for larger values of n, as described in H. W. Lenstra Jr. "Finding isomorphisms between finite fields" Math. of Comp., Vol 56, No 193, January 1991, pages 329-347 which is incorporated herein by reference. No literature could be found that explains isomorphism when elements are modified, such as zero-element and one-element and no mathematical theory exists. The FLT allows to generate modified n-state switching function tables. It is common to define a binary extension field based on the XOR or modulo-2 addition and describe it in terms of polynomials. That is: all elements of an extension field can be generated based on a primitive polynomial. For instance addition and multiplication over GF(8=$2^3$) can be generated by applying polynomials of degree 3 with 2-state coefficients: $x^3+x^2+1$ and $x^3+x+1$. The related operation2 8-state switching table related to polynomial $x^3+x+1$ is shown in 302 of FIG. 3. The different n-state operations that can be found from primitive polynomials and that can be assigned operations over a finite extension field can be found by applying a Finite Labtransform. For instance the 8-state switching function table of operation2 associated with polynomial $x^3+x^2+1$ can be found from 302 by applying the FLT with inverter inv8=[0 1 3 2 5 4 6 7]. This FLT will not modify the corresponding operation1 table 301.

In 402 of FIG. 4 an 8-state switching function table of operation2 is shown that corresponds to an 8-state consecutive multiplication over GF(8). In cases wherein the n-state consecutive multiplication is selected as an operation2, the corresponding operation1 is determined by naming operation1 states in accordance with the corresponding primitive polynomials.

One aspect of the present invention is to design or create digital circuit executable operation1 and operation2 n-state switching functions that can be realized on a digital device as a circuit, a table or a set of executable instructions. The design is achieved by performing on a known n-state switching function a so called Finite Lab-transform (FLT) or a modified Finite Lab-transform (mFLT). The thus transformed n-state switching function then becomes the desired n-state switching function which are unknown prior to be invented by the inventor. The thus designed n-state switching function is then implemented or realized on a digital circuit and the modified n-state switching function has now become a realized or implemented n-state switching device that processes signals. Some n-state switching functions are known and have been implemented as processing devices and may not be novel. Known n-state switching functions that are: 1) n-state consecutive multiplications; 2) modulo-n additions and multiplications for n being a prime number; 3) additions and multiplications over $GF(n=q^p)$ with q being prime and p greater than 1, wherein the additions and multiplications are defined by primitive polynomials of degree p and coefficients of the primitive polynomials comply with operations over finite field GF(p). (hereinafter "Group".) Additions and multiplications modulo-n, n-state consecutive multiplications, and additions and multiplications over GF(n) based on primitive polynomials as described in the literature are all known operations.

Any n-state switching function derived from a known n-state switching function by applying an FLT or mFLT and that is not one of the above Group are currently unknown and are believed to be novel. A simplest transformation is wherein either the zero-element is not 0 and/or the one-element in not 1. Clearly a whole group of n-state devices exists wherein the zero-element is 0 and the one-element is 1 created by applying the FLT or mFLT that are not a member of the Group.

The FLT as provided herein is a machine operation performed by a device upon two or more signals, using n-state inverter devices or operations. The FLT explicitly is a machine operation and not a mathematical operation. It is believed that no operation of the FLT existed prior being invented by the inventor of inventions disclosed herein, not in device form and not in any mathematical form that was converted into a device realization.

There is a distinction in the art between the concepts of (1) coding, (2) encryption and (3) hashing. Coding may technically apply to error performance and detectability in signal transmission. Encryption is related to security and keeping secrecy of a message. Coding and encryption processes are reversible by a process named respectively decoding and decryption. Hashing in general refers to a (usually non-reversible and one way) transformation process, for instance to indicate a possible change in status, ashing can be achieved via a finite field. The concepts of (1) coding, (2) encryption and (3) hashing are covered herein by the name "coding" unless it is specifically named differently or it is clear from its context that either coding or encryption specifically is intended. The term decoding is therefor intended to mean both decoding and decryption unless specifically mentioned otherwise.

Elliptic Curve Cryptography and FLT

Elliptic Curve Cryptography (ECC) is known and is used in different configurations, for instance in public key cryptography and includes but is not limited to elliptic curve Diffie-Hellman (ECDH), Elliptic Curve Integrated Encryption Scheme (ECIES), The Elliptic Curve Digital Signature Algorithm (ECDSA), The Edwards-curve Digital Signature Algorithm (EdDSA), The ECMQV key agreement scheme and others. Different types of finite fields are used to calculate points on a curve and different types of curves have been and are defined over finite fields. The usefulness of ECC is derived from the Elliptic Curve Discrete Logarithm Problem (ECDLP) and the intractability to solve the ECDLP problem over a finite field Fp faster than O(p).

In Elliptic Curve Cryptograph (ECC) parties must use the same elliptic curve, defined by its domain parameters, which are provided as (p,a,b,G,n,h) for a prime field and (m,f(x), a,b,G,n,h) for extension fields which may be binary extension fields but in accordance with an aspect of the present invention are extension fields of any prime number. Herein p is a prime number defining the finite field; a and b are the curve parameters as in $y^2=x^3+ax+b$ (mod p) for the prime field and $y^2+x \cdot y=x^3+ax^2+b$ (mod-f(x)) for a binary extension field which preferably is nonsupersingular; G is (xG,yG) which is a base point, n is the order of G; h is the cofactor; m is the power of p which is usually 2; f(x) is a polynomial of degree m that defines the finite field. One is reminded that the previous curves are among the most widely used. However, many other curves exists, including Hessian, Edwards, twisted and other curves, which are also covered by aspects of the present invention using the Finite Lab-transforms.

The following shows how to apply an alternate finite field to elliptic curve procedures. As an illustrative example the field $GF(2^4)$ will be used. The field will be applied to create an elliptic curve in accordance with the polynomial equation $y^2+y \cdot x=x^3+ax^2+b$. The selected curve is $y^2+yx=x^3+6x^2+1$. The point on the curve are determined using the finite field $GF(2^4)$ defined by the 16-state operations whereof the switching tables are provided in FIGS. 9 and 10. One is reminded that thus all arithmetical operations such as the '+' and '.' and '$y^2$', '$x^3$' and '$6 \cdot x^2$' operations are performed in accordance with the tables of FIGS. 9 and 10.

The known literature on elliptic curves provides the formulas for point addition and point doubling on an elliptic curve. The following formulas provides point addition and point doubling for elliptic curves over $GF(2^m)$ which may be defined by an irreducible or primitive polynomial of degree m.

Curve: $y^2+y*x=x^3+a*x^2+b$ for finite field $GF(2^m)$ with points P(x1,y1) and Q(x2,y2) on the curve for R=P+Q wherein R has coordinates (x3,y3). The following expressions provide points addition and point doubling (R=2P with P=Q).

$$x_3 = \begin{cases} \left(\frac{y_1+y_2}{x_1+x_2}\right)^2 + \frac{y_1+y_2}{x_1+x_2} + x_1 + x_2 + a; P \neq Q \\ x_1^2 + \frac{b}{x_1^2}; P = Q \end{cases}$$

-continued $$y_3 = \begin{cases} \left(\frac{y_1 + y_2}{x_1 + x_2}\right) * (x_1 + x_3) + x_3 + y_1; P \neq Q \\ x_1^2 + \left(x_1 + \frac{y_1}{x_1}\right) * x_3 + x_3; P = Q \end{cases}$$

The operations '+' and '*' in the known literature are performed in accordance with the addition and multiplication over a finite field or an extension finite field. While operational symbols such as '+', '*' and '−' are used in expressions such as the above ones, it is to be understood that these are very specific operations that are better defined by corresponding tables that implemented on a computer are called n-state switching function tables. This reflects that the computer implemented operations are operations of processing of signals and not doing any actual mathematical or arithmetical operation. One is referred to the technical art of computer arithmetic and computer logic design for further background. Accordingly, the operational symbols '+', '*' and '−' have a specific meaning in the context of their operation and as implemented on a computer. In order to realize a useful implementation on a computer the n-state switching function that 'performs' or rather simulates the arithmetical operations '+' and '*' for instance, has to meet strict requirements. As an illustrative example the operation '+' and its computer implementation 'scn' is used.

Assume that '+' is an addition over a finite field GF(n). The operation is defined over a set S. In arithmetic the set S has elements {for instance integers 0, 1, 2, 3, . . . , n−1}. The operation '+' is characterized by being closed (a∈S, b∈S then a+b∈S), commutative, associative, having a neutral element e (also called a zero element e=0, thus a+e=a) and reversible (for each a∈S there is $a^{-1}$ ∈S so that $a+a^{-1}$=e.). Thus if a computer implementation is created to perform '+', such an operation is characterized by a table scn that has almost all the properties of '+'. One difference between '+' and 'scn' is that 'scn' operates on signals and not on symbols. For human convenience signals are often represented as symbols. A symbol in a computer is a mark or sign or image that represents one or more signals or an operation upon one or more signals. For instance one or more signals generated on an output may be represented by a number like 7. Humans cannot directly observe electrical signals. To make signals observable by humans, signals like electrical signals are converted into for instance light pixels that are displayed on a display. This allows a human to observe the digit 7 without a need to directly feel electrical signals or to measure them with an oscilloscope or voltage meter for instance.

Furthermore, while there is usually a unique relationship between signals and the symbol that represents the signals, the physical signals are entirely different from the representation of symbols. A symbol '7' written in ink on paper is different from electrical signals in a computer that are represented by this symbol. There is generally little or nothing physically noticeable about signals that inherently indicates what they mean. A meaning of signals is only revealed to humans after a technical conversion, such as a displaying on a screen, a printout on paper or a conversion to a sound. In a similar way a signal is entered into a processor or memory of a computer by technical means, such as keyboard, mouse, camera, microphone and not by their symbolic meaning. The signals that are represented by symbols in an operation called 'scn' that performs similar to an n-state addition over GF(n) do not have the values of the finite field GF(n) which are {0, 1, 2, . . . , n−1}. So, a symbol 0 is not necessarily represented by 0 Volt and state 7 is not necessarily represented by 7 Volt. However, the rules and properties for the signals and their processing (if they perform in accordance with an n-state switching table) have to comply with the rules and properties of the corresponding symbolic operation. In the example: the n-state function table that describes 'scn' must be closed, process all necessary elements of a set, must be commutative, associative and reversible and has a zero-element.

The device that implements or realizes an n-state switching function, such as described by 'scn' is an n-state gate or n-state logic gate or n-state gate device. There exist a limited number of binary logic gates or 2-state gates, including the AND, NAND, XOR, XNOR, and OR gates. These are 2-state 2-input devices that perform in accordance with a 2-state or binary switching function table. Commonly a binary inverter [0 1]→[1 0] is also considered a gate, but a single input one. A binary gate processes 2 input signals each represented by binary states into an output signal also represented by a binary state. An n-state gate or n-state logic gate is a similar device, but the instead of 2-state signals, n-state signals (with n greater than 2) are applied. Once a system or device has a meaning assigned to signals (such as for instance the ASCII meaning) the structure of the n-state switching function such as 'scn' is set. If a different n-state switching function needs to be realized a different circuit needs to be constructed.

The inventor disclosed and applied in U.S. Pat. No. 8,577,026 different n-state logic gates that comply with most properties of finite field operations, but wherein for instance the zero-element and/or one element did not represent the signal that normally would do so. The FLT allows to designing and implementing many novel different n-state logic gates that are able to do the processing of signals almost similar to known finite field operations, but are in the aspect of symbol representation entirely different from known symbol representations. This renders the processing of signals highly unpredictable.

An n-state digital gate is physically fully determined by its performance description, either as its performance rules or as an n-state switching function table. One of ordinary skill provided with will be able to build a circuit that performs the performance description without much problem.

Security of operation of current cryptographic devices depends largely on the intractability of efficiently reversing certain operations with present day computers. These problems may be solvable if one has a powerful enough computer, such as a quantum computer. It is assumed that for instance RSA PKI with reasonable key size is at risk for successful attack by a quantum computer performing Shor's algorithm. Aspects of the present invention will improve security of existing cryptographic machines and methods by increasing their unpredictability without dramatic increase of key size.

As to ECC methods and devices, a modification of ECC processes by FLT modifying standard n-state gates that operate in accordance with finite field operations will increase the security. Alternatively, one can maintain an equivalent level of security with a smaller size key by applying FLT modified n-state gates.

A generalized equation for an elliptic curve is $y^2+a1xy+a3y=x^3+a2x^2+a4x+a6$. The determining field has a characteristic 2, hence the curve $y^2+y \cdot x=x^3+ax^2+b$.

The determination of (x3,y3) on the curve requires addition, multiplication and squaring and division or inversion. A division by an element is the same as multiplication with its inverse.

A list of points on the curve $y^2+yx=x^3+6x^2+1$ over the field GF(16) generated by generating polynomial $x^4+x+1$ start with initial content [0 0 0 1]. The elements (x,y) in GF(16) that comply with the curve include (5,2), (12,4), (11,13), (2,9), (8,16), (7,5), (14,2), (1,2), (14,3), (7,14), (8,14), (2,15), (11,5), (12,10) and (5,6). The term (x+y) of (5,2) is 6 and (5,6) is the inverse of (5,2). All points are represented in Matlab origin 1, and thus a 1 should be subtracted for an origin 0 representation. The use of stored switching tables has considerable advantages. A processor does not have to perform polynomial multiplications in case of extension fields which are time consuming. Furthermore, the multiplicative inverse of the multiplication which is needed for the point addition and doubling does not need to be calculated but may be stored in a table. Commonly, the extended Euclidean algorithm is applied to determine an individual multiplicative inverse. Furthermore, stored tables can easily replaced by overwriting, which is a technical advantage over a combinational circuit.

The multiplication table over GF(16) is the 16-state consecutive multiplication as explained above and determined by prod(i1,i2,n)=mod((i1+i2−1),n)+(((i1+i2−1)>=n)*1) for n>0 and prod(0,0,n)=0 and prod(0,a,n)=0 for any valid a. In accordance with an aspect of the present invention the multiplicative inverse of the consecutive multiplication is easily determined by the Matlab expression, for instance for n=16 minv16(i)=15−i+2 for i>1 in origin 0. The multiplicative inverse pair of the multiplication (x*x)=1 enables in accordance with an aspect of the present invention to determine an multiplicative inverse. For instance the multiplicative inverse of 5 is 12 in GF(16).

The above inverse has a regular form that is calculated in a program. Such a Matlab program was shown in a screenshot of the drawings of U.S. application Ser. No. 15/442,556 (the '556 application') filed on 24 Feb. 2017, which is incorporated herein by reference. The formula that is applied is minv16(i)=16−i+3 for n=16 in origin 1. This approach can be applied for multiplicative inverses of all GF(n=$2^m$) using the 'logarithmic' representation through: 'minvn(i)n−i+3' wherein i is the column (or row) index and minv is the corresponding row (or column) index so that i*minvn(i)=2 in origin 1. The first 2 inverses (for 1 and 2 in origin 1) are always 1 and 2. When GF(n) is not too large, for instance m=20, the inverses can be stored in a memory. For the 16-state case: minv16=[1 2 16 15 14 13 12 11 10 9 8 7 6 5 4 3].

In accordance with an aspect of the present invention, finite field operations over a finite field GF($q^m$) including GF($2^m$) are performed by using transformation vectors and operational rules, without generating the complete modified addition and multiplication tables. For the n-state case the n-state switching tables are of size n by n, wherein, in for instance the binary case, each element in the table requires up to m bits. The vectors each are n elements of for instance m bits. The savings in storage space are countered by a not prohibitive increase in processing time. For instance assume a field over GF($2^{20}$) which has over 1 million elements. Each operational table (addition and multiplication) may require 20*$2^{20}$*$2^{20}$ bits or about $2^{45}$ bits or about 3,000 Gigabyte memory. A vector for that field requires 20*$2^{20}$=20 million bits or about 3 Mbyte, which is very manageable.

Elliptic Curve Cryptography relates to operations done to points on a (discrete) elliptic curve, as is now known to one of ordinary skill. An overview of basic elliptic curve operations and application in cryptography is provided at: http://andrea.corbellini.name/2015/05/17/elliptic-curve-cryptography-a-gentle-introduction/ and http://andrea.corbellini.name/2015/05/23/elliptic-curve-cryptography-finite-fields-and-discrete-logarithms/and http://andrea.corbellini.name/2015/05/30/elliptic-curve-cryptography-ecdh-and-ecdsa/ and http://andrea.corbellini.name/2015/06/08/elliptic-curve-cryptography-breaking-security-and-a-comparison-with-rsa/ all posted on-line and dated 2015, and which are all incorporated herein by reference. Point doubling of all the points on the curve is one aspect of ECC. It uses the condition that the inverse of 0 is 0. One may generate points P, 2P, 3P etc. for a base point P, followed by double point 2P in accordance with x1+y1, followed by calculated points "previous point+P" of which 2P+P is identified.

In elliptic curve systems of key exchange and other elliptic curve cryptographic systems, security is derived from the intractability of matching a generated public key kG with a base point G to determine k. An elliptic curve cryptographic system wherein an elliptic curve has around 1 billion to 10 billion points and wherein the base point is kept secret has sufficient security at least for a period of months or even years when attacks are performed with pc type machines.

In accordance with an aspect of the present invention the intractability of finding a term k in kG, wherein k is a private key, in elliptic curve cryptography, is further enhanced by applying an n-state inverter in a FLT. In accordance with one aspect of the present invention published points over a finite field GF($q^m$) are modified with a secret n-state inverter. In one embodiment of the present invention all published points are reversibly modified with an n-state inverter. For instance each element that is published (i.e. the base point if published and the public keys) is modified. In an embodiment of the present invention only one or two elements of a public key are modified with the same n-state inverter and the base point is left unchanged. In an embodiment of the present invention only the base point is modified with an n-state inverter. In an embodiment of the present invention at least one of public keys and the base point are modified with an n-state inverter. In one embodiment of the present invention if a public key or a base point is modified, then each modification is different. In one embodiment of the present invention a modification is a shift of constituting elements. For instance in the 16-state case a point on an elliptic curve has 'value' 5. The representation of this 'value' is [1 1 1 0]. A modification may be a shift to the left of 2 positions, i.e. [10 1 1]. This is the same as XORing with [0 1 0 1].

The 16-state case is provided herein for illustrative purposes as being easy to follow and display. A size of a public key or base point in elliptic curve cryptography may be several hundred bits, usually represented in hexadecimal symbols. In accordance with an aspect of the present invention only part of the public key, indicated by position of the bits or hexadecimal symbols are modified. All modifications have to be reversible. Inversion rules as provided herein above are applied to create operations over an alternate finite field. A receiving side is provided with the reversing rules of modifications which are reversed at the receiving side. In an embodiment of the present invention a modification includes one or more domain parameters of an elliptic curve, which includes the 'a' and 'b' parameters.

In one embodiment of the present invention, points on an elliptic curve are generated over an alternate finite field aGF($q^m$) for instance with q=2 in accordance with a reversible n-state inverter. In one embodiment the operations of the alternate finite field are generated in accordance with a Finite Lab-transform as provided herein. Because the number of reversible n-state is n!, even for relatively small numbers of n, say q=2 and m=8, there are 256! reversible inverters. This number is greater than $10^{100}$. When the applied n-state inverter is kept secret, even at relatively short size keys of for instance 20 bits, the reconstruction of the curve becomes very difficult.

To illustrate using an alternate finite field aGF($q^m$) wherein in one illustrative example q=2 in elliptic curve cryptography a 16-state example will be provided. It is to be understood that aGF(16) is a small field and is only provided for illustrative purposes. The approach provided in accordance with an aspect of the present invention is applicable to much larger fields expressed in hundreds of bits or larger.

In accordance with an aspect of the present invention a curve is generated over an alternate finite field aGF(n=$2^4$) by applying a 16-state reversible inverter in an FLT of a standard finite field GF(n=16). The reversible inverter in origin 0 to create the modified functions is inv16=[5 6 7 8 9 10 11 12 13 14 15 0 12 3 4]. Its reversing inverter in origin 0 is rinv16=[11 12 13 14 15 0 1 2 3 4 5 6 7 8 9 10]. Applying inv16 and rinv16 in FLT generates the switching functions isc16 and im16 that define aGF(16) and may be generated by Matlab. The 0-element of isc16 is 11 and the 0-element of im16 is also 11, while the 1-element of im16 is 12.

A curve over this aGF(16) is defined by $y^2 \oplus (y \otimes x) x^3 \oplus (11 \oplus x^2) \oplus 6$ wherein $\oplus$=isc16 and $\otimes$=im16, wherein $a \oplus b$=isc16(a,b) and $a \otimes b$=im16(a,b) in Matlab notation (all executed in origin 1)

In case it is not possible or not desirable to use tables, but rather calculations, a value of isc16 or im16 is determined by modifying words of bits with a binary representation of an n-state inverter or n-state inversion rule. For instance, each symbol or word of bits is modified by adding (XORing) 4 or [0 1 0 0] at the input. To complete the modification the output result should be reversed by the inverse of [0 1 0 0] in this example. Because XORing is self reversing, applying the reversing inverter 103 of FIG. 1 is the same as again XORing [0 1 0 0] to the output. This is simple for both addition (which is XORing of words of bits) and the mod-polynomial procedure described earlier. It is possible to select simple inversions that generate symmetric results. For instance the inverting inverter inv16 is a sum-mod16 of each value with 4. The multiplicative inverse $a^{-1}$ of symbol a in aGF(16) is defined as $a \otimes a^{-1}$=12. The regular pattern is interrupted at the zero-element (11) wherein the multiplicative inverse of 11 is 11 (as a zero-element has the zero-element as inverse).

The elliptic curve over aGF(16) is different from the earlier one over GF(16). The generated points will be different from the earlier curve. Because vectors are used the quadratic results ($x^2$=im16(x,x)) and the cubed results ($x^3$=im16($x^2$,x)) are stored in vectors, but can also be determined on the fly.

A Matlab program can be applied to generate the points on the elliptic curve $y^2 \oplus (y \otimes x) = x^3 \oplus (11 \otimes x^2) \oplus 6$ over alternate finite field aGF(16). There are 23 points on the curve. An additional test is if point additions (P, 2P, 2P+P, etc.) generate useful results. A program generates point doubling of all points on the curve. For instance a base point (9,15) (all coordinates are in origin 1) can be used. A number 99 is generated when previous point and base point have the same x-coordinate. This can be used as a test if the cofactor is small enough. Further examples are illustrated in the 556 application.

Similar calculations can be done for different curve parameters, different basepoints and different reversible 16-state inverters of which there are 16! (about $2*10^{13}$). In accordance with an aspect of the present invention at least the reversible inverter, and the basepoint are kept secret. In accordance with an aspect of the present invention also the curve parameters are kept secret. In accordance with an aspect of the present invention an element in a finite field GF($2^m$) and alternate finite field aGF(2) is represented by not more than 4 bytes or 32 bits. This allows significant data to be stored in memory to be used in elliptic curve cryptography over binary finite fields with limited calculations, especially as it relates to multiplicative inverses and multiplications. It also allows to have a computer program run through all points on the curve and to select a best curve and best base point. A disadvantage of a relatively small number of points, compared to 300 bits elements, is countered by the enormous number of possible reversible n-state inverters.

In accordance with an aspect of the present invention a reversible inverter is built from "components." For instance Matlab has a statement 'perms(xx)' that generates all permutations of symbols in xx. A vector xx may have 10 different symbols for which all permutations are generated and from which one permutation is selected. A component of an inverter with t*10 symbols may be constructed by concatenating t permutations until t*10 is reached. The symbols in each concatenation vector are summed with k*10 to ensure that no duplicative symbols will occur. The vector xx can be any sequence of symbols. One can generate very long invertible inverters of large n by piece-wise generating smaller inverters, for instance of length k so that k+k+k+ . . . +k=n or of different size k1+k2+k3+ . . . ks=n. For instance, a 256-state inverter may be generated by generating 32 8-state inverters from xx1=[1 2 3 4 5 6 7 8] to xx32=[249 250 251 252 253 254 255 256]. One may also use non-consecutive values or symbols to generate inverters for instance xx1=[249 2 3 4 5 6 7 256] and xx32=[1 250 251 252 253 254 255 8]. One may also concatenate k-state inverters in a random order to create an n-state inverter: invn=[inv32 inv27 . . . inv15] wherein inv32 for instance is a permutation of xx32 generated by perms(xx32).

In one embodiment of the present invention a number of n-state inverters is generated off-line and stored in a particular order and/or an order of application is pre-set. N-state inverters are generated and stored on at least 2 devices that will exchange key data. At least one rule, for instance time or number of times used based, is stored on each machine to make sure that the 2 devices apply the same data, such as curve domain parameters and n-state inverters. In one embodiment of the present invention a device has access to at least 10, more preferably to at least 100, even more preferably to at least 1000, even more preferably to at least 100,000, even more preferably to at least 1,000,000 and most preferably to at least 100,000,000 reversible n-state inverters or inversion rules. In accordance with an aspect of the present invention a specific n-state inverter is only used in one complete cryptographic operation such as coding, decoding, authentication, access control and the like. Once a cryptographic operation is completed, access to the used n-state inverter or a corresponding rule is disabled. In one embodiment of the present invention use of a previously used n-state inverter is only enabled after all other available n-state inverters have been applied.

The above explained table and the vector approach can be used for any $GF(p^m)$ and $aGF(p^m)$ with p being a prime number. The tables for larger field such as GF(64) become unwieldy for display on paper. Points of the elliptic curve $y^2 \oplus (y \otimes x)x^3 \oplus (11 \otimes x^2) \oplus 3$ over the alternate finite field aGF (64) are created by modifying the finite field GF(64) with inverter inv64=[6 7 8 9 10 11 12 13 14 15 16 17 18 19 20 21 22 23 24 25 26 27 28 29 30 31 32 33 34 35 36 37 38 39 40 41 42 43 44 45 46 47 48 49 50 51 52 53 54 55 56 57 58 59 60 61 62 63 64 1 2 3 4 5]. The elliptic curve has 67 points. All coordinates were generated by a Matlab program running on a Dell PC in origin 1.

In accordance with an aspect of the present invention a processor generates one or more points on an elliptic curve defined over an alternate finite field aGF(p) wherein p is a prime number greater than 3. The alternate finite field is created from a standard prime field modified with a p-state reversible inverter. In previous illustrative examples an n-state or p-state inverter was created by for instance adding modulo-n a number to each element of the identity inverter. This has as effect that the 0 element and the 1 element are still consecutive. In accordance with an aspect of the present invention an n-state (or p-state) inverter is applied that does not have zero element and one element as consecutive elements. In an illustrative example the 17-state (or mod-17) addition and multiplication are modified with inverter: inv17=[5 7 1 6 8 9 10 11 12 13 14 15 16 17 2 3 4] in origin 1 in accordance with the device and/or method as illustrated in FIG. 6. From the inverter it can be seen that the zero element (1 in origin 1) is inverted into 3 in origin 1 (or 2 in origin 0) and the one element (2 in origin 1) is transformed to 15 in origin 1 (or 14 in origin 0).

Figure 24:
FIG. 24 provides screenshots of computer generated points on an Elliptic Curve.

Screenshots 4301 and 4302 in FIG. 24 show point doubling on curves $x^3+2x+2$ over GF(17) and $x^3 \oplus 3x \oplus 15$ in origin 0 over finite field aGF(17) in accordance with inv17. Because of the transformation the zero element is not 0.

It has been demonstrated above that in accordance with various aspects of the present invention reversible n-state inverters can be used to create an alternate finite field aGF(n) with n a prime number or n being $p^m$ to create points on an elliptic curve and perform operations on these points, like point doubling, point tripling and point addition. In accordance with an aspect of the present invention any other operation that can be done with points of an elliptic curve over a finite field GF(n) can also be done with points on an elliptic curve defined over an alternate finite field.

For instance a key of 24 bits may generally not provide sufficient security. With current technology it is simple to generate and try any of 16 million 24 bits words. Accordingly, for instance off-line or time unlimited cryptanalysis may allow a processor to try and check any of 16 million 24 bits words. The situation is different if there is a lock-out after a limited number of trials. In that case it is required to know how to generate the right word. Elliptic curve cryptography at word length of 24 bits with standard finite field operations would be considered insecure but is more secure with application of the FLT. In accordance with an aspect of the present invention, an applied reversible inverter used to generate an alternate finite field and elliptic curve points over such field is kept secret. Even if all other parameters of the elliptic curve cryptography are published then still reconstruction of points on the curve would be difficult. This is because there are at least $2^{100}$ different n-state inverters with n around 16 million. Factorization or addition of a base point P to find k in kP is very doable for a field of size of 16 million elements. However, reconstruction without knowing the actual inverter that is applied is much harder and most certainly cannot be achieved in real time during access control or information requests.

In known ECC all or most domain parameters are known and unwinding or detecting by reconstruction of k in kP is intractable because of the large number of points. Secure ECC requires a minimum number of points which may be in size around several hundreds of bits. In accordance with an aspect of the present invention an alternate finite field is generated and applied in ECC by using an FLT or mFLT that is held confidential or secret. The intractability of reconstruction of keywords with a smaller number originates from the incredibly large number of possible reversible inverters.

The elliptic curve domain parameters stored on a memory or a storage device that is accessed by a processor may include: a) type of a finite field such as prime/extended ($p/p^m$) including the size of the field (code example T0001-T9999); b) reversible p-state or $p^m$-state inverter or rule how to generate the inverter (code example P0001-P9999; c) elliptic curve parameters (code examples EP0001-EP9999; d) base point P (code example: BP0001-BP9999); e) choice of private keyword k as in kP (code example PK0001-PK9999); f) choice of number of different words and different elliptic curves (code example NEC0001-NEC9999); g) choice of total length of combined word (code example SIZ0001-SIZ9999); h) coding/cipher rule (substitution/transposition) of individual and/or combined word (code example RUL0001-RUL9999); i) choice of stuffing data (code example SD0001-SD9999). Further data that may be stored rather than for instance calculated: 1) replacement value vector (code example RV0001-RV9999; 2) reversible inverter and/or its reversing inverter (code example RI0001-RI9999; 3) the additive inverse vector (code example ADVN0001-ADVN9999); 4) the multiplicative inverse vector (code example MUNV0001-MUNV9999).

One embodiment of the present invention relates to long elliptic curve key words, preferably of over 30 bits, more preferably of over 50 bits and more preferably of over 70 bits. At those sizes one cannot reasonably store complete vectors as disclosed earlier. It may not be possible to store an entire p-state reversible inverter of which each element is 50 bits. However, one can easily store several elements that determine an inversion rule: for instance the substitution for the zero element and the one-element and for instance an addition of all other elements with a number modulo-n. For instance in GF(n=7367575799) the new zero element is 577777 (for instance 0 and 577777 are exchanged) and the new one element is 345612311 (for instance 1 and 345612311 are exchanged). All other remaining elements are subject to an addition with 8762322. By that rule each calculation involves the required inversion as explained earlier above. Another example of an inversion rule is selecting in GF(n=7367575799) the multiplication p or row p=6223465102 mod-n and addition with 8762322 mod-n. Because the zero and one element are adjacent, one may first exchange the zero-element or the one-element with another one in the p multiplication to make sure that zero and one elements are not adjacent.

In accordance with an aspect of the present invention an ECC operation includes the use of a reversible inverter of which the content is kept secret or confidential. For instance rules for inversion can be programmed in a system and synchronized or can be exchanged securely previously. The use of a secret Lab-transform renders the cryptanalysis of ECC less likely. One thus benefits from an increased security or apply smaller finite fields. For instance a standard size in ECC is a key of 384 bits which can be reduced to a lower size when an inverter is used. In accordance with an aspect of the present invention an ECC key or word generated with a secret inverter has a size preferably at least 10% smaller than an equivalent standard size and more preferably at least 20% smaller than of a standard size. Known standard sizes are 160 bits, 224 bits, 256 bits, 384 bits and 521 bits as NIST recommended key sizes.

There are different ways to generate desirable reversible inverters. One way for creating a reversible inverter is to select a row from a multiplication table in GF(p) with p being a prime number or an extension field GF($p^m$) so that all rows and columns (except the zero element row and column) are reversible inverters. There are some rows and columns that should be avoided as they have predictable patterns. The first row (all 0), the second row (the identity) and the final row (reverse order) have regular patterns. Furthermore, for low row numbers many mod-p products follow normal products. For the field GF(521) one could select the rows greater than 100. For instance the predictable pattern disappears after the fifth column as 6*100 mod-521 is 79. This is a 'toy' example as in practice much larger fields are applied, such as prime fields wherein elements are about 256 bits wide. Even if one applies a field wherein elements are 100 bits wide then a processor still has to evaluate around $10^{30}$ element combinations to determine k1 from c(r,k1) while determination from r1 and c(r1,k1) is relatively simple.

The basis for determining k1 is that c(r1,k1)=r1*k1 mod-p. When r1 is known then k1=$r1^{-1}$*c(r1,k1). Because a device is preprogrammed to perform the coding, a pair (r1,$r1^1$) is stored in a memory in one or each device of the devices 1 and 2 in an embodiment of the present invention. Each device selects a value k (k1 for device 1 and k2 for device 2) and calculates c(r,k)=r*k mod-p. At a receiving end k is calculated by determining k=$r^{-1}$*c(r,k) where $r^{-1}$ is already stored and needs in at least one embodiment of the present invention not to be calculated. The intractability comes from the fact that except for the all 0 row, each row has a k1 a k2 and thus a combination of k1 and k2. The key is made further intractable by applying a reversible inverter to the selected row, wherein a simple inverter inverses the zero and one element and perhaps a constant is added to other elements. In an embodiment of the present invention the new element that is generated or the newly generated key is coded or enciphered with an additional step like a hash function and/or an inverter which may be non-reversible.

A potential disadvantage of the above method is the requirement to potentially distribute and store sensitive data on a device. In accordance with an aspect of the present invention a series of general values 'r', if so desired $r^{-1}$, and its corresponding prime value p or value $p^m$ are stored in a memory and are activated on a condition that applies to device 1 and device 2. A preliminary unique signal or unique code may be applied to activate a particular configuration as described earlier. The design and use of unique and basically unpredictable codes has been explained in U.S. Pat. No. 9,100,166 issued on Aug. 4, 2015, which is incorporated herein by reference.

In an illustrative 'toy' example with very small numbers a configuration over a finite field GF(p=29) is activated with r=11 and $r^{-1}$=8. Devices 1 and 2 send public data c(r,k1)=8 and c(r,k2)=23 to each other, so c1=m29(r1,k1) and c2=m29 (r1,k2). Accordingly, k1=m29($r^{-1}$,8)=m29(8,8)=6 and k2=m29($r^{-1}$,23)=m29(8,23)=10. The operation m29 in this illustrative example is the multiplication modulo-29. Based on (k1, k2) the key m29(6,10)=2 is generated if a multiplication over GF(29) is used to generate the key.

In accordance with an aspect of the present invention, a reversible inverter inv29=[5 6 0 8 9 10 11 12 13 14 15 16 17 18 19 20 21 22 23 24 25 26 27 28 7 12 3 4] is used to modify the finite field GF(29) into alternate finite field aGF(29). An analysis of inv29 shows that the this inverter is created by two steps: most elements are created from the identity by adding 5 to each element or by shifting all elements rotationally 4 positions to the left, 0 becomes 5, 1 becomes 6, etc., with 2 important exceptions: element 2 (counting from origin 0) is now 0 (should be 7 if only shifted), and the 7 has gone to where the 0 would have been and element in position 24 is now 7. The 1 is now in position 25 and is the one or neutral element. By breaking up the adjacency of 0 and 1 the zero and one element are no longer adjacent. A program merely has to check the use of elements 2 and 7 to apply a specific inversion (2→0 and 24→7) and for all other elements the "add 5" rule can be applied.

The inverting inventor rinv29 or inv29 is rinv29=[2 25 26 27 28 0 1 24 3 4 5 6 7 8 9 10 11 12 13 14 15 16 17 18 19 20 21 22 23]. It is already known that elements 0, 2, 7 and 24 are special cases. All other elements can be reversed back with rule "subtract 5 or add 24 mod-29" with exception rule 0→2 and 7→24. In software inversion rules as explained above are very simple software loops.

In accordance with an aspect of the present invention a reversible inverter is used to generate the public keys. For instance, assuming that two devices still apply keys k1=6 and k2=10 and row r11 entirely different public keys will be generated: c1 which is c1(r,k1)=c(11,6)=26 from im29 (which is the switching table created from multiplication m29 of GF(29) by using inv29 and rinv29 and c2 which is c2(11,10)=3. While not stated explicitly every time a multiplication and an addition for this section means a multiplication and addition over GF(p) and thus in the case of GF(29) a modulo-29 operation. The multiplicative inverse in im29 is derived from im29(r,$r^{-1}$)=25. Accordingly, the multiplicative inverse of r=11 is $r^{-1}$=15. Accordingly device 1 calculates k2 from c2=3 from im29(15,3)=10. Device 2 calculates k1 from c1(r1,k1)=26 from im29(15,26)=6, which is of course correct. When $r^{-1}$ is given, the calculations can be performed. The multiplicative inverse may be determined as described earlier herein.

For convenience the multiplicative inverse $r^{-1}$ of a selected row or multiplier r can be stored on the devices. In one embodiment of the present invention only the inverter (or inverter rule) is stored on each device and based on a common condition (such as date or location or temperature or status of a memory or processor for instance) a common term for r is generated and $r^{-1}$ is calculated or a common term r is preprogrammed with the corresponding value of $r^{-1}$ and stored in memory.

In accordance with an aspect of the present invention secret terms k1 and k2 are expressed in a result of an operation which may be a multiplication over a finite field GF(p). The terms k1 and k2 are reconstructed at separate devices using a term r which may be a multiplier in field GF(p). A new term based on recalculated terms k1 or k2 and known terms k2 and k1 at each device is determined by an operation in an alternate finite field aGF(p) generated from GF(p) by using a secret p-state inverter. In accordance with an aspect of the present invention secret terms k1 and k2 are expressed in a result of an operation which may be a multiplication over an alternate finite field aGF(p). The terms k1 and k2 are reconstructed at separate devices using a term r which may be a multiplier in field aGF(p). A new term based on recalculated terms k1 or k2 and known terms k2 and k1 at each device is determined by an operation in the original finite field GF(p) reconstructed from aGF(p) by using a secret p-state inverter. In accordance with an aspect of the present invention secret terms k1 and k2 are expressed in a result of an operation which may be a multiplication over an alternate finite field aGF(p). The terms k1 and k2 are reconstructed at separate devices using a term r which may be a multiplier in field aGF(p). A new term based on recalculated terms k1 or k2 and known terms k2 and k1 at each device is determined by an operation in the alternate finite field aGF(p). The finite field GF(p) may be a prime finite field. It may also be an extension field of a prime number.

The use of an inverter to modify GF(p) to aGF(p) dramatically increases the intractability of finding the correct private keys from published data. A 50 bits word has a size of about $10^{15}$ numbers. The combination (k1,k2) and related products all occur in multiplications over GF(p) and aGF(p). With the possibility of at least $10^{15}*10^{15}$ different reversible p-state inverters (for at least the 0 and 1 elements), the manner to reconstruct k1 and k2 becomes increasingly intractable. This is a very cheap way to generate hard to crack keys. Cheap in the sense of required processing power and memory or storage. If a key is 50 bits then memory requirements are limited to a number of 50 bits and a plurality thereof (for p, for r, for $r^{-1}$, for k1 and k2 and a rule for inversion with a limited number of exceptions.) Each configuration to generate a keyword would be perhaps several kB at most, if at all. This means that at least thousands and probably millions of configurations easily are stored on a device.

When a multiplicative inversion is also stored there is very limited need for calculation. Thus one is able to arrange hard to crack ciphers at very little cost and high security if some basic rules are observed. A first rule is not to re-use a configuration or at least limit re-use. A second rule is to preferably work in a range wherein plain multiplication does not work. This means that at least a product r1*k1 in real numbers should not be smaller than p and should exceed p at least once, or in formula r1*k=c with c>p so that r1*k1=g*p+res with g>0. Optionally, a key is to be further inverted or derived by using a smaller field, for instance by using a multiplication over GF(q<p).

In illustrative examples above the term multiplier or row is used. A product is formed from a multiplicand and multiplier. For the purpose of the above embodiments of the present invention the term multiplicand may be substituted for multiplier. In that same sense the term row may be substituted by column as the multiplication switching table is merely a selected representation of the multiplication of a factor r with factors k1 and k2. One may also use the term dimension of a switching table. Accordingly one dimension (a row or a column, or a multiplier or multiplicand) is secret but known to each of the devices and two products (one by each device) are shared over a channel.

Aspects of the present invention can be advantageously used in devices that belong to a controlled community. A controlled community herein means that two devices are instructed, either by locally stored data or from a shared computing device or from a server which may be a secure server, which cryptographic method or which n-state inverter to use and how a modified n-state switching function or device is to be determined. Preferably such information is kept confidential between two devices and, if needed, a server. In accordance with an aspect of the present invention, such data is available from a secure server over a secure communication channel. A computing device herein is a device that contains at least one digital device that generates one or more signals in accordance with at least one switching table. The digital device may include but is not limited to a processor, a controller, a memory or storage device such as RAM, DRAM, Flash memory, ROM, PROM, ePROM, disk drive or any other data storage device, combinational circuitry, integrated circuits, FPGA, PLA and the like. Illustrative examples of a computing device include but are not limited to any computer, a desktop computer, a server computer, a blade computer, a processor, a controller, a laptop computer, a tablet computer, a smartphone, a chip card, a smart card, an RFID, a FPGA, a phone, an opening device such as a FOB, a TV set, a media player. A computing device may be a stand-alone device. A computing device may be part of a system wherein the computing device provides and/or receives and/or processes signals such as data signals.

Figure 25:
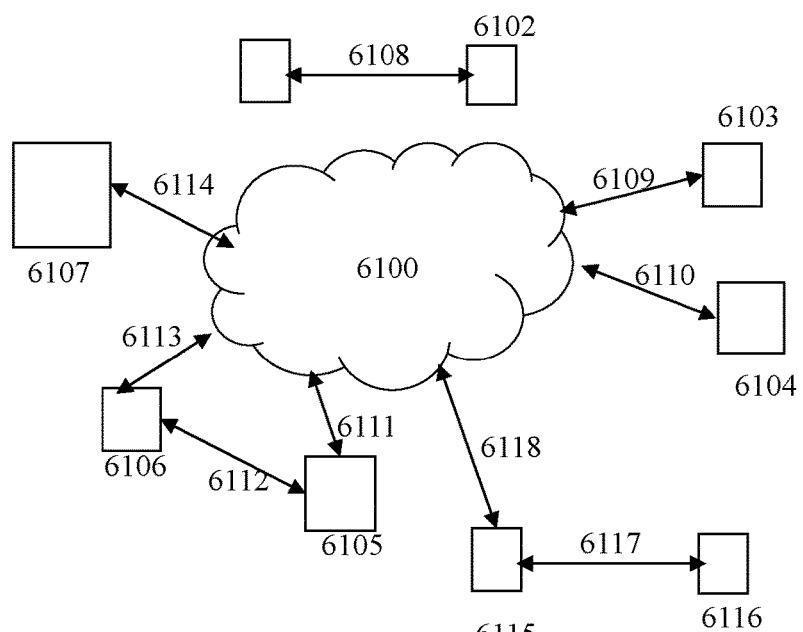
FIG. 25 illustrates networked computers in accordance with an aspect of the present invention.

Several computing device community configurations are illustrated in FIG. 25. FIG. 25 has a communication network 6100. Network 6100 may be a single network such as a wireless or wired network or a combination of networks such as the Internet. The network may be a switched network or a packet based network, a private network or a public network or a virtual private network or any other communication network that enables connection of 2 computing devices and of 3 or more computing devices. In one configuration two computing devices 6101 and 6102 with communication circuitry to transmit, receive or transmit/receive signals are provided. The communication circuitry of 6101 and 6102 can transmit signals over a channel 6108. The channel 6108 is identified as a double arrow. This indicates that the channel is bi-directional, but it does not necessarily mean that 6101 and 6102 do both have to transmit and receive, though they may. For instance 6101 is an opening device or a smartcard or any other transmitting device and 6102 is a computing device that is part of an access mechanism that is being activated by one or more signals from 6101. Device 6101 for instance has cryptographic circuitry that generates opening signals that have to be detected and decrypted by 6102. For that application wherein each device has the appropriate instructions and data stored to complete an authenticated transaction, like opening. In one embodiment of the present invention there is thus only one way transmission by 6101 and receiving of data by 6102. The channel is a direct channel, like a wireless or wired or Near Field Communication (NFC) channel, a USB connection, a Bluetooth connection or any other direct connection. For the transaction itself no other channel is required. The devices 6101 and 6102 may have other communication capabilities, such as equipment to connect to network 6100, but are not shown. Devices 6101 and 6102 have different modified n-state switching functions stored on local memory. These may be updated from time to time.

Devices 6101 and 6102 may also perform some mutual authentication or for instance key exchange. In that case 6108 is a dual use (send and receive) channel and the devices 6101 and 6102 both have send a receive equipment. The same applies to devices 6103, 6104, 6105, 6106, 6107 and 6115 and 6116 and communication channels 6109, 6110, 6117,6118,6111,6112,6113 and 6114.

Computing devices 6103 and 6104 communicate with each other via channels 6108 and 6110 via network 6100. Cryptographic n-state switching functions and/or n-state inverters is provided by secure server 6107 on network 6100 via channel 6114.

Device 6115 and 6116 communicate directly via a channel 6117. Device 6115 is also able to communicate with secure server 6107 via channel 6114. Devices 6105 and 6106 can directly communicate with each other over channel 6112 and with server 6107 via 6100 over channels 6111 and 6113, respectively. As needed 6105 and 6106 can also communicate via 6111 and 6113 via network 6100. The channels, even if illustrated by double sided arrows may be single direction as dictated by practical circumstances.

For instance devices 6115 and 6116 communicate directly via 6112 to complete a transaction, such as withdrawing money from an ATM 6115 machine with a smartcard 6116 and 6115 uses 6118 for verification from 6107 via network 6100. Assume 6116 to be a chipcard or smartcard which is connected to 6115. During an established connection 6116 can be updated with additional or replacement modified n-state switching functions.

Computing devices can be mobile or fixed. For instance 6103 and 6104 are two computing devices that are connected to the Internet, for instance 6103 is a computer, such as a PC, a smartphone, a tablet and 6104 for placing an order and 6104 is a server for processing the order. For instance 6103 is a computing device which may be a server, a PC, a smartphone, a tablet and the like to monitor and/or control an IoT (Internet of Things) device 6104 with a processor such as a camera, a medical device, a security device such as a lock or fire monitor, a thermostat, an appliance, a vehicle or any other IoT device.

Many transactions between computing devices are unique and ephemeral and require one time protection, access, and/or authentication. It is in many cases bad security practice to re-use all the same security parameters. The use of different modified n-state switching tables conforms nicely with security requirements and prevents or at least minimizes the use of dictionary tables and rainbow tables. In accordance with an aspect of the present invention two devices apply not only different modified n-state switching tables but also different cryptographic methods. For instance two devices are configured with at least 2 different hashing methods, for instance at least SHA-3 and MD5. Condition based, the devices select one of the pre-programmed hashing methods and apply modifications as provided herein. This makes cryptanalysis more difficult. In accordance with an aspect of the present invention the message digest that is generated is padded that makes it hard to determine from size alone which method was used.

In other cases, such as in exchange or storage of information, it is important to protect confidentiality of information. The use of different encryption methods, such as at least 2 different methods, such as AES, DES and 3DES, each method being modified as provided herein makes cryptanalysis much more difficult.

In one embodiment of the present invention n-state inverters are stored and provided with an order on at least two computers. Both computers may adhere to a fixed order of using inverters and disabling them. In one embodiment of the present invention, one of the at least 2 computers determines the actual order position of the to be activated n-state inverter and sends a (if needed encrypted) instruction or message to the other computer. For instance, a first computer may communicate with more than 1 other computer. This first computer may assign an order position of a to be activated to one of the more than 1 other computers. All computers may use the same inverters all in a same order. All computers may use the same inverters assigned different orders. The first computer then, in one embodiment of the present invention, stores and maintains the order of each of the more than 1 computer. This may include deactivating inverters. In one embodiment of the present invention, a separate computer or server is used that assigns to two computers that are exchanging data an order position of an inverter to be used. Such a server maintains order position and identification of inverters. In one embodiment of the present invention inverters are stored as rules to generate an inverter. In one embodiment of the present invention a computer receives a rule to generate an inverter and uses the rule to generate the required inverter. Preferably a rule is encoded or enciphered that makes hacking or unauthorized generation difficult. In one embodiment of the present invention, a rule is enciphered with a keyword generated from use of a previous rule.

FLT Modified Merkle-Hellman

As an illustrative example of a modified knapsack encryption approach the Merkle-Hellman system is used as illustrated on Wikipedia's ahttps://en.wikipedia.org/wiki/Merkle%E2%80%93Hellman_knapsack_cryptosystem which is incorporated herein by reference. The illustrative example in this webpage applies a super-increasing sequence w=[2, 7, 11, 21, 42, 89, 180, 354]. The sum of the terms of this sequence is 706. In the example n=881 is selected. This illustrated example will use the same numbers. The numbers in the super-increasing sequence on the Wikipedia page are multiplied with r=588 mod-881 to create a sequence wr=[wr1 wr2 . . . wrk]. The same number r will be used in the illustrative example provided in accordance with an aspect of the present invention. In the classical example, numbers is the super-increasing sequence are multiplied by r and the product is wri=(wi*r)−modulo(n).

While for convenience the term numbers are used herein, these are actually physical signals represented by a label which for convenience are called numbers. A number wi thus is a signal that is represented by a number. A signal may be a k-bits word, like 8-bits word. A binary signal [0 1 1 0 0 0 0 1] may be called 97.

The classical Merkle Hellman knapsack (MHk) works as follows: the sequence wr and the number n is transmitted from one device to another. A representation such as a character is used to determine a sum. For instance the word [a1 a2 a3 a4 a5 a6 a7 a8]=[0 1 1 0 0 0 0 1] is coded by adding the elements to a sum of the received sequence that correspond to the elements in the word [a1 a2 . . . ak] that are not 0. In that case tsum=wr2+wr3+wr8. A first device sends the sequence wr to a second device. The second device sends back a signal representing tsum to the first device. The first device multiplies tsum with the multiplicative inverse of r or r, and r*r mod-n=1, so tsum*r=[w2+w3+w8]. Because the terms wi are super-increasing it is simple to recreate from tsum*r the constituting parts and thus the word [0 1 0 0 0 0 1].

The MHk procedure is modified in accordance with an aspect of the present invention. The classical MHk procedure calculates r*w1. In accordance with an aspect of the present invention a Lab-transform in accordance with an n-state inverter 'inv' is performed. The desire is to reduce the problem later to analyzing a subsum problem with a standard addition '+' with super-increasing terms and a mod-n sum 'sum'. Because solving the problem of the subsum is easy, the problem is modified into an n-state Lab-transformed problem. In order to solve the problem later, the meta-properties of the operations still have to meet those of a finite field which is achieved by way of the FLT. Because the inputs have to be [w1 w2 w3 . . . wk] and this should meet the requirements of a Lab-transform, one can see that w1 is the result of an inversion of a term wr1 with n-state inverter 'inv'. However, w1 is known and wr1 has to be determined, or more general: wi is known and wri has to be determined. Because w1=inv(wr1), but w1 is known, one may also set wr1=rinv(w1), wherein 'rinv' is the reversing inverter corresponding to n-state inverter 'inv' so that rinv(inv(x))=x and inv(rinv(x))=x.

The first device determines [wr1 wr2 . . . wrk] this way and also calculates wai=ma(r,wri), wherein 'ma' is the switching table generated by Lab-transforming the *-mod-n switching table based on the n-state inverter 'inv.' This generates a sequence [wa1 wa2 wa3 . . . wak] which is transmitted to the second device, which also has access to the inverter 'inv' and does on that basis not need to be provided with n. The second device encrypts a binary word [0 1 1 0 0 0 0 1] with the sequence [wa1 wa2 wa3 . . . wak] by applying an n-state addition switching table over finite field GF(n) that is Lab-transformed with 'inv' to n-state switching table 'sca'. The second device accumulates wa2, wa3 and wa8 (terms that correspond to the non-zero elements in [0 1 1 0 0 0 0 1] by determining for instance tsum1=sca(wa2,wa3) and tsum=sca(tsum1,wa8). The switching table 'sca' is commutative and associative and thus the order of processing does not matter. The result 'tsum' is transmitted to device 1. In order to further confuse, one may add a known number (for instance n) in normal decimal way to 'tsum', so 'tsum' becomes larger than n. One may also further modify 'tsum' by 'sca' or 'ma', with a number that is known to both the first and the second computing device. However, this modification will, of course, remain smaller than 881 in this example.

A modification of 'tsum' in accordance with 'sca' or 'ma' at the transmission side is reversible at the receiving side. A 881-state reversible inverter generated with a Matlab program. The inverter is generated by a) selecting a row in a standard modulo-881 multiplication. A 1023 element pseudo-noise primitive sequence generator is applied to generate 1023 unique numbers of 10 bits. That sequence is cleaned up by removing all numbers greater than 880 (in origin 0, or all numbers greater than 881 in origin 1.) That 'clean sequence' is used as a transposition sequence for itself. b). The resulting 881-sequence (which is reversible) is used to transpose the selected n-state inverter of step a) to generate the 881-state inverter 'inv' which is used to Lab-transform an addition and multiplication mod-881 to generate 'sca' and 'ma.' The same parameters as in the Wikipedia example are used to generate a super-increasing sequence, the number n=881, the multiplier r=588 and the binary word to be coded, being [0 1 1 0 0 0 0 1].

The super-increasing sequence is [2 7 11 21 21 42 89 180 354]. The super-increasing sequence being inverted with the inverse 'rinv' of 881-state reversible inverter 'inv' is wr= [262 196 480 326 546 755 42 27] and modification of these elements by 588 generates wra=[500 295 296 511 270 682 293 465] which is the public key. The one element of 'ma' is 188, which is related to the inverter 'inv.' The inverse of r, so that ma(r,r−1)=188 is r−1=855. The term ' 'tsum' is created by combining the terms wra2, wra3 and wra8 (due to [0 1 1 0 0 0 0 1]) with switching operation 'sca' the second will generate 'tsum'=400 as the encryption which is sent to the first device.

The switching functions 'sca' and 'ma' distribute. This means that wra2+wra3+wra8=r*wr2+r*wr3+r*wr8=r*(wr2+wr3+wr8)=tsum, wherein * is replaced by 'ma' and + by 'sca', which are all switching functions. The first device generates rsum=r$^{-1}$*tsum=r$^{-1}$*r*(wr2+wr3+wr8)=(wr2+wr3+wr8). (* and + again being replaced by 'ma' and 'sca'). Thus a number rsum=246 is determined at the output of 'rinv' reduced by a factor r$^{-1}$. That then means that the corresponding real sum 'sum' of w2+w3+w8 is the inverse of 'rsum' or sum=inv(rsum) or sum=inv(246), which is 372.

This is exactly the number as provided by the original Merkle Hellman Wikipedia page. Using the original super-increasing sequence [2 7 11 21 21 42 89 180 354] then generates the word [0 1 1 0 0 0 0 1]. The private key herein is the term r$^{-1}$ in the operation 'ma' that with ma(r,r$^{-1}$) generates the one-element of the n-state switching table 'ma'. Several knapsack cryptography methods exist, which all may be modified in accordance with an n-state inverter and preferably with a corresponding FLT of switching operations.

In the above example, for sufficiently small values of n, a vector representing an n-state reversible inverter can be generated. One may also avoid the need to generate a full vector by using a rule based n-state inverter, such as one or more modified n-state multiplications, which are vectors. By mixing parts of such vectors, an n-state inverter is generated wherein the zero element is not 0, the one element is not 1 and with other desirable properties that can be achieved by executing defining rules.

The modification of Merkle Hellman knapsack using the Lab-transform and other cryptographical operations, including RSA, Diffie Hellman, Elliptic Curve Cryptography, SHA1, SHA2, SHA3, AES and many others demonstrate that one can improve security. For public key methods, it requires a distribution of inverters to participants, which makes the method somewhat more of a symmetrical system. However, the keys are still generated per event if so desired. As a result the modifications allow using a smaller key size with the same security or a much higher level of security at the same key size when not using the Lab-transform or n-state inverters.

Novel lattice-based cryptographic methods like NTRU, LWE and RLWE operate over polynomial ring $R=\mathbb{Z}[X]/(X^N-1)$, $R=\mathbb{Z}_q^{n*m}[X]/(X^n+1)$ and ring $R=\mathbb{Z}_q^{n*m}[X]$, respectively. NTRU also uses operations in mod-q and mod-p for the polynomial coefficients. LWE and RWLE use an n*m matrix A with m>n to help with solving the LWE problem. In a determined matrix system, with no error or a known error an n by n matrix A would be sufficient and for instance using Gaussian elimination can be used and no overdetermined system of equations is required.

As before above with the knapsack problem, actual practical cryptographic systems and methods are often based on representation of large numbers. For instance a practical LWE matrix which may be part of a public key may be generated over $\mathbb{Z}_{2^{15}}^{752*8}$. This is too large for demonstration purposes and often "toy examples" with smaller numbers are used to illustrate a system or a method. In case of LWE and RLWE, a presentation entitled "Post-quantum key exchange for the Internet", Joppe Bos, September 2016, downloaded from http://www.joppebos.com/presentations/ULB2016.pdf (Bos presentation) and which is incorporated herein by reference, provides a useful "toy example" of LWE/RLWE over $\mathbb{Z}_{13}^{7*4}$.

FIG. 26 shows vectors/matrices from page 19 of the Bos presentation, which is a matrix by vector multiplication Ax=b and the related matrix A and vectors x and b are illustrated. A is known and b is known. Vector x is unknown and has to be solved. One can apply several methods to determine x, for instance by applying Gaussian elimination, which will provide x is column vector [6 9 11 11]. As a method for cryptography, this way of coding is not very secure, as anyone with knowledge of A and b can solve x. In fact, the matrix A in FIG. 26 is overdetermined for the number of unknowns, which is 4.

Standard LWE and RLWE require that a noise vector e is inserted or added after the term Ax. This is illustrated in FIG.

27, wherein a noise vector [0 −1 1 1 1 0 −1] is added to Ax to generate b=[4 7 2 11]. If one applies Gaussian elimination mod-13 or the Matlab program gflineq(A,b,13) then as a result [3 3 8 7] is generated for x, which is incorrect. The noise vector is kept secret and when selected and processed appropriately in accordance with LWE and RWLE procedures, will largely vanish. So, the other device does not need to know what the noise vector of the other party is.

If the other device knows what the error vector is, then decryption can be achieved by subtracting vector e from the transmitted b to determine b' and then solve, for instance with Gaussian elimination, Ax=b'. This requires both devices that communicate to have access to noise vector e. In certain circumstances it is warranted to create an extra security layer. Often, public key cryptography is under attack. It may be that a channel operates under a protocol that is compromised so that cryptographic processes that supposedly are secure are in effect unsecure. In that case it is beneficial to have a private encryption means that perhaps requires symmetric operations, but that dramatically improves security.

Vadim Lyubashevsky in History of Lattice-Based Encryption, downloaded from http://cyber.biu.ac.il/wp-content/uploads/2017/01/slides-barilan15.pdf and which is incorporated herein by reference, describes finding pseudorandom vectors from subset sums of the A matrix by using for instance the carry of the subset sum. If the error or noise vector is known, it is not required to keep the vector within a certain range as addition is reversible. Assuming that A is more or less pseudo-random, then determining carries or even complete subsum with an unknown or private operation from A will generate a sufficiently random and unpredictable noise or error vector. Several modifications are possible. But preferably a modification is applied for which all data has been collected prior to the cryptographic operation. In accordance with an aspect of the present invention a Lab-transform is applied to generate an error or noise vector from A or from part of A. This has as an advantage that only A has to be exchanged or obtained from a secure source to engage in the cryptographic operation, which may include encryption, key exchange and/or signature generation.

Standard LWE and RWLE (named LWE herein) put limitations on the error vector to make it vanish in final processing. Such limitations do not have to be applied in accordance with an aspect of the present invention. As an illustrative example an n-state inverter is applied to derive an error vector from the matrix A. One should keep in mind that the "toy example" is mall relative to practical parameters.

Assume an n by n matrix (in the example 4 by 4) is provided. In accordance with an aspect of the present invention the elements of the matrix A may be coefficients of unmodified expressions in modulo-q, but they may also be modified coefficients that are modified in accordance with a first q-state inverter. The first q-state inverter may be used to determine an error vector, but preferably a second q-state inverter is used that is different from the first q-state inverter. The 4 by 4 reduced matrix over derived from FIG. 26 will be used. The elements in columns will be combined with a Lab-transformed addition mod-13. One may also determine result from combining elements of rows. One may determine the residues or the carries or the actual digits of the combination. All will be shown in an illustrative example.

For illustrative purposes the 13-state inverter inv13=[7 2 6 4 12 10 3 5 11 0 8 1 9] is used. This provides a Lab-transformed switching table of the modulo-13 addition wherein the zero-element is and the one element is 9 and the one-element is 11. Addition of the columns of A with modulo-13 generates error [0 5 10 1]. Addition of the rows of A provides error vector [0 11 9 9]. Combination of the elements of columns of A with the Lab-transformed mod-13 addition generates [1 6 4 2] and over the rows generates [5 3 2 6]. An error vector derived from carries of column elements with the Lab-transform generates [1 11 9 1] as opposed to [1 1 1 2] from the mod-13 addition. However, the variation due to carries will have less variation than the residues.

A next step in accordance with an aspect of the present invention is to combine the error vector with the result of a matrix operation A⊗x. The operation ⊗ preferably is a Lab-transformed switching table derived from the switching table of the multiplication mod-13. One may use a matrix A that is transformed with an n-state inverter.

FIG. 28 illustrates an encryption system that applies the Lab-transform. While certain n-state switching tables implemented as rules, tables on memory or combinational circuits are applied, for convenience one may represent the system of FIG. 28 as: br=(A⊗$_1$x)⊕$_2$ EV. The matrix operation is actually two operations: ⊙$_1$ and ⊕$_1$. The result of the multiplication of the first row of A (a11 a12 a13 a13) and x(x1 x2 x3 x4) is (a11 ⊗$_1$x1⊕$_1$a12⊙$_1$x2⊕$_1$a13⊙$_1$x3⊕$_1$a14⊙$_1$x4) wherein ⊕$_1$ is a Lab-transform of an addition over GF(q) and ⊙$_1$ is a Lab-transform of a multiplication over GF(q) using a first q-state inverter. The error vector EV may be generated on using ⊕$_3$ based on yet another q-state inverter. One thus can generate an encrypted vector br which is a combination of an error vector EV with a result of processing a table A with input x.

To decrypt, a receiver having access to correct inverters and to A or to an inverted form of A, first has to determine the error vector EV which has to be applied to br to "remove" the combination of A and EV in (A ⊗$_1$ x) ⊕$_2$ EV. Accordingly, a device has to determine ⊕$_2^{-1}$ in in such a way that br ⊕$_2^{-1}$EV will generate bd=(A ⊗$_1$ x). In a next step, for instance through Gaussian elimination, x is determined.

In accordance with an aspect of the present invention, the function ⊕$_2$ may be any reversible function. For convenience an 'addition' over an alternate finite field is applied, which is an 'addition' over a finite field modified by a Lab-transform. However, any reversible switching function can be used for this purpose. The function ⊕$_2$ is used to combine error vector EV with bd=(A ⊗$_1$ x). The only requirement for function ⊕$_2$ is that it has a reverse ⊕$_2^{-1}$ that removes EV from the transmitted vector so that bd=(A ⊗$_1$ x) is determined from the received vector. A relative simple way to do that is to agree upon an n-state inverter and use the Lab-transformed 'addition' in accordance with that inverter to combine the data elements at the transmission side. Assuming that, if this is not a single data storage machine, there are two machines that collaborate on cryptography, the other machine detangles the error vector, which is recalculated at the second machine, from the received data by determining ⊕$_2^{-1}$. If it is agreed in the method that the combining is a modified addition, then the second machine knows that the detangling should take place with a modified subtraction. For q is prime, this is achieved by determining the mod-q subtraction and Lab-transforming it in accordance with the q-state inverter. For binary extension fields any addition operation over the finite field or alternate finite fields is self-reversing.

For q=13, as in the illustrative example and inv=[7 2 6 4 12 10 3 5 11 0 8 1 9] the switching tables of relevant operations are $\oplus_2$ and $\oplus_2^{-1}$ over the alternate finite field aGF(13). The combination of two elements as $\oplus_2^{-1}(x,x)=9$ and 9 is the zero-element of the Lab-transformed function. Assume that bd=(A$\otimes_1$x)=[11 9 2 7] and EV=[1 2 3 9]. Then br=$\oplus_2$(bd, EV)=[6 2 5 7]. The vector [6 2 5 7] is transmitted to the second device and there processed as $\oplus_2^-$(br,EV)= [119 2 7] which is the correct result.

A remaining problem to be solved is how to determine vector x from br=Ax if br is a vector modified by an n-state inverter and $\otimes_1$ in (A $\otimes_1$ x) is a Lab-transformed function or set of functions or switching tables. Solving Ax=b by Gaussian elimination is relatively simple, but such a process does not work if 'addition' and 'multiplication' have been Lab-transformed. A simple solution in accordance with an aspect of the present invention, modifies all steps of Gaussian elimination in accordance with the Lab-transformed switching function. That means that adding/subtracting rows and multiplying rows with a constant factor have to take place in accordance with the Lab-transformed functions. Another solution in accordance with an aspect of the present invention is to reduce all Lab-transformed functions to their un-transformed form and modify the variables and constant terms accordingly.

As an illustrative example the Bos example for RLWE will be used and expanded. The Bos example provides the PK vector $4+1 \cdot x+11 \cdot x^2+10 \cdot x^3$. The secret or private key is [6 9 11 11] or $6+9 \cdot x+11 \cdot x^2+11 \cdot x^3$. The coefficients of an array or matrix AP are created by polynomial multiplication of the vectors with x, resulting in [4 1 11 10;3 4 1 11;2 3 4 1;12 2 3 4]. This matrix is extended by further polynomial multiplication with x, to [4 1 11 10;3 4 1 11;2 3 4 1;12 2 3 4;9 12 2 3;10 9 12 2;11 10 9 12;1 11 10 9;4 1 11 10]. The original polynomial is again generated by multiplication of the original polynomial with $x^8$. In accordance with an aspect of the present invention wrapping of the vector PK is achieved by multiplication over the ring with one or more pre-agreed polynomial over the ring, for instance with one or more multiplication with $2+x^2$. Polynomial multiplication ($4+1 \cdot x+ 11 \cdot x^2+10 \cdot x^3$)*($2+x^2$) over the ring generates ($10+5 \cdot x+0+ 8 \cdot x^3$), multiplication again with ($2+x^2$) generates ($7+2 \cdot x+ 10 \cdot x^2+8 \cdot x^3$), etc. In accordance with an aspect of the present invention different vectors are generated from the public key vector. These vectors are then combined in a secret way as described above earlier related to the LWE illustrative example. Assume for simplicity sake that the (secret) error vector is [1 2 3 4]. Assume that the secret message is [6 9 11 11] as in the Bos example. The next step of the cryptographic operation is to combine [6 9 11 11] and [4 1 11 10] by switching operations following steps of a polynomial multiplication over the ring, which is followed by combining the product with an error vector. In accordance with various aspects of the present invention the operations in RWLE are FLT modifications of known operations represented as polynomial operations.

Known cryptography including encryption, decryption, (such as AES), public key cryptography (such as Diffie-Hellman, RSA, knapsack), message digest generation (such as SHA standards), and elliptic curve cryptography (such as elliptic curve Diffie-Hellman (ECDH) and Elliptic Curve Digital Signature Algorithm (ECDSA).)

The following documents are hereby incorporated by reference herein, as if they were fully set forth herein: SP 800-67, Revision 1, Recommendation for the Triple Data Encryption Algorithm (TDEA) Block Cipher, 2012; FIPS PUB 46-3 Data Encryption Standard (DES), FIPS PUB 180-4 Secure Hash Standard (SHS) 2015 defines the SHA family; FIPS PUB 186-4 Digital Signature Standard (DSS) 2015; FIPS PUB 202 SHA-3 Standard: Permutation-Based Hash and Extendable-Output Functions, 2015; FIPS PUB 198-1, The Keyed-Hash Message Authentication Code (HMAC), 2008; FIPS PUB 197-Advanced Encryption Standard, (AES), 2001; RSA Laboratories PKCS #1 v2.2: RSA Cryptography Standard, Oct. 27, 2012; RSA Laboratories PKCS #3: Diffie-Hellman Key Agreement Standard Revised Nov. 1, 1993; The Elliptic Curve Digital Signature Algorithm (ECDSA), Johnson et al. 2001, Certicom Corporation 2001; Standards For Efficient Cryptography SEC 1: Elliptic Curve Cryptography, version 2, Certicom Research, 2009; OpenPGP Message Format, Memo, Callas et al., 2007, RFC4880, downloaded from https://tools.ietforg/html/ rfc4880; Understanding Cryptography, by Paar et al., Springer-Verlag, Berlin 2010. All above documents are incorporated herein by reference.

Historic cryptography is compared with current machine cryptography. Current machine cryptography is entirely different from old cryptography. Old cryptography was a manual procedure sometimes automated by slow mechanical means. Current cryptography uses fast computers operating on large amounts of electronic data that cannot be replicated by humans in their lifetime. A distinguishing factor between old human cryptography and computer based cryptography is that a human would be unable to perform the cryptographic operation faultless with only pencil and paper within a period of preferably 50 years, more preferably of 10 years and most preferably of 1 year.

A computer and a computing device contain a memory to store data including instructions; a processor enabled to retrieve and store data from or to the memory and to execute instructions to perform program steps; a data input device, if required with signal converters, including but not limited to a keyboard, a mouse or pointer, a camera, a microphone or any other sensor; an output device with converter circuits that convert internal digital signals into output signals and may include a screen display, a printer, a loudspeaker or any useful actuator; a communication interface to transmit and/ or receive signals to and from another device and may be connected to a network including wired and wireless network; a storage device to store and retrieve data, a power source and a body.

Aspects of the Finite Lab-transform, including the mFLT and zes-FLT, provide new functionality to a computer that has not existed before. In one embodiment of the present invention aspects of the FLT are made part of the instruction architecture of a computer device. This allows a user of a computer with such a novel architecture to run an FLT'ed n-state switching function as a standard instruction. So, instead of an instruction for a modulo-n multiplication, which may be part of a standard instruction set of an ALU or Arithmetic Unit, an instruction may be provided such as illustrated in FIG. 7 or FIG. 12 and wherein the FLT or mFLT is part of the architecture in microcode.

While there have been shown, described and pointed out fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

The invention claimed is:

1. A cryptographic computer system, comprising:
   a first and a second computer, each having a processor and each processor configured to execute instructions to perform a modified n-state operation, the modified n-state operation being characterized by an n-state operation that is modified by a first n-state reversible inverter applied to n-state data being inputted on two inputs of the n-state operation and a second n-state reversible inverter being applied to n-state data being outputted by an output of the n-state operation, with n an integer greater than 2 and an n-state being one of n states, wherein:
   the n-state operation characterizes an n-state switching function operating on n-state data elements to generate n-state data elements, the n-state operation being selected from the group consisting of modulo-n addition, modulo-n multiplication, known addition over a Finite Field (GF(n)), and known multiplication over GF(n) and the modified n-state operation is not selected from the group consisting of modulo-n addition, modulo-n multiplication, known addition over GF(n) and known multiplication over GF(n);
   the first computer and second computer enabled to exchange n-state data generated by a cryptographic operation selected from the group consisting of encryption, public key cryptography, signature generation, message digest generation, and elliptic curve cryptography wherein the modified n-state operation is applied.

2. The cryptographic computer system of claim 1, wherein the cryptographic operation is performed in accordance with an Advanced Encryption Standard (AES) wherein at least one n-state operation is replaced by the modified n-state operation.

3. The cryptographic computer system of claim 1, wherein the cryptographic operation is a public key exchange operation in accordance with Diffie-Hellman key exchange wherein at least one n-state operation is replaced by the modified n-state operation.

4. The cryptographic computer system of claim 1, wherein the cryptographic operation is a public key exchange operation in accordance with Rivest-Shamir-Adleman (RSA) cryptography wherein at least one n-state operation is replaced by the modified n-state operation.

5. The cryptographic computer system of claim 1, wherein the cryptographic operation is a public key exchange operation in accordance with Learning-with-Errors (LWE) cryptography wherein at least one n-state operation is replaced by modified n-state operation.

6. The cryptographic computer system of claim 1, wherein the cryptographic operation is a message digest generation.

7. The cryptographic computer system of claim 1, wherein the message digest generation is selected from the group consisting of Secure Hash Algorithm (SHA) family of standards wherein at least one n-state operation is replaced by the modified n-state operation.

8. The cryptographic computer system of claim 1, wherein the modified n-state operation is characterized by n-state inverter modification of the addition modulo-n or addition over GF(n) and the modified n-state operation has a zero-element that is not 0.

9. The cryptographic computer system of claim 1, wherein the modified n-state operation is characterized by n-state inverter modification of the multiplication modulo-n or multiplication over GF(n) and the modified n-state operation has a zero-element that is not 0.

10. The cryptographic computer system of claim 1, wherein a combination of the first and second reversible inverters establishes identity.

11. A cryptographic method, comprising:
    performing by a first computer of a modified n-state operation characterized by an n-state operation wherein input n-state data provided on two inputs of the n-state operation is modified by a first n-state reversible inverter and n-state data being generated by the n-state operation is modified by a second n-state reversible inverter with n being an integer greater than 2, wherein the n-state operation is selected from the group consisting of modulo-n addition, modulo-n multiplication, known addition over a Finite Field GF(n) and known multiplication over a Finite Field GF(n) and the modified n-state operation is not selected from the group consisting of modulo-n addition, modulo-n multiplication, known addition over GF(n) and known multiplication over GF(n);
    generating by the first computer of data in a cryptographic operation selected from the group consisting of encryption, public key cryptography, message digest generation, and elliptic curve cryptography wherein the modified n-state operation is used; and
    exchanging data generated in the cryptographic operation by the first computer with a second computer.

12. The cryptographic method of claim 11, wherein the cryptographic operation is a public key exchange operation in accordance with Diffie-Hellman key exchange wherein at least one n-state operation is replaced by the modified n-state operation.

13. The cryptographic method of claim 11, wherein the cryptographic operation is a public key exchange operation in accordance with Rivest-Shamir-Adleman (RSA) cryptography wherein at least one n-state operation is replaced by the modified n-state operation.

14. The cryptographic method of claim 11, wherein the cryptographic operation is a public key exchange operation in accordance with Learning-with-Errors (LWE) cryptography wherein at least one n-state operation is replaced by the modified n-state operation.

15. The cryptographic method of claim 11, wherein the cryptographic operation is message digest generation selected from the group consisting of Secure Hash Algorithm (SHA) family of standards wherein at least one n-state operation is replaced by the modified n-state operation.

16. The cryptographic method of claim 11, wherein the modified n-state operation is characterized by modification of the multiplication modulo-n or multiplication over GF(n) and the modified n-state operation has a zero-element that is not 0.

17. The cryptographic method of claim 11, wherein a combination of the first and second reversible inverters establishes identity.

18. A cryptographic computer device, comprising:
    a processor connected to a memory, the processor enabled to execute instructions retrieved from the memory;
    the processor being configured to perform the steps of a modified n-state operation which is characterized by a modification of an n-state operation the modification including a first n-state reversible inverter applied to n-state data being inputted to the n-state operation and a second n-state reversible inverter being applied to n-state data being outputted by the n-state operation with n being greater than 2, wherein:
    the n-state operation being selected from the group consisting of modulo-n addition, modulo-n multiplication, known addition over a Finite Field (GF(n)) and known multiplication over GF(n) and the modified n-state operation is not selected from the group consisting of modulo-n addition, modulo-n multiplication, known addition over GF(n) and known multiplication over GF(n);

communication circuitry to transmit n-state data generated by the n-state processing circuit in a cryptographic operation selected from the group consisting of encryption, public key cryptography, message digest generation, and elliptic curve cryptography wherein the modified n-state operation is applied.

19. The cryptographic computer device of claim 18, wherein a combination of the second reversible n-state inverter and the first reversible n-state inverter establishes identity.

* * * * *